(12) United States Patent
Yung et al.

(10) Patent No.: US 7,895,643 B2
(45) Date of Patent: Feb. 22, 2011

(54) SECURE LOGIC INTERLOCKING

(75) Inventors: Marcel Mordechay Yung, New York, NY (US); Yoram Ofek, Riverdale, NY (US)

(73) Assignee: Trustedflow Systems, Inc., Skokie, IL (US)

( * ) Notice: Subject to any disclaimer, the term of this patent is extended or adjusted under 35 U.S.C. 154(b) by 1027 days.

(21) Appl. No.: 10/219,378

(22) Filed: Aug. 14, 2002

(65) Prior Publication Data

US 2003/0177374 A1 Sep. 18, 2003

Related U.S. Application Data

(60) Provisional application No. 60/365,148, filed on Mar. 16, 2002.

(51) Int. Cl.
*H04L 9/00* (2006.01)
(52) U.S. Cl. .......................................... 726/5; 717/126
(58) Field of Classification Search ......... 709/100–103, 709/106, 225, 229; 705/64, 67, 75; 726/2–7, 726/17, 19, 21, 27, 30; 707/4–5, 103 R, 707/100–102, 103 Y, 104.1; 717/120, 126, 717/127, 171, 172, 176, 177
See application file for complete search history.

(56) References Cited

U.S. PATENT DOCUMENTS

| | | | | |
|---|---|---|---|---|
| 4,293,909 A | * | 10/1981 | Catiller et al. ................. | 710/64 |
| 5,051,940 A | * | 9/1991 | Vassiliadis et al. ........... | 708/524 |
| 5,341,510 A | * | 8/1994 | Gillett et al. ................. | 709/227 |
| 5,544,161 A | * | 8/1996 | Bigham et al. ............... | 370/397 |
| 5,710,912 A | * | 1/1998 | Schlansker et al. ........... | 712/220 |
| 5,732,234 A | * | 3/1998 | Vassiliadis et al. ........... | 712/200 |
| 5,781,720 A | * | 7/1998 | Parker et al. .................. | 714/38 |
| 5,812,394 A | * | 9/1998 | Lewis et al. ................... | 700/17 |
| 6,226,692 B1 | * | 5/2001 | Miloushev et al. .......... | 719/316 |
| 6,324,578 B1 | * | 11/2001 | Cox et al. .................... | 709/223 |

(Continued)

OTHER PUBLICATIONS

Derek Atkins et al., "Internet Security: Professional Reference," Book & CD-ROM Edition, Feb. 1996, ISBN: 1562055577, New Riders Publishing, Indianapolis, IN, USA.

(Continued)

*Primary Examiner*—Kimyen Vu
*Assistant Examiner*—Leynna T Truvan
(74) *Attorney, Agent, or Firm*—Sitrick & Sitrick

(57) ABSTRACT

This invention discloses a method and system for processing logic modules, each having a separate functionality, into a unique functionality that is to be executed in an interlocked mode as a unique functionality. The method is based on taking logic modules (programs and data) with known functionality and transforming them into a hidden program by integrating modules to execute together into a logic which is partially obfuscated and/or encrypted and/or physically hidden. The hidden program is being updated dynamically to strengthen it against reverse engineering efforts. The program includes the functionality for generating security signals, which are unpredictable by observers, such as a pseudo random sequence of security signals. Only elements that share the means for producing the security signals can check their validity. The modules include operational tasks and performance parameters for this operation. The operation can be transmission of data packets with given parameters of performance that the hidden program contains. The generated security signals thus assure that the correct operation was taken place and can be used to signal various cryptographic parameters as well.

74 Claims, 28 Drawing Sheets

U.S. PATENT DOCUMENTS

| | | | | |
|---|---|---|---|---|
| 6,418,478 | B1* | 7/2002 | Ignatius et al. | 709/240 |
| 6,499,123 | B1* | 12/2002 | McFarland et al. | 714/724 |
| 6,515,687 | B1* | 2/2003 | Wynn et al. | 715/840 |
| 6,574,736 | B1* | 6/2003 | Andrews | 726/21 |
| 6,615,350 | B1* | 9/2003 | Schell et al. | 713/168 |
| 6,697,948 | B1* | 2/2004 | Rabin et al. | 726/30 |
| 6,769,127 | B1* | 7/2004 | Bonomi et al. | 725/39 |
| 6,889,209 | B1* | 5/2005 | Rabin et al. | 705/57 |
| 6,891,474 | B1* | 5/2005 | Fletcher | 340/572.1 |
| 6,957,199 | B1* | 10/2005 | Fisher | 705/78 |
| 7,003,560 | B1* | 2/2006 | Mullen et al. | 709/223 |
| 7,047,423 | B1* | 5/2006 | Maloney et al. | 345/473 |
| 7,069,449 | B2* | 6/2006 | Weaver et al. | 713/193 |
| 7,073,069 | B1* | 7/2006 | Wasson et al. | 713/189 |
| 7,080,036 | B1* | 7/2006 | Drummond et al. | 705/42 |
| 7,127,615 | B2* | 10/2006 | Moskowitz | 713/176 |
| 7,290,144 | B1* | 10/2007 | Kitaj et al. | 713/182 |
| 7,346,755 | B2* | 3/2008 | Pomaranski et al. | 711/202 |
| 7,426,719 | B2* | 9/2008 | Chaiken et al. | 717/128 |

OTHER PUBLICATIONS

Andrew S. Tanenbaum, "Computer Networks," Third Edition, Mar. 1996, ISBN: 0133499456, Prentice Hall PTR, Upper Saddle River, NJ, USA.

Douglas Comer, "Internetworking with TCP/IP: Principles, Protocols, and Architecture," Apr. 1988, ISBN: 0134701542, Prentice-Hall, Englewood Cliffs, NJ, USA.

W. Richard Stevens, "TCP/IP Illustrated, vol. 1: The Protocols," Dec. 1993, ISBN: 0201633469, Addison-Wesley, USA.

Elizabeth D. Zwicky et al., "Building Internet Firewalls," Second Edition, Jan. 15, 2000, ISBN: 01565928717, O'Reilly & Associates, USA.

Bruce Schneier, "Applied Cryptography: Protocols, Algorithms, and Source Code in C," Second Edition, Oct. 18, 1995, ISBN: 0471117099, John Wiley & Sons, New York, NY, USA.

Alfred J. Menezes et al., "Handbook of Applied Cryptography," Oct. 1996, ISBN: 0849385237, CRC Press, USA.

Christian Collberg et al., "Manufacturing Cheap, Resilient and Stealthy Opaque Constructs," *Principles of Programming Languages* (POPL), 1998, pp. 184-196, Association for Computing Machinery (ACM), USA.

Christian Collberg et al., "Watermarking, Tamper-Proofing, and Obfuscation—Tools for Software Protection," *University of Arizona Computer Science Technical Report* Feb. 10, 2000, vol.-issue: 03, University of Arizona, Tucson, AZ, USA.

Christian Collberg et al., "A Taxonomy of Obfuscating Transformations," *Technical Report*, 1997, vol.-issue: 148, University of Auckland Department of Computer Science, Auckland, New Zealand.

Enriquillo Valdez et al., "Software DisEngineering: Program Hiding Architecture and Experiments," *Information Hiding 1999*, 1999, pp. 379-394, Springer Verlag Lectures in Computer Science, Heidelberg, Germany.

Enriquillo Valdez et al.. "DISSECT: DIStribution for SECurity Tool," *ISC 2001*, 2001, pp. 125-143, Springer Verlag Lectures in Computer Science LNCS2200, Heidelberg, Germany.

* cited by examiner

FIG. 8 Trusted Flow Generator (TFG) Software (functional description): as part of the hidden program portion (first computing element)

Trusted Flow Generator (TFG) - 110TFG (first computing element)

Trusted Tag Checker (TTC) - 120TTC (second computing element)

1212 - Plain Program components

1. Well-behaved operational program (e.g., TCP) with defined rules of transmission 2. Cryptographic program (e.g., security tag vector (STV) generator)

3. Parameter table (e.g., pseudo random seed)

4. Control program (e.g., for automatic refresh parameters)

| From\To | (A&S) Initialization | | | (A&S) Run-time Reports | | | (A&S) Run-time Actions | |
|---|---|---|---|---|---|---|---|---|
| | TTC | SMS | TFG | TTC | SMS | | TTC | SMS |
| TTC | | | HP | A(L),PU(N) | A(L),PU(N) | | D/E,LPU(N) | D/E,LPU(N) |
| SMS | CP | | HP | A(L),PU(N) | A(L),PU(N) | | D/E,LPU(N) | D/E,LPU(N) |
| TFG | R | R | | A(L) | A(L) | | | |

All Messages are:
(1) Authenticated and Signed - A&S
(2) Sent and stored with TS (time stamp)
(e.g., derived from UTC)

Message Fields - (A&S) Initialization
- HP: Hidden Program
- CP: Checker Program
- R: Registration

Message Fields - (A&S) Run-time Reports
- PU(N): Number of Premium Users
- A(L): Attack Location

Message Fields - (A&S) Run-time Actions
- D/E: Disable/enable non-premium users
- LPU(N): Limit the Number of Premium users

SECURE LOGIC INTERLOCKING

RELATED APPLICATIONS

This application claims priority from the Provisional Patent Application with Ser. No. 60/365,148; entitled, "BEST EFFORT LINEARIZATION OF TCP PACKET FLOWS," filed Mar. 16, 2002.

FEDERALLY SPONSORED RESEARCH OR DEVELOPMENT

Not Applicable.

BACKGROUND OF THE INVENTION

The Internet success is the result of the IP architecture's robustness, flexibility, and ability to scale, and NOT the result of its efficiency, optimization, security, fine-grained control or performance guarantees. Furthermore, TCP/IP data networks are still suffering from some basic (quite inherent) problems, e.g., denial of service attacks and unstable throughput.

FIELD AND CONTEXT OF THE INVENTION

The field of the invention is assuring trusted operation which is guaranteed and validated by the underlying methods and systems. In particular assuring trusted flow of communications, and more specifically, making sure that the end stations and users of a computer network operate correctly under a given and known rules of transmissions, even though protocols, methods and software logic is typically available to users of such networks. Trusted operation means an operation which performance complies with its allowed and defined specifications.

This will assure network elements that stations perform their task as known and as determined by a service agreement. It will assure servers in networks that users are behaving properly and are not over using resources beyond the allocated and allowed parameters. The mechanisms involve signaling and allow piggybacking of proper signals for various purposes, e.g., authentication of stations and users. The mechanisms involve communication network software, communication network operation, control and management. They further involve cryptographic systems and functions and software transformation, e.g., obfuscation operation. They involve computing hardware and software systems.

In general, the underlying mechanisms assure that a "combined functionality" is taken place at a computing system; part of this "combined functionality" is a crucial function of the underlying computing system, whereas some other part of this "combined functionality" is a method to generate an unpredictable signal. The mechanisms make sure to interlock the parts into the combined functionality. The locking means that all parts must be performed. The operation part, which is factored into the "combined functionality" is trusted (and is typically associated with limitations, e.g., rate of operation or number of times before renewal of precondition for next sub-operation). The checking is done merely by being able to check the signal. If the signal passes the check, it means that the other (operation) part was performed as well (thus, it was performed subject to the associated limitation, namely as a trusted one).

The operation involves a trusted flow of packets (or other units of communication fields), the flow is associated with rules of transmission. For example, a TCP connection is associated with a window size that allows maximum number of transmissions. A trusted flow implies that the end station conforms to the allocated window size. However, there is no way to impose on users and end stations to comply with the assumed parameters, and be "trusted" since typically parameters can be easily changed.

One of the novel ideas behind our mechanisms is the "interlocking" of parts and insisting that one part will "signal" and its checking will assure compliance, by adding a checking function to validate signals. Thus, if a TCP program with the currently correct performance parameters (i.e., rules of transmission) is interlocked with a cryptographic pseudo-random generator (with a random seed), which output cannot be predicted, and if further the checker has a copy of the pseudo-random generator, then if further the output of the pseudo random generator is put on data packet headers, then if the headers are checked and their content matches the expected value from the generator, the checker concludes that the packet flow is "trusted."

The basic mechanism involves a system where the "combined functionality" is performed and one where it is checked. It also involves a communication system. It involves a software transformation module to assure the interlocking of the separate functions into a combined functionality, finally a management system assuming plurality of elements implementing the combined functionality is in the network.

BACKGROUND OF THE PRIOR ART

In traditional telephone networks the user of the telephone device cannot over burden the network with signals beyond the allocated circuit it gets. On the other hand, in software operations and thus in computer communication networks, a user gets access to the software in its station, the same software which is in charge of regulating the user himself. As a result, users can "control" the network rather than the network controlling the users.

Indeed, it is assumed that there is availability of logic (i.e., software) of methods for controlling communication and for preparation of data packets for transmissions. The description is given in numerous books: "Computer Networks" (3rd Edition) by A. Tannebaum, Prentice Hall, 1996; "Internetworking with TCP/IP" by D. E. Comer, Prentice-Hall, Third Edition, 1995, ISBN 0-13-216987-8; and "TCP/IP Illustrated, Vol. 1: The Protocols" by W. R. Stevens, Addison-Wesley, Reading, Mass. 1994.

Known in the art, are certain methods to try to detect users' misbehavior and to react to them. Firewalls, intrusion detection methods, data packet filtering, connection dropping are methods to react to user over flooding the network, they are "reactive". See the following references: "Building Internet Firewalls" (2nd Edition) by Elizabeth D. Zwicky, Simon Cooper, D. Brent Chapman, Deborah Russell; Publisher: O'Reilly & Associates; ISBN: 1565928717; 2nd edition (Jan. 15, 2000). "Internet Security: Professional Reference" by Derek Atkins (Editor), Paul Buis, Chris Hare, Robert Kelley, Carey Nachenberg; New Riders Publishing; ASIN: 1562055577; Bk&Cd-Rom edition (February 1996).

Mechanisms for the avoidance of misbehavior by having a user and an end station use trusted software and signal that they use it to a checker are not known in the art. We are not aware of a method that further assures that the user cannot replace the trusted software and continue to signal correctly. We are not aware of means to identify "trusted flows" as a unique and separate stream of communication, which may deserve a better class of service, though class of service are known in the art and are used differently. Such a method allows one to assure that trusted flows continue to be transmitted while using traditional reactive methods against the non 4trusted flow.

Our methods use cryptographic functions, e.g., pseudo random generation, random bits generation, authentication, signature, and encryption. Such methods of varied level of security and efficiency are known in the art, in software packages and in hardware devices. We can employ them as needed in accordance with the present invention. We do not assume any invention of any of the underlying cryptographic technique employed at different steps and different mechanisms herein. A security professional familiar with the art, will be able to use the cryptographic functions and tools and embed them in accordance with the present invention. Such mechanism are described in "Applied Cryptography: Protocols, Algorithms, and Source Code in C," 2nd Edition by Bruce Schneier, Publisher: John Wiley & Sons; ISBN: 0471117099; 2 edition (Oct. 18, 1995) and in "Handbook of Applied Cryptography" (CRC Press Series on Discrete Mathematics and Its Applications) by Alfred J. Menezes, Paul C. Van Oorschot, Scott A. Vanstone (Editor); Publisher: CRC Press; ISBN: 0849385237; (October 1996).

Same is true for underlying devices, we can employ such devices as smart cards and other portable devices (USB connection based, wireless devices with radio frequency, laser connection, etc.)—a security engineer familiar with the art and the common practice will be able to employ these elements and embed them in accordance with the present invention.

The method uses hidden programs. One method to hide programs is software obfuscation transformations. Methods and techniques for obfuscation are also known in the art. They modify the "look" of the software logic, but maintain its "semantics" (or meaning). They are analogous to compiling a program in high level language code to a program in "object code" or "machine code" which performs the same task but is not readable to most of users. They make the software "unreadable" and "non-modifiable". We do not invent any underlying basic code obfuscation methods. In fact, there are various methods in the art applied to the currently most useful programming languages. The methods take a software program (say in Java language) and return another program (in Java as well) which performs the same task and approximately with the same performance. Yet, the second program is hard to read and understand. The art of program obfuscation, including all transformations on data, variables, names, control structure, etc., are given in a number of papers considered the state of the art by C. Collberg C. Thomborson and D. Low: 'Manufacturing Cheap, Resilient and Stealthy Opaque Constructs," ACM's POPL 1998, pages 184-196; and "Watermarking, Tamper-Proofing, and Obfuscation—Tools for Software Protection," by Collberg, Thomberson and Low, technical report University of Arizona to be published in IEEE Transactions on Software Engineering 2002; and "A Taxonomy of Obfuscation Transformation," by C. Collberg, technical report number 148, University of Arizona.

Additionally, Valdez and Yung describe how to add encryption operation and program distribution to obfuscation in: "Software DisEngineering: Program Hiding Architecture and Experiments," by E. Valdez and M. Yung, Information Hiding 1999, pages 379-394, Springer Verlag Lectures in Computer Science; and "SISSECT: DIStribution for SECurity Tool," by E. Valdez and M. Yung, ISC 2001, pages 125-143, 2001 Springer Verlag Lectures in Computer Science LNCS2200, respectively. Note that the embedding of programs inside tamper proof devices and hiding encrypted programs are also known in the art (e.g., as part of cryptographic co-processors).

In accordance with the present invention, a combination of the above techniques can be utilized.

Note that hidden programs have been traditionally employed to hide the logic of the software. They have been used in hiding cryptographic programs (e.g., in a tamper proof device) so that the operation is not observable or modifiable. They have been further used to enforce certain operation associated with content distribution and electronic commerce, assuring that such notions like digital payment and protecting of content are run in an environment that is not modifiable by the user. Again, the notion of use is against modification of the working environment.

Unlike the use of hiding and obfuscation of programs for the sake of software protection, the present invention does not hide the "semantics of the program" from the user. In fact, the specification and performance parameters can be publicly known—the goal is, in turn, an integrity function, where the goal is for users not to be able to change the operation software (that performs data packet transmission) while retaining correct signaling.

In accordance with the present invention, what is needed is a mechanism that combines many programs together so that they are inseparable. In this sense, hidden programs are merely a means to get a method of "interlocking mechanism" where known (rather than unknown) programs and perhaps hidden parameters (hidden) are combined into a unique functionality and are inseparable. The interlocking involves putting together a set of "well behaved" programs with correct and agreed upon parameters with a continuous mechanism for signaling, and associating the signaling checker with a method that assures good behavior of the continuous flow. What is new is that we involve system programs, which are commonly known, programs that perform packet generation and performance parameters and even known cryptographic programs with hidden parameters.

In accordance with the present invention, a method is utilized by which it is impossible via hidden programs to execute parts of the combined functionality separately with a malicious non-trusted part replacing another part of the combined functionality, rather than a method of hiding the logic and its semantics.

In accordance with the present invention, a mechanism is provided for checking component for the signals, as well as a combined communication system mechanism for handling the trusted flow coming from station that use the combined functionality. This will give network elements that can assure trusted traffic is generated in a trusted fashion and further is validated.

In accordance with the present invention, methods and systems are also provided which employ the elements above in a combined network and that will manage, renew and tune the elements, and methods for dynamically changing hidden program and parameters and for renewing preconditions can be utilized as well. Finally, what is needed is a method for generating and distributing the combined functionality logic modules, a mechanism for safe integration of separate known logic modules to the combined functionality logic.

SUMMARY OF THE INVENTION

The present invention relates to assuring that an ongoing operation within computing systems is performed according to a specification and in particular it relates to a method and system for ensuring that sources that are sending data packets will do it according to a well-defined, specified, and expected behavior. Specifically, in one embodiment of the disclosed method and system ensures that the various programs that are used in sending data packets from various sources into and across the various networks, are operating according to predefined rules in accordance with what, data packets and traffic patterns, the various networks expect to receive, forward and support.

Another embodiment of the present invention, when put in the context of the Internet protocols, facilitates the realization of a new type of IP (Internet protocol) VPN (virtual private network). Such VPN generates and sends data packets with security tag vectors over IP (Internet protocol) VPN (virtual private network) connection through a network interface. Such a network interface can be realized as part of: a firewall, a classifier for a class of service (CoS) access control to IP network, and policer as part of a differentiated services (DiffServ) access control to IP network, while mapping data packets with verified security tag vectors to premium services. Note that premium services are defined, for example, by CoS and DiffServ. Consequently, the data packets that are generated and sent from a potentially non-trusted computing environment at the end station are, in fact, Lobe trusted once the respective security tag vectors have been verified.

In accordance with one aspect of the present invention, VPN connections (trusted connections) are created by employing a trusted flow generator (TFG) and a trusted tag checker, as specified herein.

One embodiment of the present invention, herein in the Internet context, allows the network to verify and authenticate the proper operation of the TCP layer implementation on the users' terminals; wherein a plurality of applications transmit and receive data units to and from other pluralities of applications through an interface layer named socket layer. The socket layer translates requests to send data units by each of the plurality of applications into requests TCP_Send to a Trusted TCP Code for sending sequences of bytes to a remote end station. This further facilitates the authentication and metering of window flow control and other programs used to send data packets over the Internet. Such operations can be implemented in a firewall. The firewall will make sure that a specified version of a program is running when implementing a protocol. This is a very strong integrity function, which assures the proper usage of (proper versions of) programs.

In remote monitoring of programs, typically a measure is inserted inside an obfuscated version of the program (the program sends signal which indicate its usage, namely number of times it runs, and other issues of compliance with metering of usage). However, what we teach here is a mechanism by which a program signals to the firewall in a way that the local user cannot modify it (due to obfuscation, encryption and other hiding methods which create interlocking of the program sub-tasks in a manner which is hard to reverse engineer).

The "subliminal" or "invisible" messages sent from the correct program are not necessarily visible to or easily interpreted the user, but are well suited for interpretation at the firewall. If the interpretation of signals is valid, it means that indeed the user employs the right software (program) when running the packet generation (TCP) protocol. This integrity of software via the produced signals and their interpretation at the firewall assure the integrity of the software running the protocol remotely. Then according to the result of the validity check, the firewall can decide to serve or to drop service or to classify class of service to the messages coming from this version of the protocol at the end-point.

The firewall is in the middle of the transmission and can act based on the signaling from the originating software. This constitutes a secondary channel for control of software usage within an installation. This is a novel usage of metering and signaling methods. It is based on a hidden program part of an obfuscated program which is hard to reverse engineer; this part may involve hidden parameters (a seed for a cryptographic pseudo random generator) which generates part of the signal. This mechanism for monitoring remotely actual usage of software which produces unpredictable signals, can be applied to communication protocols, operating systems procedures, and many other software system where a remote function (the firewall) checks the integrity of software usage remotely, and where the firewall can further act based on its finding and react or control the system based on the validity of the checking of the signal.

Furthermore, in more generality, an objective of the present invention is to ensure that programs and other units running software logic that generate and send data packets, are well behaved.

The present invention further provides a method and system that consist of an end station and a network interface, such that, the network interface is capable of determining the authenticity of the program used by the end station to generate and send data packets. The method is based on using a hidden program that was obfuscated within the program that is used to generate and send data packets from the end station.

In another embodiment of the present invention, the hidden program is updated dynamically and it may include the functionality for generating a pseudo random sequence of security signals. Only the network interface knows how the pseudo random sequence of security signals were generated, and therefore, the network interface is able to check the validity of the pseudo random sequence of security signals, and thereby, verify the authenticity of the programs used to generate and send data packets.

This method is based on using a hidden program that was obfuscated and encrypted within the program that is used to generate and send data packets from the end station. The hidden program is updated dynamically and it includes the functionality for generating a pseudo random sequence of security signals. The method further comprises of means for coordinating the initialization of the end station and network interface.

Another embodiment of the present invention, involves secure integration of separate software modules into a combined functionality. This embodiment provides a method and system for processing logic modules, each having a separate functionality, into a unique functionality that is to be executed in an interlocked mode as a unique functionality. The method is based on taking logic modules (programs and data) with known functionality and transforming them into a hidden program by integrating modules to execute together into a logic which is partially obfuscated and/or encrypted and/or physically hidden. The hidden program is updated dynamically to strengthen it against reverse engineering efforts. The program includes the functionality for generating security signals, which are unpredictable by observers, e.g., a pseudo random sequence of security signals. Only elements that share the means for producing the security signals can check their validity. The modules include operational tasks and performance parameters for this operation. The operation can be transmission of data packets with given parameters of performance that the hidden program contains. The generated security signals thus assure that the correct operation was taken place and can be used to signal various cryptographic parameters as well.

Yet another embodiment of the present invention, further provides a method and system for detecting and reacting to unexpected communications patterns. The system consists of a plurality of end stations and a plurality of network interfaces, such that, the network interface is capable of determining the authenticity of the program used by the end station to, generate and send data packets. The system further consists of a plurality of secure management servers, which continuously exchange management messages with the network interfaces. Consequently, the secure management servers have the information for detecting unexpected communications patterns. The method allows the control of end stations, and when an unexpected communication pattern is detected then selectively, only packets from authenticated programs are allowed to be transmitted.

BRIEF DESCRIPTION OF THE DRAWINGS

FIG. 14 is a description of a plain program components with well-behaved operational program with defined rules of transmission, security tag vector (STV) generator, parameter table, and control program;

FIG. 23 is a description of the various messages exchanged among the TTCs and SMSs for detecting unexpected communications patterns and the various possible responses messages when detecting such pattern;

DETAILED DESCRIPTION OF THE PREFERRED EMBODIMENT

Figure 1:
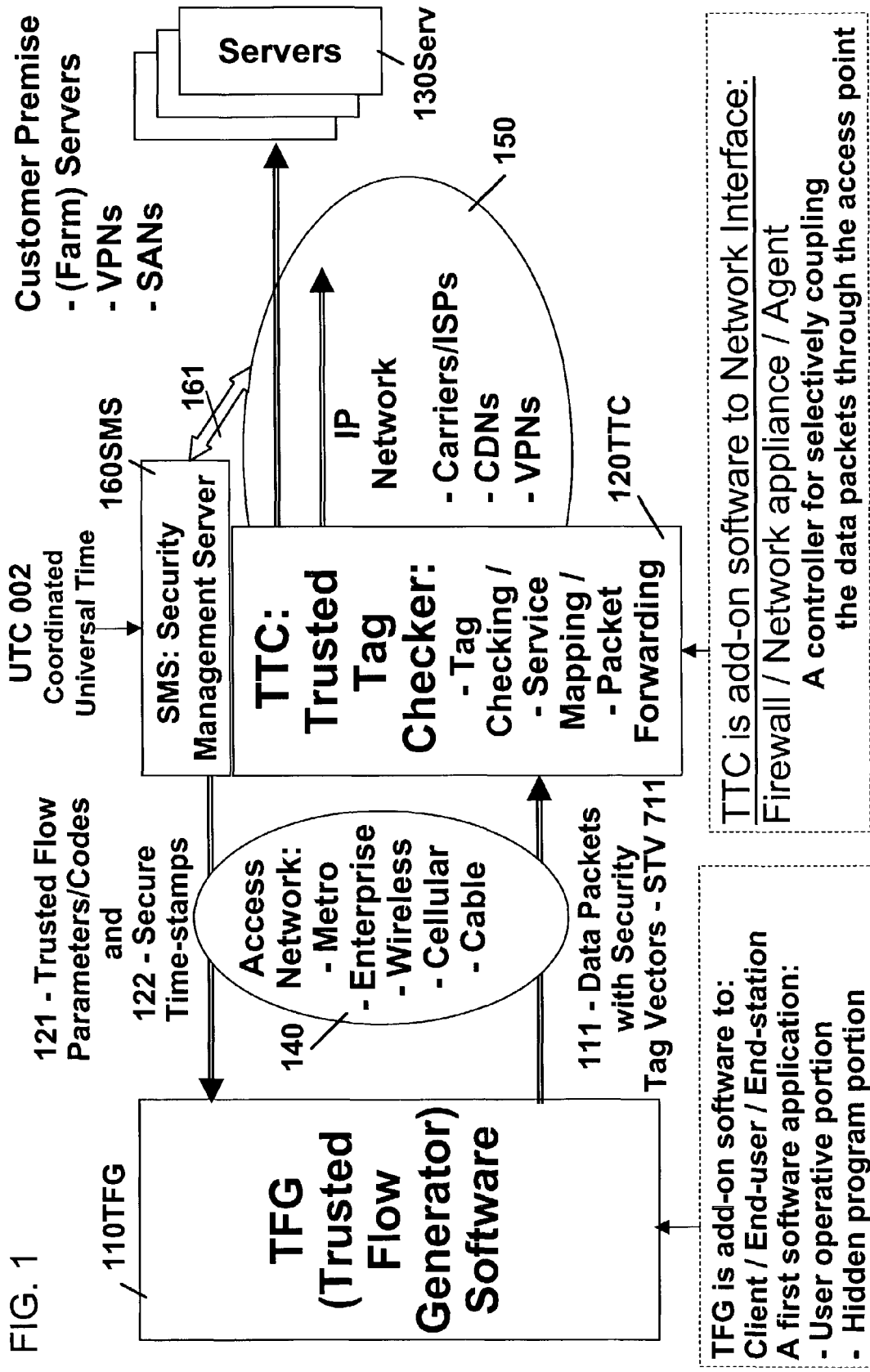
FIG. 1 is a functional illustration of a system that consists of an end station with a trusted flow generator (TFG) that sends data packets with security tags through a network interface (NI) with a trusted tag checker (TTC), such that, the ITC is capable of determining the authenticity of the program used by the end station to generate and send the data packets.

While the present invention is susceptible of embodiment in many different forms, there is shown in the drawing, and will be described herein in detail, specific embodiments thereof with the understanding that the present disclosure is to be considered as an exemplification of the principles of the present invention and is not intended to limit the present invention to the specific embodiments illustrated.

The present invention relates to a method and system for ensuring that sources that are sending data packets will do so according to a well defined and expected behavior. Specifically, the methods and systems of the present invention ensure that the various programs which are used to send data packets from various sources into and across the various networks, are operating according predefined rules in accordance with data packets and traffic patterns, that the various networks expect to receive, forward and support.

In accordance with the present invention, a general protocol is defined between the sources and a network interface, as shown in FIG. 1, wherein the source contains a program for generating and sending data packets called Trusted Flow Generator or TFG 110TFG and the network interface contains a program called Security Tag Checker or TTC 120TTC for receiving and checking data packets. The data packet that is sent by TFG 110TFG contains Security Tag 111, which is part of the data packet header or part of the data packet payload. In general, TFG 110TFG does not have to attach the Security Tag 111 to every data packets, but only to predefine selected ones. The data packets that are sent between the source and the network are sent across an access network 140, e.g., a metro network, an enterprise network, a wireless network, and a cellular network.

In some embodiments of the present invention, the network interface has the capability of sending to the TFG 110TFG certain operation and performance information, e.g., Trusted Flow Parameters and Codes 121 and Secure Time-stamps 122, as shown in FIG. 1. In some embodiments of the present invention, the source of the Secure Time-stamps sent to 110TFG is UTC (Coordinated Universal Time a.k.a. GMT) 002. Furthermore, the TFG 110TFG for the generation of the Security Tag 111 can be responsive to at least one of the Trusted Flow Parameters and Codes 121 and Secure Time-stamps 122. Consequently, the control of the TFG 110TFG operation is with the network interface.

The network interface with its TTC 120TTC can be located in various places in the system, e.g., at the boundary of the carrier/ISP network 150, between different carrier/ISP networks, across the carrier/ISP networks 150 next to servers 130Serv and across the carrier/ISP networks 150 next to: enterprise networks, virtual private networks (VPNs), storage area networks (SANs), content delivery networks (CDNs).

The data packets are sent with Security Tags 111—wherein each has a size of at least one bit of information. The sequence of values of the Security Tags 111 that are generated by the TFG 110TFG is hidden in the TFG 110TFG program in a manner in which the user of the program does not know in advance what it is. Only the TTC 120TTC knows how to generate the sequence of values of the Security Tags 111 in order to check and verify that the received sequence of data packets are to be trusted.

Other embodiments of the present invention further comprise a Security Management Server or SMS 160SMS, which is used for managing the operations of TFG 120TFG and TTC 120TTC. The SMS is connected to TFG and TTC via bi-directional communications link 161, as shown in FIG. 1.

Figure 2:
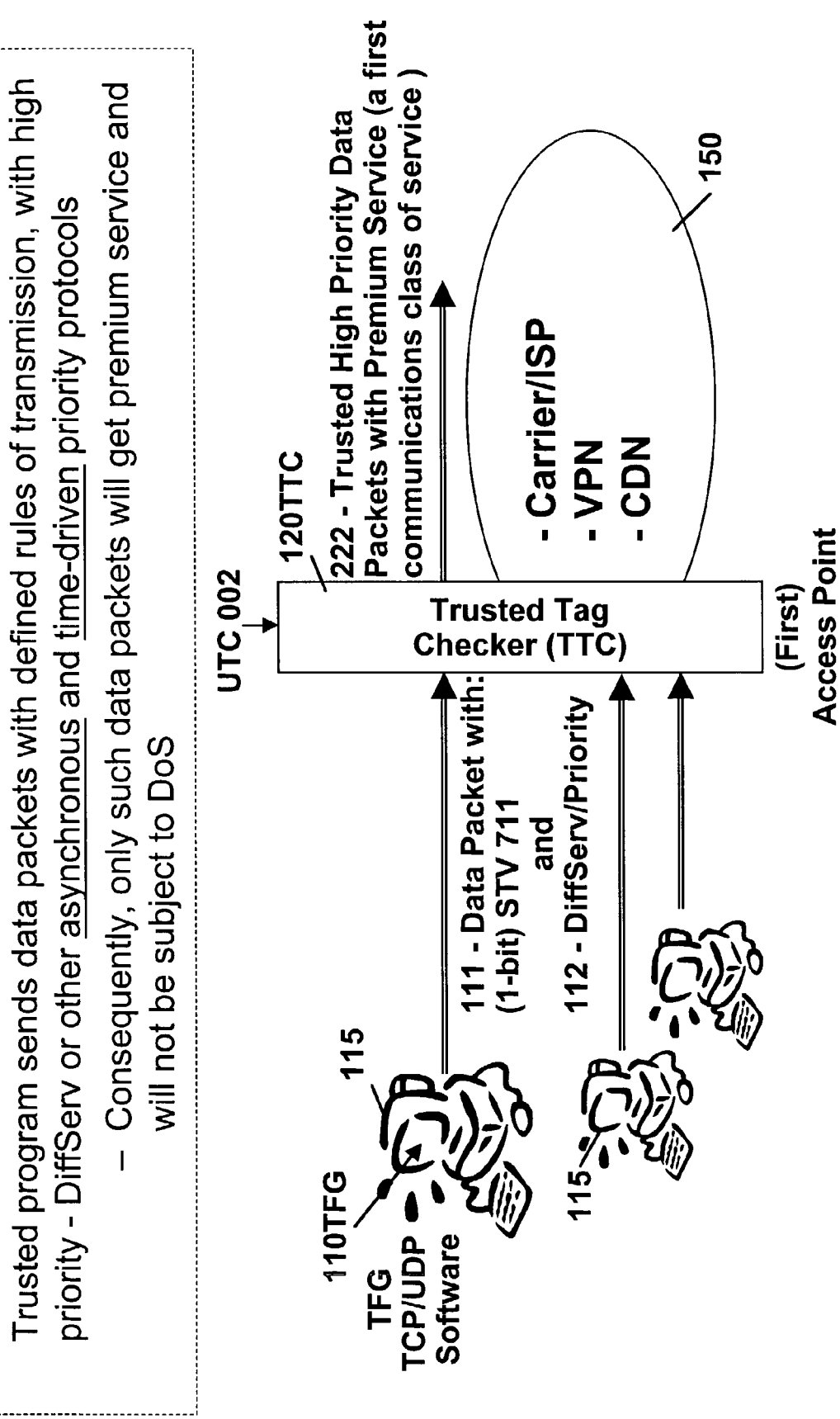
FIG. 2 is a functional illustration of a system that consists of an end station with a trusted flow generator (TFG) that is part of the TCP/IP and UDP programs used for sending data packets with security tags through a network interface (NI) with a trusted tag checker (TTC), such that, the TTC is capable of determining the authenticity of the TCP/IP and UDP programs used by the end station to generate and send the data packets.

FIG. 2 shows a specific setting of the TFG 120TFG inside an end-user computer 115. This computer 115 can located in a plurality of places, e.g., a desktop, a workstation, and/or a mobile device—cell phone. FIG. 1 and FIG. 2 further specify another functionality for the TTC 120TTC program, that data packets that were successfully checked by TTC will be sent as into the network or to the server with high priority data packets with premium service 222. Such data packets will not be adversely affected by a lower priority traffic. This will enable networks and servers to differentiate, for example, between data packets that were sent from trusted TCP/UDP program, from TFG 110TFG, and data packets that were sent from an untrusted TCP/UDP program. Trusted data packets, will receive high priority by using various priority protocols, e.g., DiffServ, and time-driven priority. Consequently, data packet flows associated with trust data packets will not be subject to denial-of-service (DoS) attacks.

FIG. 2 further illustrates static operation of TFG 120TFG, namely without receiving any Trusted Flow Parameters/Codes 121 and Secure Time-stamps 122 from the network interface. This mode of operation is suitable, for example, when TFG 120TFG is running TCP/IP where its execution parameters are predetermined. However, under different execution scenarios TCP/IP will require to receive at least one of the Trusted Flow Parameters/Codes 121 and Secure Time-stamps 122.

Figure 3:
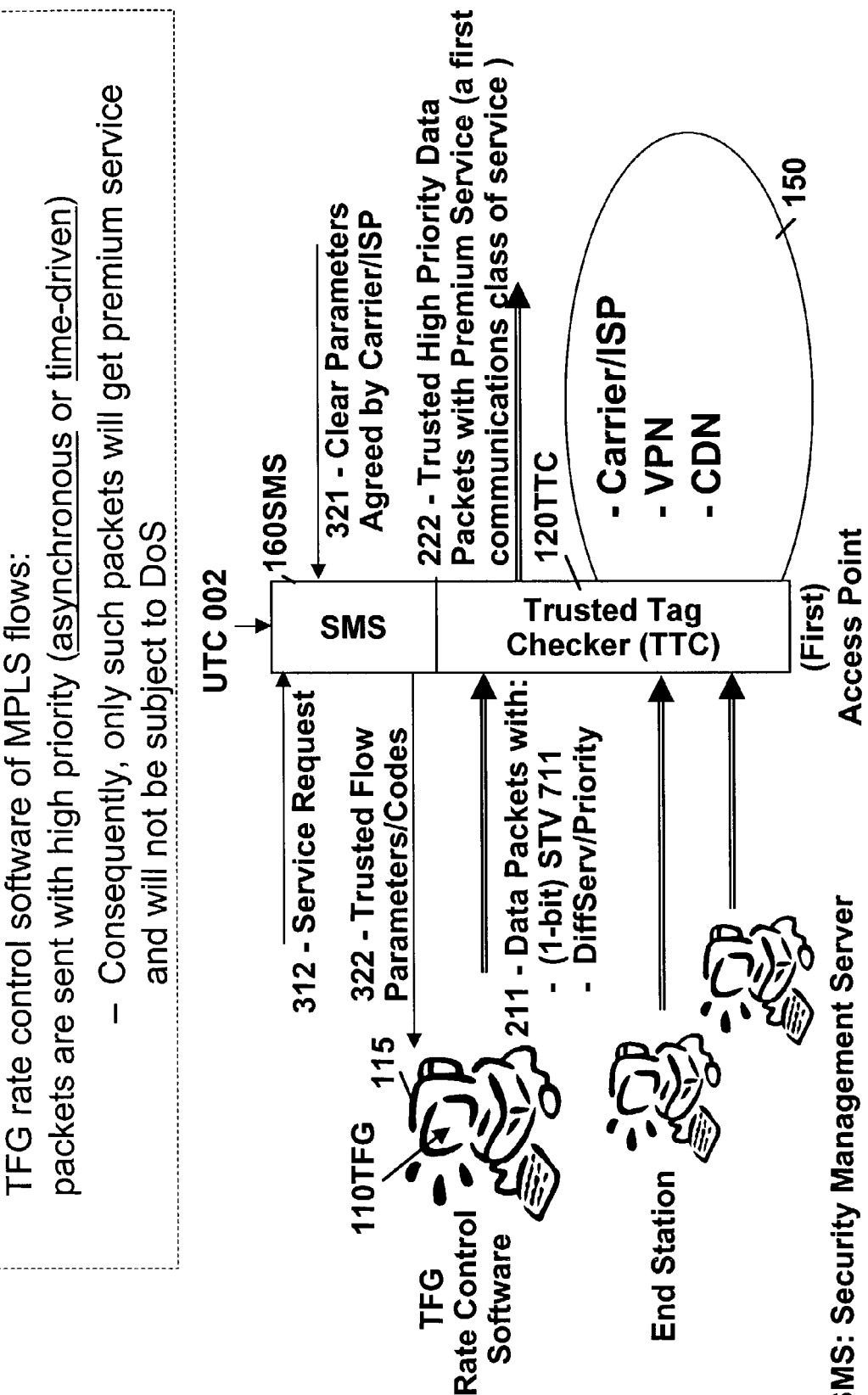
FIG. 3 is a functional illustration of a system that consists of an end station with a trusted flow generator (TFG) that is part of rate control software with predefined parameters used for sending data packets with security tags through a network interface (NI) with a trusted tag checker (TTC), such that, the TTC is capable of determining the authenticity of the rate control software used by the end station to generate and send the data packets.

FIG. 3 illustrates a specific setting where the TFG 120TFG program is dynamic and is responsive to some connection oriented settings. This mode of operation corresponds, in some embodiments, to using MPLS (Multi protocol Label Switching) and GMPLS (Generalized Multi protocol Label Switching). In this embodiment, the end-user sends a Service Request 312 to the network interface which then sends back Trusted Flow Parameters/Codes 322 to the TFG 120TFG program specifying the kind of service the user has received, for example, with rate control parameters—maximum transmission rate and average transmission rate. The Trusted Flow Parameters/Codes 322 can be provided to the network interface as Clear Parameters Agreed by Carrier/ISP 321.

Each controller, generator, checker and other devices that are used to send and receive data packets and messages, in the context of the preferred embodiment herein, can be realized in various ways, e.g. (but not limited to): (1) software code, (2) dedicated hardware, (3) Java applet, and (4) utilizing a combined: (i) central processing unit (CPU) (ii) memory for storing data packets and messages, and (iii) memory for storing various processing and control programs.

Figure 4:
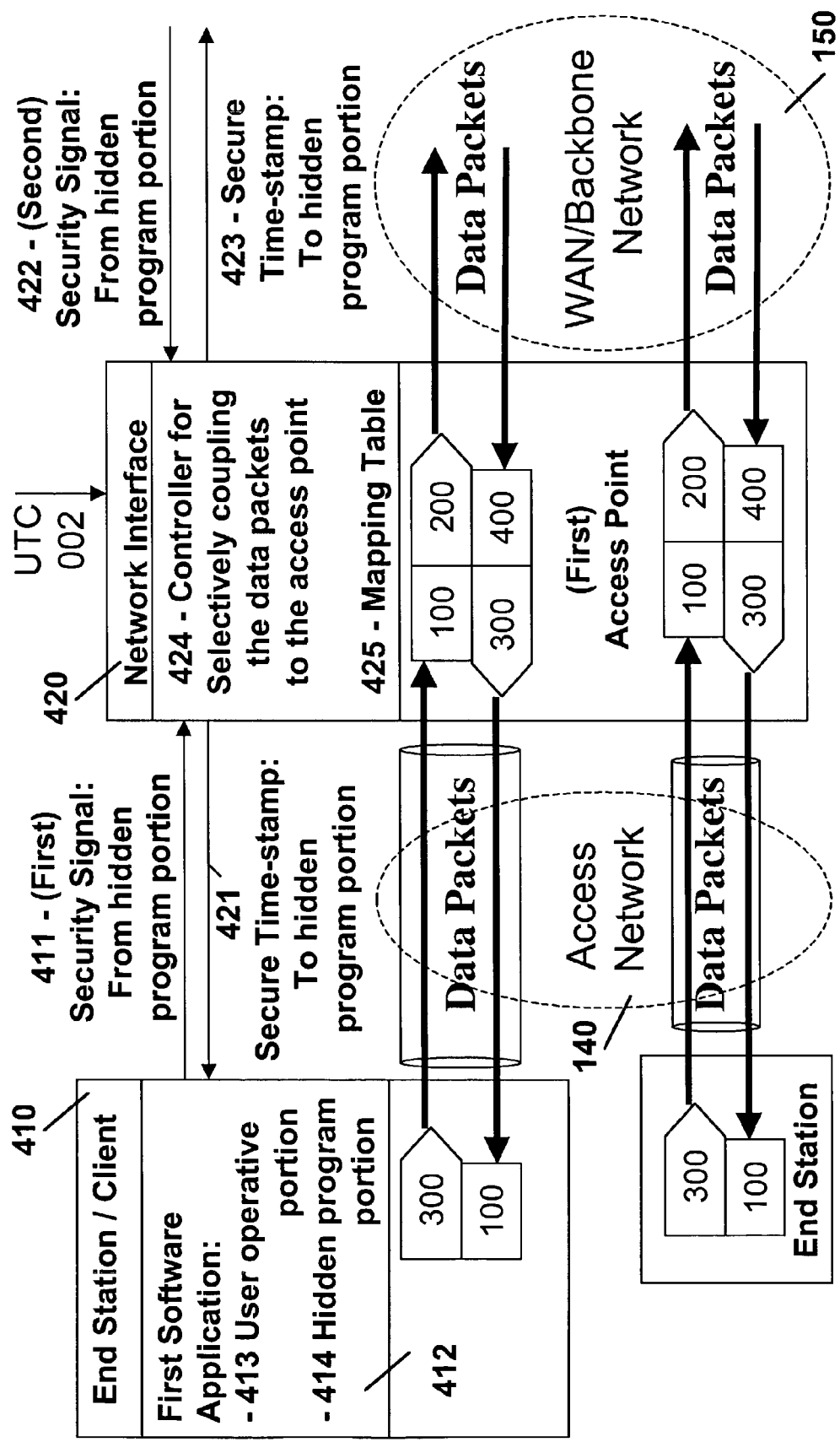
FIG. 4 is a schematic illustration of a security system that authenticates the window flow control protocol, the system includes a controller for selectively coupling the data packets to the data network through an access point.

Hidden Program:

In another embodiment of the present invention, as shown in FIG. 4, the client software at the end station 410 consist of a first software application 412 with two parts:

(1) User operative portion 413, and
(2) Hidden program portion 414.

In this embodiment, the hidden program portion 414 sends (first) security signal 411 to the controller for selectively coupling the data packets 424 to the network interface 420, wherein the network interface function as an access point to the WAN/Backbone Network 150. The coupling operation is performed responsive to the security signal 411, wherein the security signal 411 is part of the data packet. The data packets are sent by the user operative portion 413 in the first software application 412. The data packets that are sent from/to end station 410 to/from the network interface 420 are transferred through an access network 140, as shown in FIG. 4.

In FIG. 4 the controller for selectively coupling the data packets 424 verifies that only data packets with the right security signals 411 are forwarded to the WAN/Backbone Network 150.

In another embodiment of the present invention, the controller for selectively coupling the data packets 424 sends secure time-stamps 421 to hidden program portion 414, wherein the secure time-stamps 421 are uniquely used by the hidden program portion 414 in order to uniquely generate the security signals 411, as shown in FIG. 4. Only data packets with the right security signals 411 that were generated responsive to the secure time-stamps 421 are forwarded by the controller for selectively coupling the data packets 424 to the WAN/Backbone network 150. The secure time-stamps 421 are derived, in some embodiments, from UTC (coordinated universal time) 002 and in some other cases the secure time-stamps 421 are locally generated.

The controller for selectively coupling the data packets 424 has the optional capability, in some embodiments, to send a (second) Secure Time-stamp 423 to a (second) controller for selectively coupling the data packets 424 across the WAN/Backbone Network 150 in order to coordinate the operation of the two controllers for selectively coupling the data packets 424. Consequently, for example, data packets generated by the first software application 412 can be checked by the (second) controller for selectively coupling the data packets 424.

In another embodiment, shown in FIG. 4, the controller for selectively coupling the data packets 424 can receive a (second) security signal: from a hidden program portion 422 of a second software application 412 in order to enable the controller to selectively couple data packets 424 and to forward data packets generated by the first software application 412.

Figure 5:
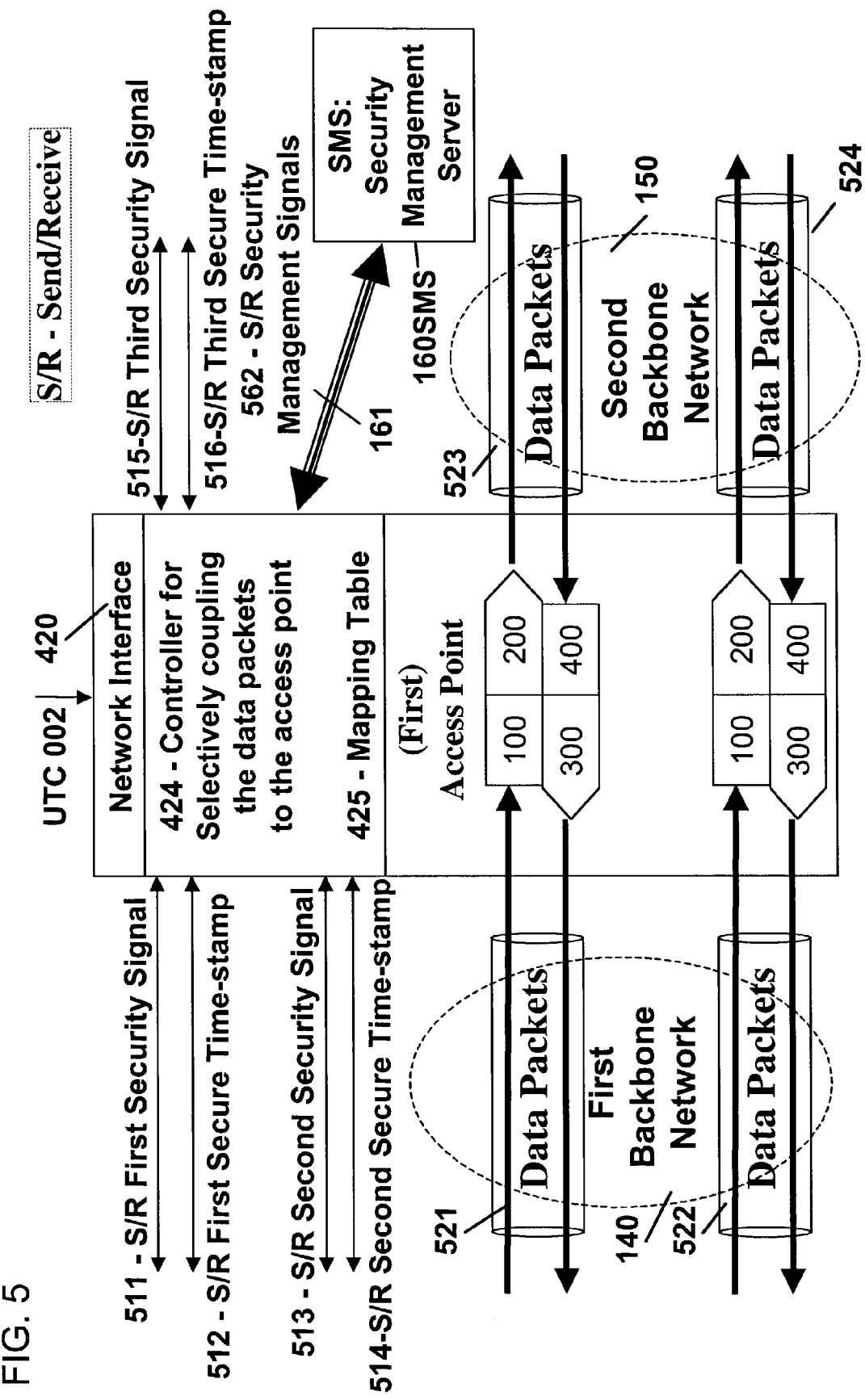
FIG. 5 is a schematic illustration of a bi-directional security system that authenticates the window flow control protocol, wherein data packets are flowing in one direction and acknowledgement signals are flowing in the other direction, the system includes a controller for selectively coupling the data packets to the data network through an access point.

FIG. 5 illustrates a general operation of the controller for selectively coupling the data packets 424 that can send and receive (S/R) security signals and S/R secure time-stamps; specifically, to S/R: First Security Signal 511, S/R Second Security Signal 513 and Third Security Signal 515, and to S/R: First Secure Time-stamp 512, Second Secure Time-stamp 514 and Third Secure Time-stamp 516. The data packets forwarding operations over multiple communications links: 521, 522, 523, and 524, are utilized by the controller for selectively coupling the data packets 424 is responsive to the security signals and secure time-stamps it receives.

In some embodiments, as illustrated in FIG. 5, the method comprises a Security Management Server (SMS) 160SMS, which is used for managing the operations of the controller for selectively coupling the data packets 424. The information exchanged via the, S/R (send and receive) Security Management Signals 562 are used by the controller for selectively coupling the data packets 424 sending operations of the security signals and secure time-stamps; and the data packets forwarding operations over multiple bi-directional communications links: 521, 522, 523, and 524.

The communications control system that is shown in FIG. 4 and FIG. 5 is comprised of plurality of access points 420 that function as network interfaces for coupling data packets to a WAN/Backbone network 150. The end station/client 410 includes a first software application comprising a user operative portion 413 and a hidden program portion 414, for selectively sending data packets for transmission through the access point 420. The access point 420 includes a controller for selectively coupling the data packets to the access point 424 responsive to the hidden program portions 414. The secure coupling of the data packets to the access point 424 is performed by attaching a security signal 411 to each data packet by the hidden program portion 414 of the first software application at the end station.

The security signal 411 representative of the hidden program portion is coupled to the controller 424 for enabling the coupling of associated ones of the data packets after the controller 424 verifies the correctness and integrity of said security signal 411. Consequently, the security signal 411 authenticates the first software application. The security signal 411 can have one of a plurality of functional representations, e.g., a digital signature derived from at least one of the associated ones of the data packets and representative of the hidden program portion 414.

The access point, shown in FIG. 4, couples a secure time-stamp 421 to the hidden program portion 414. The secure time-stamp 421 is used in the generation procedure, generating the security signal by the hidden program portion 414 of the first software application. The secure time-stamp 421 is generated at the network interface 420 responsive to the UTC (Universal Coordinated Time) signal. The UTC signal can be used for the generation of a digital signature in the hidden program portion 414 that is then used for the generation of the security signal 411.

Figure 7:
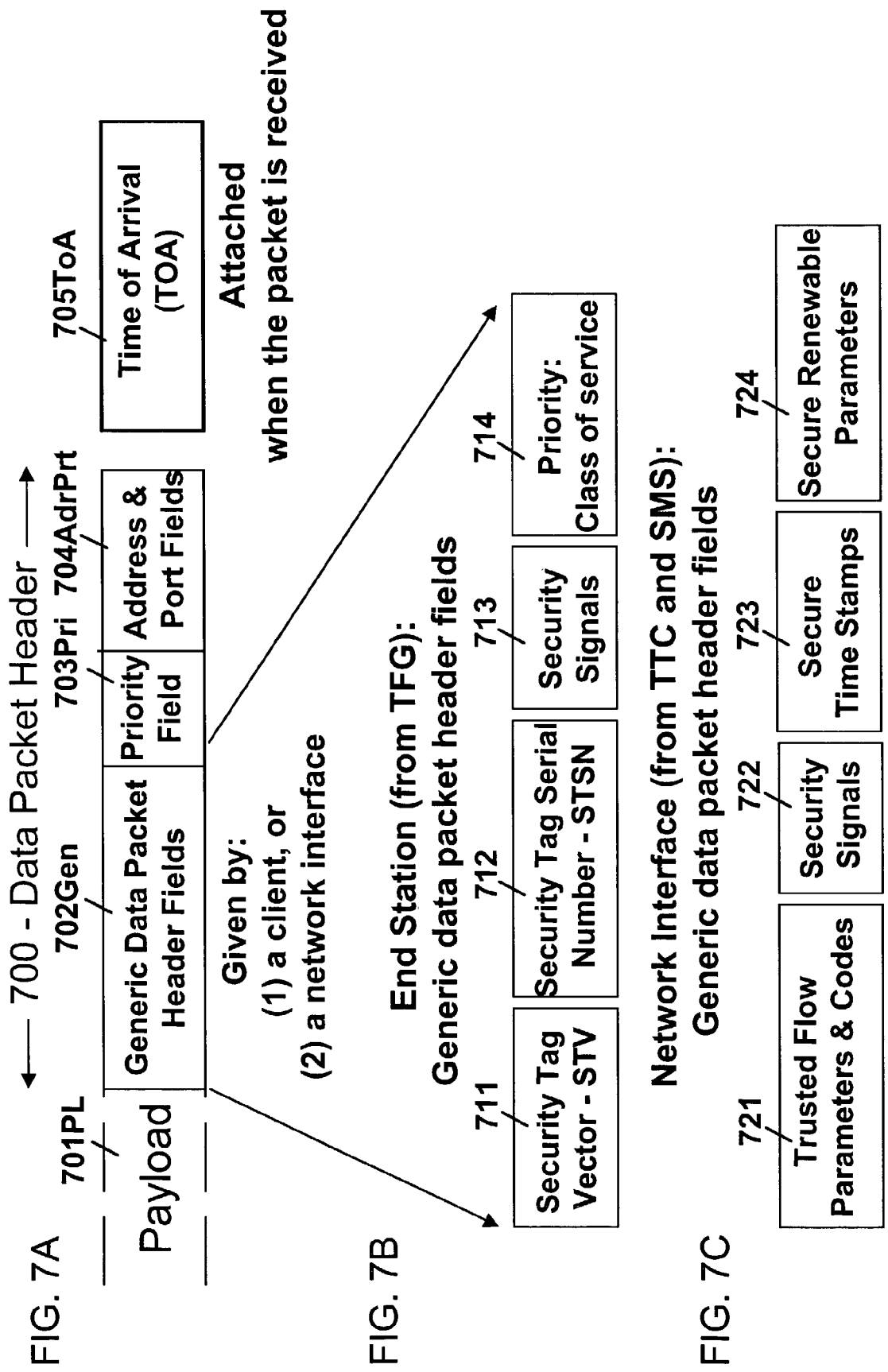
FIG. 7A is a description of a data packet structure that consists of a header and a payload portions, such that, the header portion consists of priority field, address and port fields, and various generic data packet header fields.
FIG. 7B is a description of the generic data packet header fields used by the end station with its trusted flow generator (TFG)
FIG. 7C is a description of the generic data packet header fields used by the network interface with trusted tag checker (TTC) and security management system (SMS)

The network interface also includes a mapping table 425 that is used by the controller for selectively coupling 424 for associating the data packets with a priority class responsive to the security signal. Data packets, as shown in FIG. 7, are comprised of a header portion 700 and a payload portion 701PL. The security signal 411 and the secure time-stamp 421 are part of at least one of the header portion and the payload portion. The data packet header portion further comprises a priority class. The priority class is defined in accordance with at least one of the following: differentiated services, DiffServ, IEEE 802.1p, class of service (CoS), time-driven priority.

The data packet header 700 further comprises of a flow identification (ID) as part of the data packet header address and port fields 704AdrPrt. The flow ID is associated with at least one entry in the mapping table 425, wherein the content of the selected entry of the mapping table 425 determining a priority class. The controller for selectively coupling 424 is responsive to the priority class and the security signal 411 for determining how to forward the data packet, for example: the data packet can be forwarded with high priority, the data packet can be forwarded with premium service, the data packet can be forwarded with low priority, and the data packet can be discarded.

As illustrated in FIG. 5, the network interface 420 that is the first access is used for coupling data packets between first backbone network 140 and second backbone network 150. The network interface sends and receives data packet over the first backbone network 140 over two data channels 521 and 522, and the network interface send and receive data packet over the second backbone network 150 over two data channels 523 and 524.

There are first software application and a second software application, each comprising: a user operative portion 413 and a hidden program portion 414, for selectively sending data packets for bi-directional transmission through the network interface 420 across first backbone network 140 and second backbone network 150; and over multiple data channels: 521, 522, 523 and 524. The data channels exchange data packets between the first software application and the second software application. The network interface 420 includes a controller for selectively coupling the data packets to the access point 420 responsive to the hidden program portions 414 of the first software application and the second software application that were transferred across the first backbone network 140 and second backbone network 150.

Each of the data channels: 521, 522, 523 and 524, as shown in FIG. 5, is associated with sending and receiving (S/R) security signals: 511 S/R first security signal, 513 S/R second security signal, and 515 S/R third security signal; and for S/R secure time-stamps: 512 S/R first secure time-stamp, 514 S/R second secure time-stamp, and 516 S/R third secure time-stamp.

The S/R first security signal 511 representative of the hidden program portion of the first software application and the S/R second security signal 513 representative of the hidden program portion of the second software application are selectively coupled to the controller for selectively coupling 424 of associated ones of the data packets to be transferred across the first backbone network 140 and second backbone network 150.

The S/R first security signal 511 authenticates the first software application, the S/R second security signal 513 authenticates the second software application, a third security signal 513 authenticates a third software application (not shown in FIG. 5).

In another embodiment of the present invention, the S/R first security signal 511 and the S/R second security signal 513 are digital signatures derived from the data packet headers and are representative of the hidden program portion 414 first software application and the second software application, respectively.

The access point 420 couples a secure time-stamp, 512, 514, and 516, to the hidden program portions of the first software application, the hidden program portion of the second software application, and the hidden program portion of a third software application. Then, the security signals, 511, 513, and 515, respectively, are selectively generated responsive to the secure time-stamp, 512, 514, and 516, and the hidden program portions. The secure time-stamps, 512, 514, and 516, are generated responsive to the UTC (Universal Coordinated Time) signal.

Figure 6:
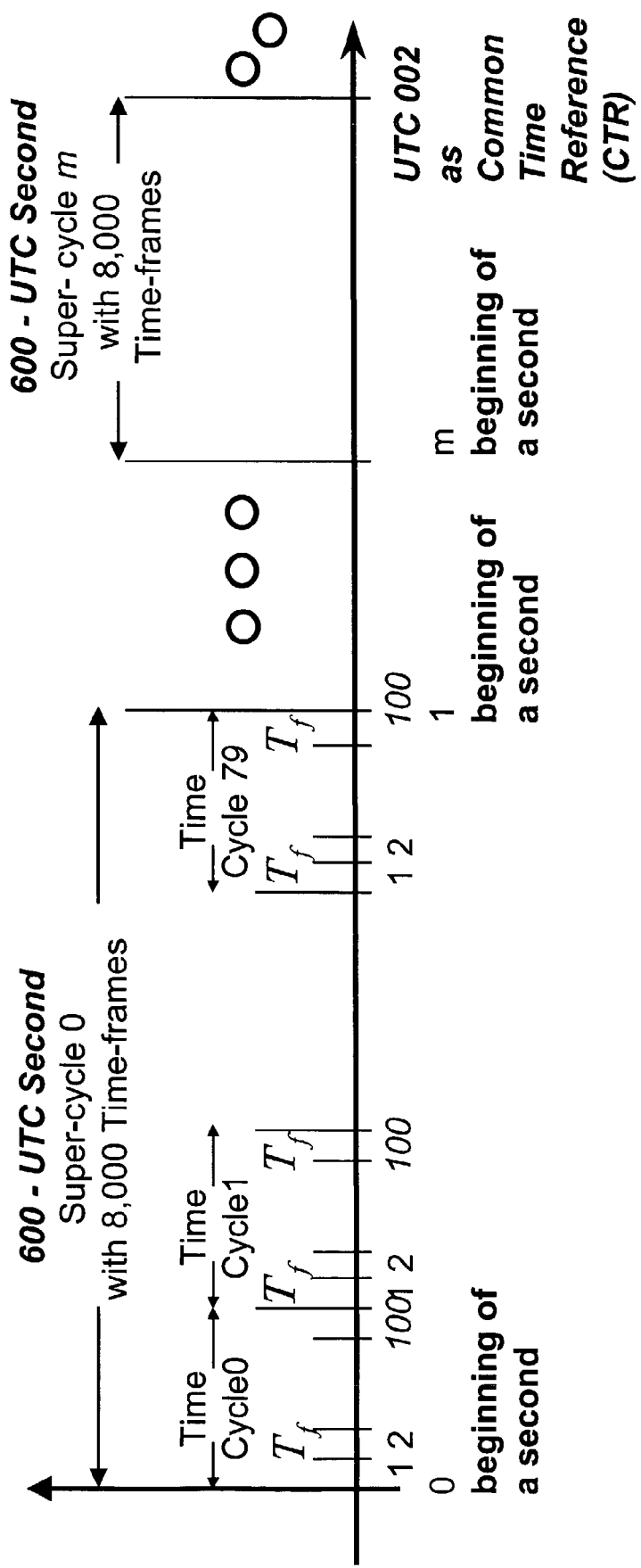
FIG. 6 is a timing diagram of a common time reference (CTR) that is aligned to the coordinated universal time (UTC) standard, as utilized by the present invention, wherein the UTC is divided into a plurality of contiguous periodic super-cycles each comprised of at least one contiguous time cycle each comprised of at least one contiguous time frame, wherein the super-cycle is equal to and aligned with the UTC second.

UTC Time Structure:

In some embodiments, the secure time-stamps are derived from UTC (coordinated universal time) 002, as shown in FIG. 6. In one embodiment, each of the successive UTC seconds 600 is divided into consecutive time frames that are grouped into time cycles. As shown in the example illustrated in FIG. 6, there are 100 time frames in each time cycle. For illustration purposes, the time frames within a time cycle are numbered 1 through 100. Consecutive time cycles are grouped together into super-cycles, and as shown in FIG. 6, there are 80 time cycles in each super-cycle. For illustration purposes, time cycles within a super-cycle are numbered 0 through 79. Super-cycles 0 and m are shown in FIG. 6.

FIG. 6 illustrates the relationships among time frames, time cycles, and super-cycles; in alternate embodiments, the number of time frames within a time cycle may be different than 100, and the number of time cycles within a super-cycle may be different than 80. In this illustrated example, the duration of every super-cycle is exactly one second as measured by the UTC standard. Moreover, as illustrated in FIG. 6, the beginning of each super-cycle coincides with the beginning of a UTC second. Consequently, when leap seconds are inserted or deleted for UTC corrections (due to changes in the earth rotation period), the cycle and super-cycle periodic scheduling will not be affected. The time frames, time cycles, and super-cycles are associated in the same manner with all respective network interface 420 and all respective Security Tag Checkers 120TTC.

In the embodiment illustrated in FIG. 6, the super-cycle duration is equal to one second as measured using the UTC (Coordinated Universal Time) standard. In an alternate embodiment, the super-cycle duration spans multiple UTC seconds. In another alternate embodiment the super-cycle duration is a fraction of a UTC second. In another embodiment, the super-cycle duration is a small integer number of UTC seconds. A time frame may be further divided into time slots in the preferred embodiment, not illustrated in FIG. 6.

UTC can be obtained by the network interface 420 from various sources, e.g., global positioning system (GPS), Global Navigation Satellite System (GLONASS), Galileo, and Two-Way Satellite Time and frequency Transfer (TWTFT).

The Generic Structure of Data Packets:

FIG. 7A is a description of a data packet structure that consists of a header portion 700 and a payload portion 701PL, such that, the header portion consists of priority field 703Pri, address and port fields 704AdrPrt, and various generic data packet header fields 702Gen, which are described in more detail below. The priority field 703Pri is used, in some embodiments, for associating data packets with class of service, e.g., premium service. The address and port fields 704AdrPrt are used both for routing and association with various applications, e.g., streaming media. In some embodiments, when a data packet is received for processing an additional time of arrival (ToA) 705ToA is attached to it. ToA can be derived from the UTC second 600—as shown in FIG. 6. ToA 705ToA can have a plurality of numerical formats. One example is the format of the Internet's Network Time, which is in seconds relative to 0h UTC on 1 Jan. 1900. The full resolution NTP timestamp is a 64-bit unsigned fixed point number with the integer part in the first 32 bits and the fractional part in the last 32 bits. In some fields where a more compact representation is appropriate, only the middle 32 bits are used; that is, the low 16 bits of the integer part and the high 16 bits of the fractional part. The high 16 bits of the integer part must be determined independently.

There are two variants of the generic data packet header fields 702Gen one is associated with end station 115 and the trusted flow generator (TFG), as shown in FIG. 7B, and network interface (NI) and the trusted tag checker (TTC), as shown in FIG. 7C. The two variants of the generic data packet header fields 702Gen are used in the various protocols and algorithms utilized in various method and system embodiments of the present invention.

FIG. 7B illustrates the generic data packet header fields 702Gen used by the end station 115 with its trusted flow generator (TFG). These fields contain information to be used, for example, by the trusted tag checker (TTC) at the network interface (see FIG. 1). The generic fields that are related to TFG are:

(5) Security Tag Vector—STV 711, which is used to signal to the TTC that a certain program was used to generate and send data packets;
(6) Security Tag Serial Number—STSN 712, which is used for initializing the operation of TFG and TTC;
(7) Security Signals 713, which used to send various security information from TFG to ITC; and
(8) Priority: Class of service 714, which is used as priority field mapping data packets to their respective class of service.

FIG. 7C illustrates the generic data packet header fields 702Gen used by the network interface with trusted tag checker (TTC) and security management system (SMS). These fields contain information to be used, for example, the trusted flow generator (TFG) at the end station 115 (see FIG. 1). The generic fields that are related to TFG are:

(5) Trusted Flow Parameters & Codes 721,
(6) Security Signals 722, used to send various security information from TTC to TFG;
(7) Secure Time Stamps 723, used to provide the time derived from UTC 002—see FIG. 6; and
(8) Secure Renewable Parameters 724, used for securely sending renewable parameters from ITC to TFG, which are used for example, for determining how often certain programs for generating and sending data packets can be used.

Figure 8:
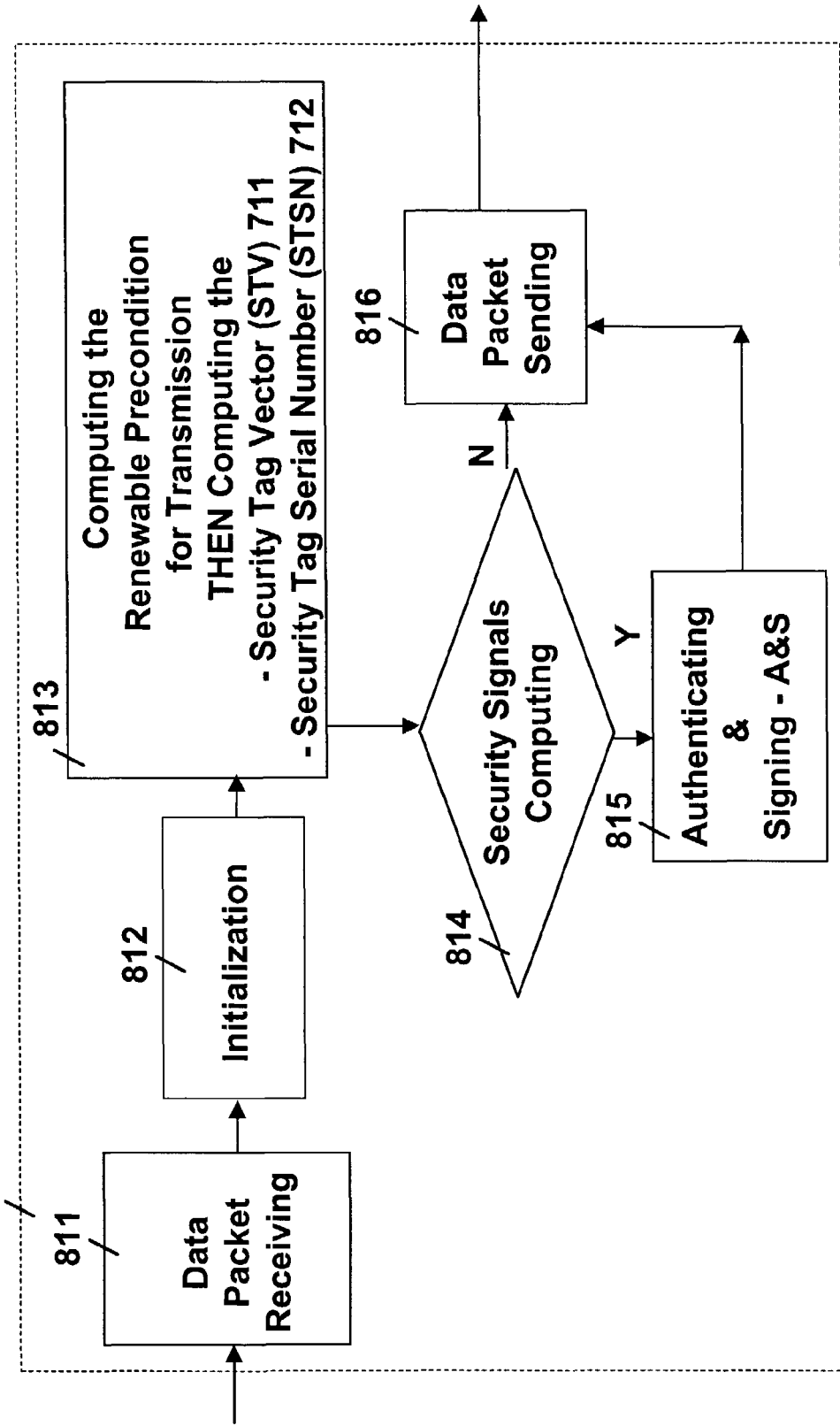
FIG. 8 is a schematic description of the trusted flow generator (TFG) operation that is used to generate and send data packets with security tags.

The Operation, Structure of TFG and TTC, and Communications System:

FIG. 8 illustrates the trusted flow generator (TFG) 110TFG operation that is used to generate and send data packets with security tags. The TFG operation is based upon taking logic modules (programs and data) with known functionality and transforming them into a hidden program by integrating modules to execute together into a logic which is partially obfuscated and/or encrypted and/or physically hidden—as shown in FIG. 12A, FIG. 12B, FIG. 12C, FIG. 12D, and FIG. 14.

Figure 13:
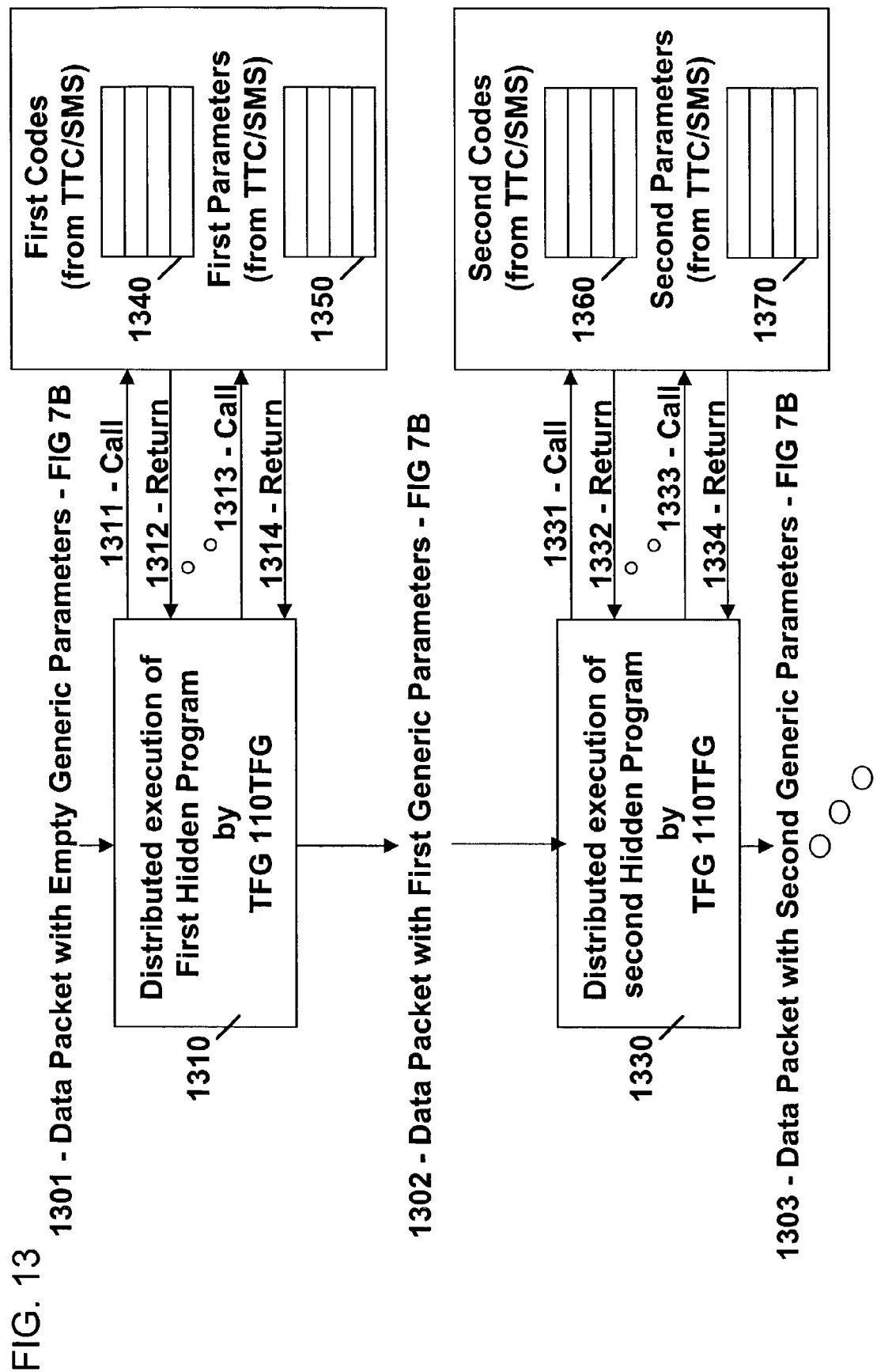
FIG. 13 is a schematic description of execution of a hidden program by TFG with codes and parameters that were received from the ITC.

The hidden program that is part of TFG 110TFG is updated dynamically, as shown in FIG. 13, to strengthen it against reverse engineering efforts. The program includes the functionality for generating security signals, e.g., Security Tag Vector—STV 711, Security Tag Serial Number—STSN 712, and Security Signals 713, which are unpredictable by observers, e.g., a pseudo random sequence of security signals. Only elements that share the means for producing the security signals can check their validity. The modules include operational tasks and performance parameters for this operation. The operation can be transmission of data packets with given parameters of performance that the hidden program contains. The generated security signals thus assure that the correct operation was taken place and can be used to signal various cryptographic parameters as well, e.g., Security Signals 713.

In FIG. 8, data packets are received for processing by operation module 811 and transferred to the initialization module 812, which is used for coordinating the operation of TFG and TTC by appropriately setting the Security Tag Serial Number—STSN 712, which is used for initializing the operation of TFG and TTC. The operation module 813 is responsible for Computing the Renewable Precondition for Transmission, as shown in FIG. 13, then this operation module is computing two fields in for the generic part of the data packet header 700Gen: (1) Security Tag Vector (STV) 711 and (2) Security Tag Serial Number (STSN) 712. Following this step there are two options 814: (1) computing additional security signals, e.g., authenticating and signing the data packet 815 before its transmission 816, and (2) to proceed to data packet sending 815 without additional security operations.

Figure 9:
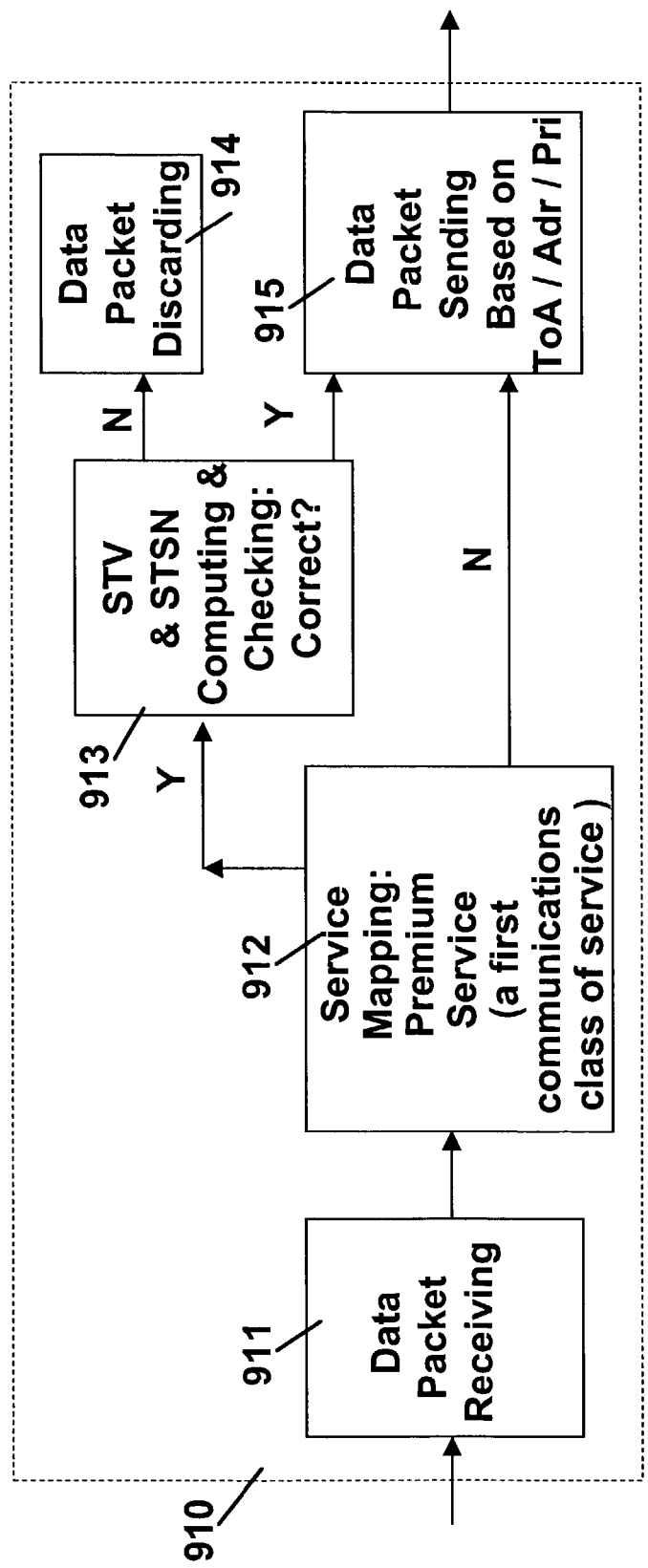
FIG. 9 is a schematic description of the trusted tag checker (ITC) operation that is used to check the authenticity of the program used to generate and send data packets with security tags.

FIG. 9 illustrates the trusted tag checker (TTC) 120TTC operation that is used to check the authenticity of the program used to generate and send data packets with security tags. The data packet is received by operation module 911 and then transferred to operation module 912 that performs the service mapping function. The service mapping can be done in various methods, e.g., by decoding the priority field 703Pri in the packet header and by decoding the address and port fields 704AdrPrt in the data packet header. The service mapping can be performed by decoding the class of service 714 in the generic data packet header fields. When the incoming data packet is identified as generated by a trusted flow generator (TFG), the data packet can receive premium service after further authenticity checks by operation module 913. Module operation 913 checks two fields in the generic header of the data packet received from the end station 115: (1) Security Tag Vector—STV 711, which is used to signal to the TTC that a certain program was used to generate and send data packets; and (2) Security Tag Serial Number—STSN 712, which is used for initializing the operation of TFG and TTC. If the checking by operation module 913 is correct, the data packet will be sent by operation module 915 as premium service data packet. Otherwise, when the checking is not correct the data packet is discarded by operation module 914. The sending of data packets from operation module 915 can be based on various parameters, e.g., time of arrival 705ToA, address 704AdrPrt, and priority 703Pri. Data packets that are not receiving premium service are transferred from operation module 912 to operation module 915 for sending out of the TTC 120TTC.

Figure 10:
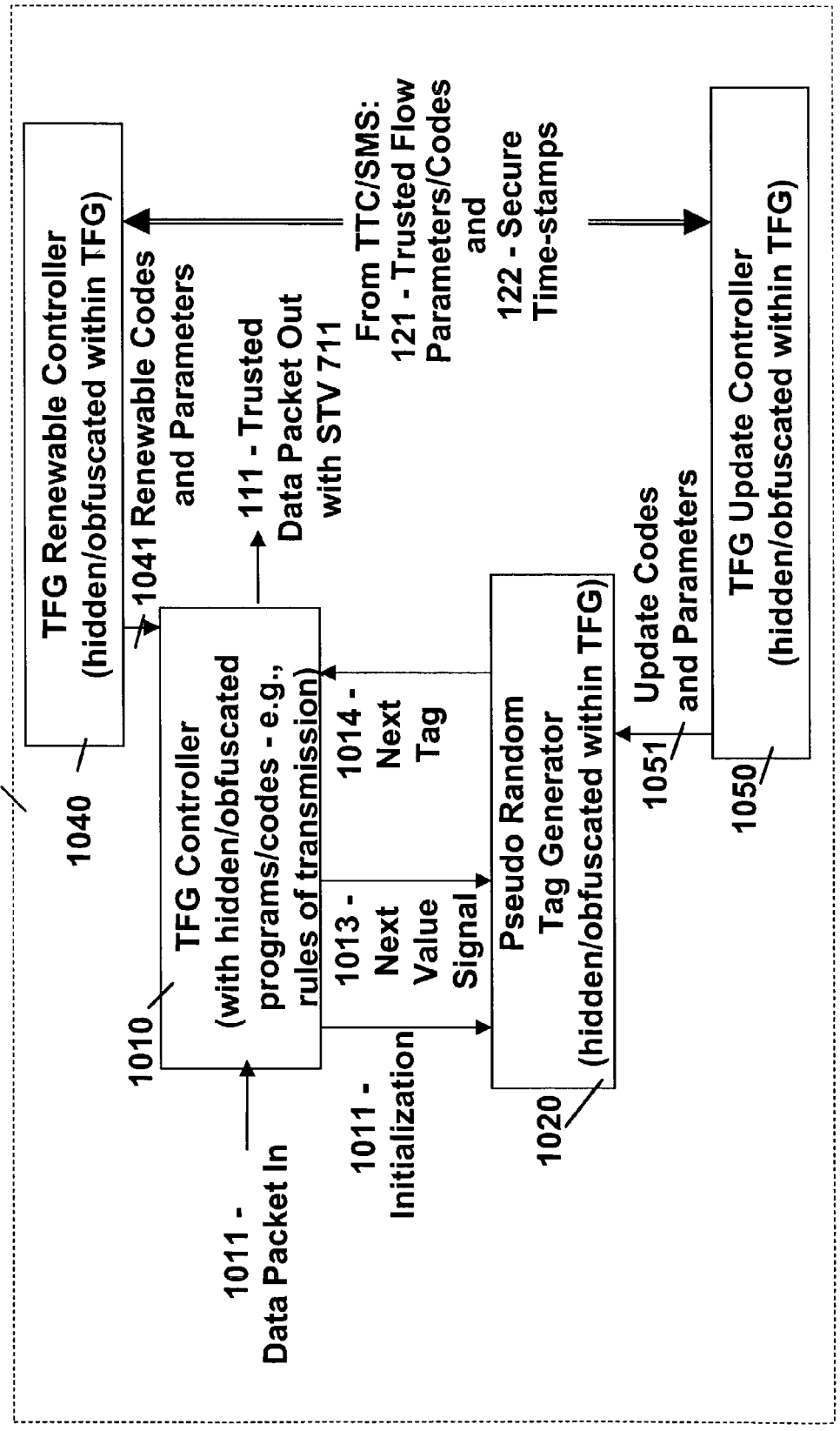
FIG. 10 is a functional structure of the trusted flow generator (11-G) that is used to generate and send data packets with security tags.

FIG. 10 illustrates the trusted flow generator (TFG) 110TFG that is used to generate and send data packets with security tags. The TFG, in some embodiments of the present invention, is done in software as part of the first computing element, wherein the second computing element is the TTC 120TTC. The TFG basic operations are performed by the TFG controller 1010, which receives data packet in 1011. The TFG controller 1010 sends initialization parameters 1012 to the pseudo random tag generator 1020 prior to sending the next value signal 1013 to the pseudo random tag generator 1020 requesting a security tag vector (STV) 711 for the generic header of the incoming data packet. The pseudo random tag generator 1020 returns the next tag 1014 to the TFG controller 1010 with the next security tag vector (STV) 711. The data packet with the next security tag vector (STV) 711 is then sent out 111.

The TFG controller operation with the pseudo random tag generator operation, shown in FIG. 10, can be implemented as one of the embodiments of the present invention as described in detail in the descriptions of FIG. 16, FIG. 17, FIG. 18, FIG. 19, and FIG. 20. The descriptions in FIG. 16, FIG. 17, FIG. 18, FIG. 19, and FIG. 20 detail embodiments of hiding and obfuscating the IP's (Internet Protocol's) TCP (transport control protocol). The operations of hiding and obfuscating are further described in the description FIG. 12, FIG. 13, and FIG. 14.

As illustrated in FIG. 10, the operation of the TFG controller 1010 is further controlled by the TFG renewable controller 1040, which sends renewable codes and parameters 1041 to the TFG controller 1010. The renewable codes and parameters 1041 determine renewable characteristics of the TFG controller 1010. The renewable characteristics include parameters, e.g., how many data packets can be processed by the TFG controller 1010 before receiving other renewable parameters, and how many data packets can be processed per unit time by the TFG controller 1010. The operation of the TFG renewable controller 1040 is further controlled, in some embodiments of the present invention, through the network by at least one of: the security management server 160SMS and the trusted tag checker 120TTC, that send to the TFG renewable controller 1040 two types of renewable signals: (1) Trusted Flow Parameters/Codes 121 and (2) Secure Time-stamps 122. The two renewable signals determine how the TFG renewable controller 1040 controls the TFG controller 1010.

As illustrated in FIG. 10, the operation of the pseudo random tag generator 1020 is further controlled by the TFG update controller 1050, which sends update codes and parameters 1051 to the pseudo random tag generator 1020. The update codes and parameters 1051 determines update characteristics of the pseudo random tag generator 1020. The update characteristics include changes to the security tag vector 711 generation. The operation of the TFG update controller 1050 is further controlled, in some embodiments of the present invention, through the network by at least one of: the security management server 160SMS and trusted tag checker 120TTC, that send to the TFG update controller 1050 two types of renewable signals: (1) Trusted Flow Parameters/Codes 121 and (2) Secure Time-stamps 122. The two renewable signals determine how the TFG update controller 1050 controls the pseudo random tag generator 1020.

Another possible and more detailed embodiment of the TFG update controller 1050, TFG controller 1010, TFG renewable controller 1040; and the pseudo random tag generator 1020, illustrated in FIG. 10, are shown in the operation illustrated in FIG. 13.

Figure 11:
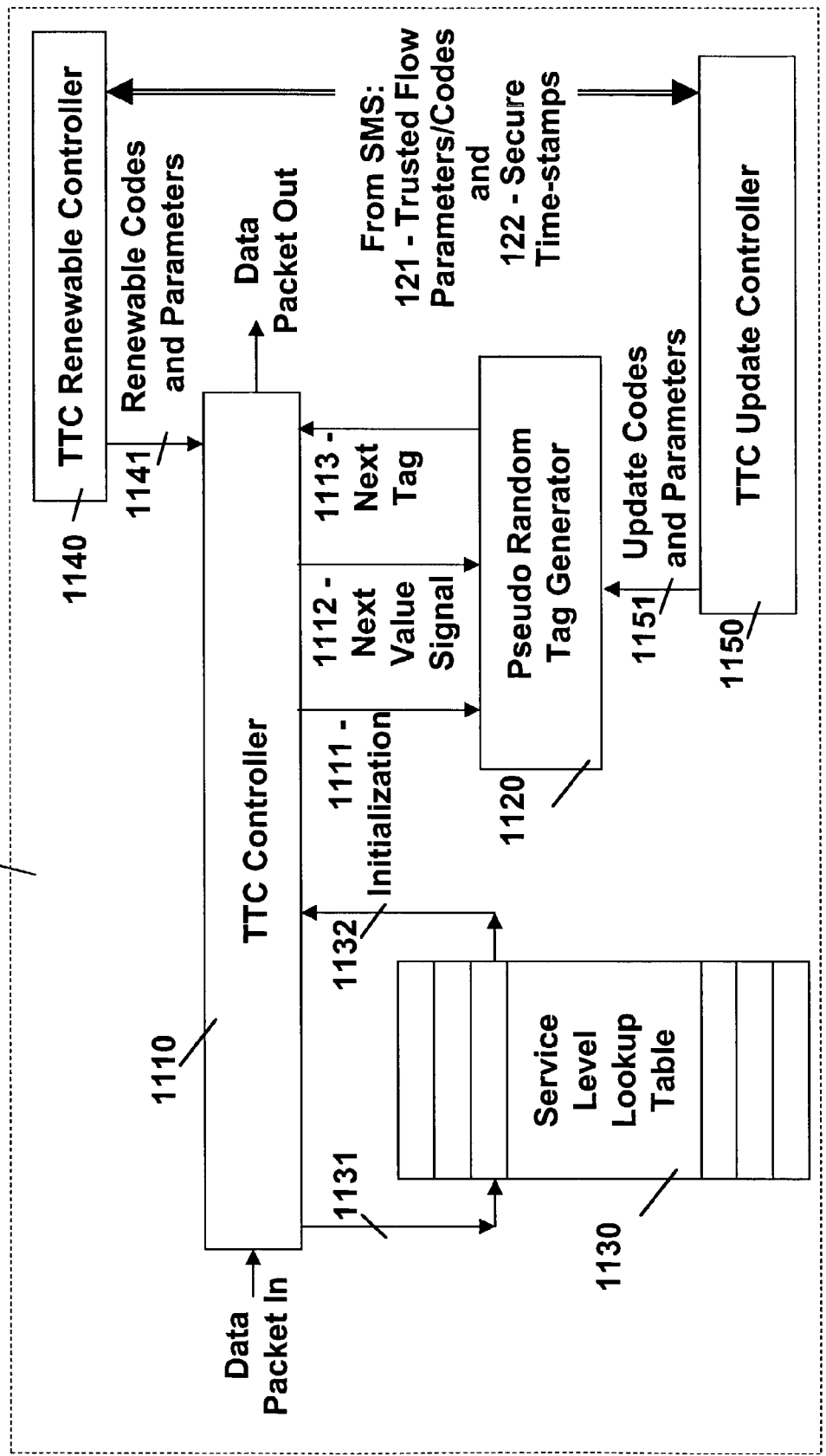
FIG. 11 is a functional structure of the trusted tag checker (TTC) that is used to check the authenticity of the program used to generate and send data packets with security tags.

FIG. 11 illustrates the trusted tag checker (TTC) 120TTC that is used to check the authenticity of the TFG program used to generate and send data packets with security tags. The TTC controller 1110 receives data packet 1111 and then checks its service type by sending a decoding signal 1131 to the service level lookup table 1130. The decoding signal 1131 can be at least one of: priority field 703Pri, address and port fields 704AdrPrt, class of service 714, and security signal 713. The response signal 1132 indicates to the TTC controller 1110 whether or not the data packet 1111 has a security tag vector 711 that need to be checked in order to verify the authenticity of the generating and sending TFG program 110TFG.

The TTC controller 1110 sends initialization parameters 1112 to the pseudo random tag generator 1120 prior to sending the next value signal 1113 to the pseudo random tag generator 1020 requesting a security tag vector (STV) 711 for checking STV 711 received in the generic header of the incoming data packet 1111. The pseudo random tag generator 1120 returns the next tag 1114 to the TTC controller 1110 with the next security tag vector (STV) 711. Then, the TTC controller 1110 compares the two STV 711 values, from the data packet and the locally computed by the pseudo random tag generator 1120, if the two values are the same the data packet can be sent with premium service as it is illustrated in FIG. 9. Module 915 in FIG. 9 shows the operation of sending of data packets that can be based on various parameters, e.g., time of arrival 705ToA, address 704AdrPrt, and priority 703Pri.

As illustrated in FIG. 11, the operation of the TTC controller 1110 is further controlled by the TTC renewable controller 1140, which sends renewable codes and parameters 1141 to the TTC controller 1110. The renewable codes and parameters 1141 determine renewable characteristics of the TTC controller 1110. The renewable characteristics include parameters, e.g., how many data packets can be checked and compared by the TTC controller 1110. The operation of the TTC renewable controller 1140 is further controlled, in some embodiments of the present invention, through the network by the security management server 160SMS that sends to the TFG renewable controller 1140 two types of renewable signals: (1) Trusted Flow Parameters/Codes 121 and (2) Secure Time-stamps 122. The two renewable signals determine how the TTC renewable controller 1140 controls the TTC controller 1110.

As illustrated in FIG. 11, the operation of the pseudo random tag generator 1120 is further controlled by the TTC update controller 1150, which sends update codes and parameters 1151 to the pseudo random tag generator 1120. The update codes and parameters 1151 determines update characteristics of the pseudo random tag generator 1120. The update characteristics include changes to the security tag vector 711 generation. The operation of the TTC update controller 1150 is further controlled, in some embodiments of the present invention, through the network by the security management server 160SMS and trusted tag checker 120TTC that sends to the TTC update controller 1150 two types of renewable signals: (1) Trusted Flow Parameters/Codes 121 and (2) Secure Time-stamps 122. The two renewable signals determine how the TTC update controller 1150 controls the pseudo random tag generator 1120.

Figure 15:
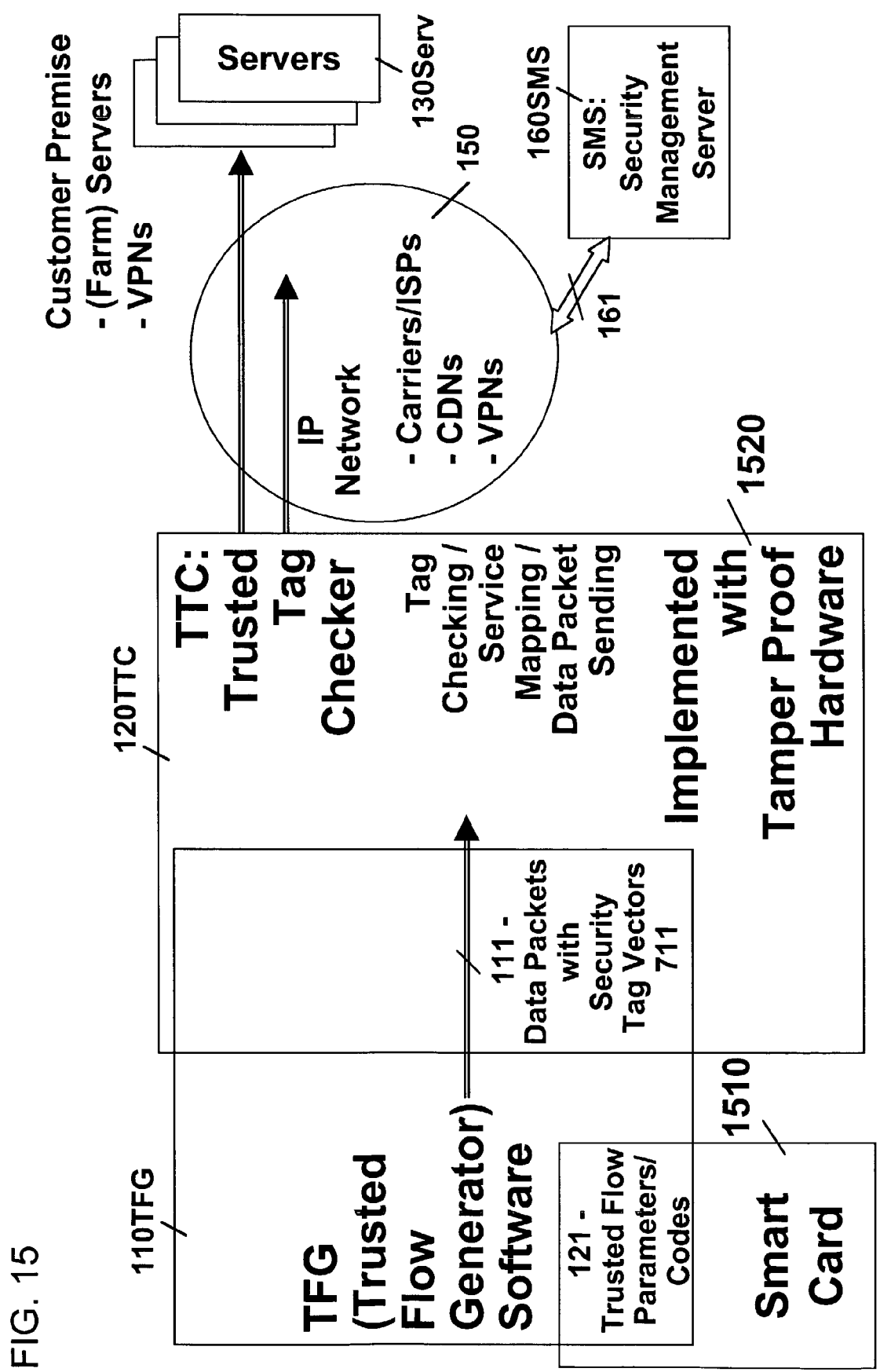
FIG. 15 is a functional description of a system implemented with tamper proof hardware.

FIG. 15 is illustrates an embodiment implemented with, e.g., tamper proof hardware. In this integrated configuration, the operation and embodiments described in FIG. 8, FIG. 9, FIG. 10, and FIG. 11, for TFG 110TFG and TTC 120TTC are combined together. This integrated configuration can be implemented in various manners, e.g., tamper proof hardware, VLSI, micro-coded with a network appliance and micro-coded in a tamper proof manner with a network appliance. The integrated configuration can be further combined with a smart card 1510. The integrated configuration, in some configuration of the present invention, is further enhanced with a TFG challenge controller as discussed relative to and as illustrated in detail in FIG. 27.

The embodiment illustrated in FIG. 15 is used in the realization of various edge devices and network appliances, e.g., a cellular telephone, a PDA, a single printed circuit board, a single chip, a single computing module, a single chassis, a hand held device, a single box, a user terminal.

The TFG system, illustrated in FIG. 8 and FIG. 10, possesses means for providing controlled communication in accordance with defined rules of transmission. The system further comprising: processing data in accordance with defined logic to construct a first data packet; means for generating a security tag vector 711 responsive to validating the processing in accordance with the defined logic; and means for constructing by the TFG controller 1010, shown in FIG. 10, a trusted data packet 111 responsive to the means for processing and means for generating.

Figure 28:
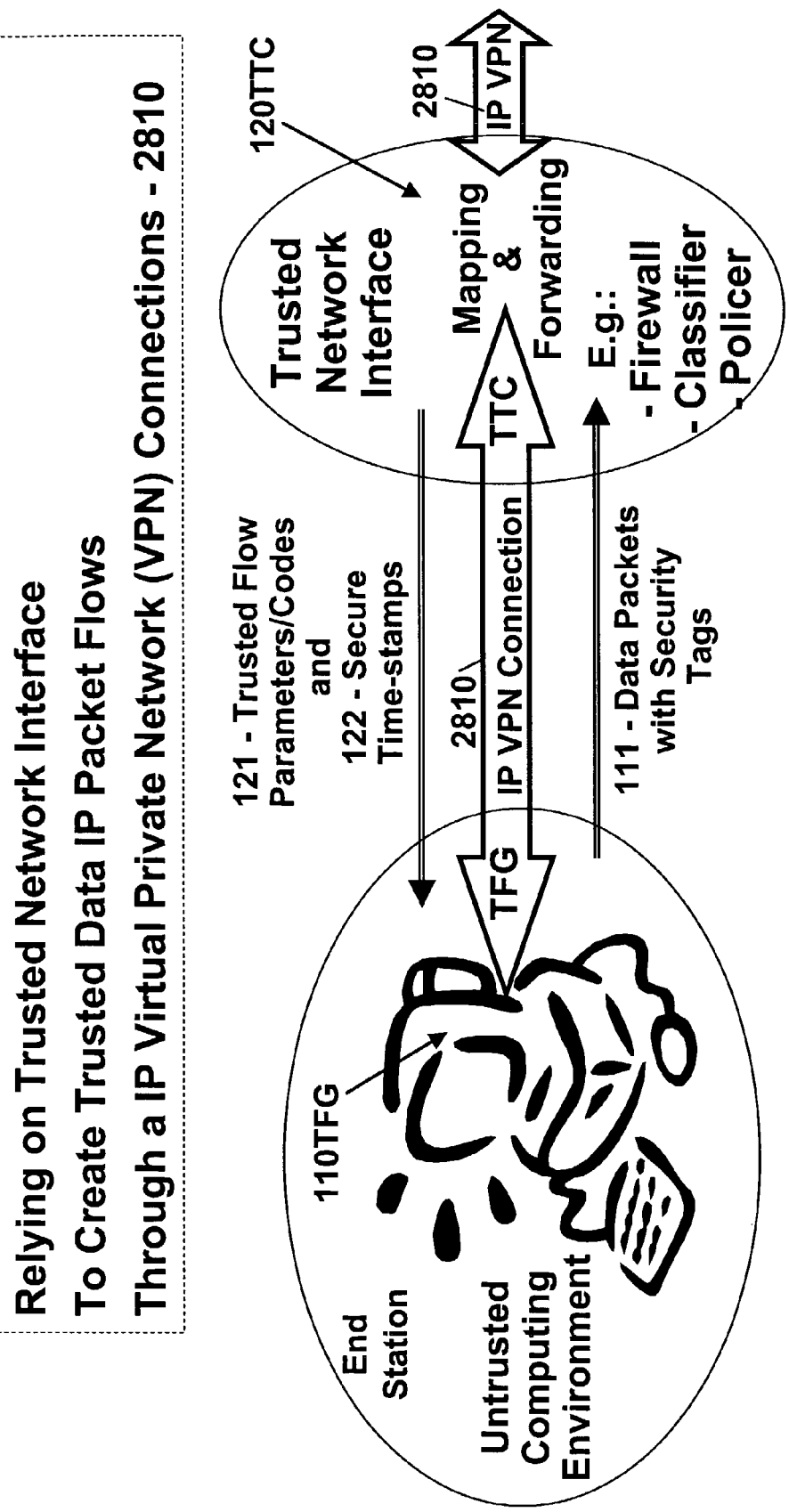
FIG. 28 is a functional description of a system that generates and sends data packets with security tag vectors over IP (Internet protocol) VPN (virtual private network) connection through a network interface, e.g., firewall, classifier, and policer, while mapping data packets with verified security tag vectors to premium service.

The system further comprises: means for transmitting the trusted data packet 111 onto a communications path, e.g., the VPN connection 2810 in FIG. 28, in accordance with the defined rules of transmission.

The system, as illustrated in FIG. 1 and FIG. 11, further comprises: means for receiving the trusted data packet 111 from the communications path; and means for validating the trusted data packet responsive to analyzing the trusted data packet to verify the security tag vector 711 responsive to the defined logic.

The system further comprises: means for mapping 1130, as shown in FIG. 11, wherein mapping is of the trusted data packet 111 to a first communications class of service responsive to the validating the trusted data packet and verifying the respective security tag vector; and means for mapping the trusted data packet 111 to a second communications class of service responsive to the validating the trusted data packet resulting in failed verifying of the security tag vector 711.

The system further comprises: means for coupling the first communications class of service with the trusted data packets 111 for further communication therefrom; wherein the data packets of the second communications class of service is denial of further communication therefrom; and wherein the data packets of the second communications class of service are stored in a local storage without further transmission.

The system, in a different embodiment, transmits the data packets of the second communications class of service at a lower priority, level than the first communications class of service, wherein the priorities are determined responsive to set of priority bits 703Pri within each of the data packets.

The transmitting is performed in a first computing element that is part of TFG, as shown in FIG. 1, FIG. 8 and FIG. 10; and wherein the means for receiving is performed in a second computing element that is part of TTC, as shown in FIG. 1, FIG. 9 and FIG. 11. The first computing element and the second computing element are both contained within a single physical computing system, as shown in FIG. 15.

As illustrated in FIG. 15, the first computing element and the second computing element are contained in separate physical computing systems, as shown in FIG. 1, FIG. 2, FIG. 3, FIG. 4 and FIG. 28. The second computing element has non-modifiable processing logic.

As illustrated in FIG. 1 and FIG. 15, at least one of the first computing element and the second computing element is comprised of at least one of: tamper-proof hardware and tamper-proof firmware, self-destructive hardware; wherein the second computing element is made inoperative responsive to detection of at least one of: tampering, attempt to replace hardware, attempt to replace firmware, attempt to replace software. The single physical computing system, as shown in FIG. 15, is at least one of: a single printed circuit board, a single chip, a single computing module, a single chassis, an hand held device, a PDA, a cellular phone, a single box, a user terminal.

The TFG system, as shown in FIG. 8 and FIG. 10, generates the security tag vectors (STVs) 711 and processes data in accordance with defined logic to construct the first data packet are obfuscated. The TFG system which generates the STV 711 is hidden within the processing data in accordance with defined logic to construct the first data packet 111.

Figure 12:
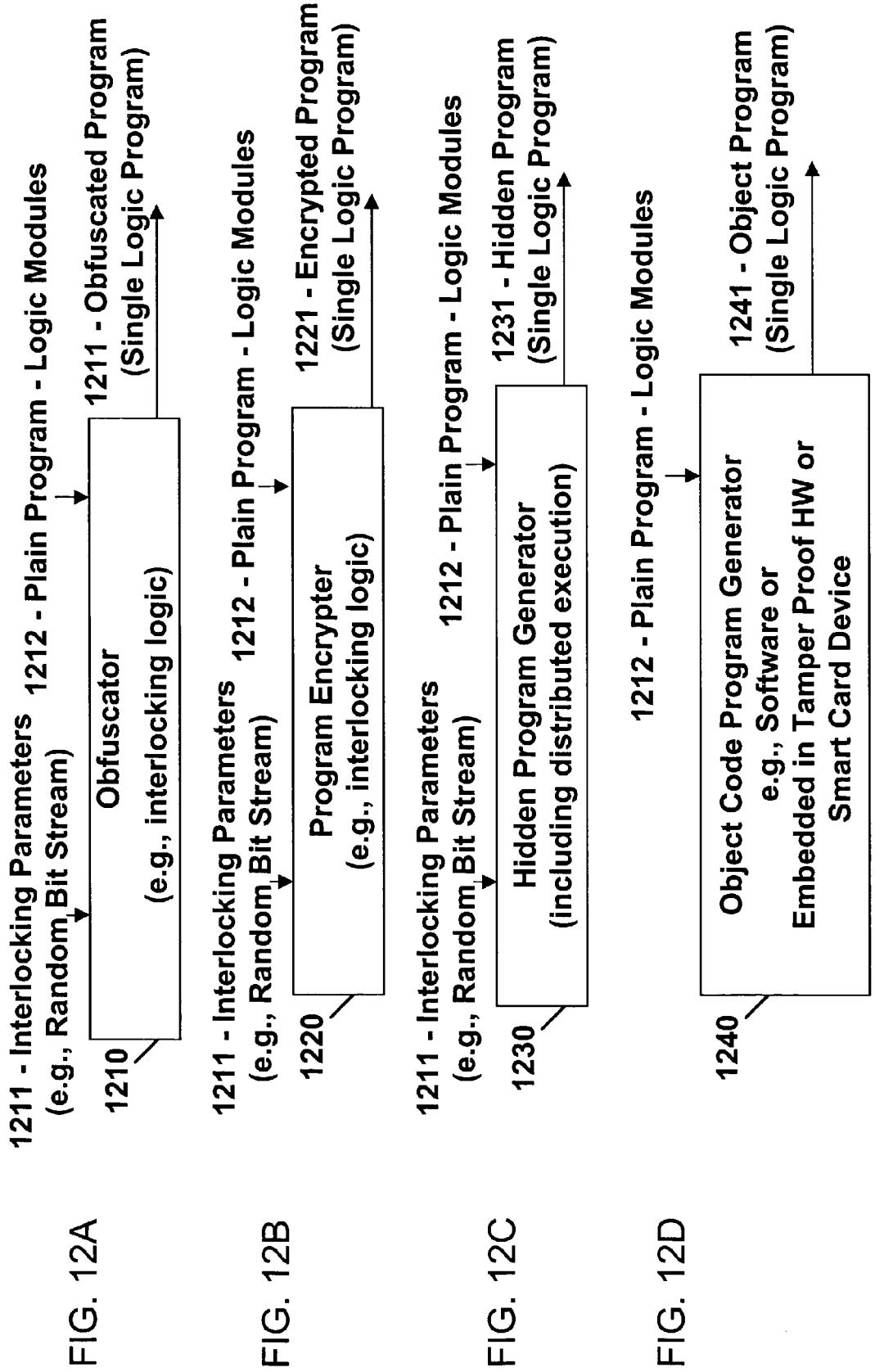
FIG. 12A is a functional description of a program obfuscator that consists of interlocking logic and receives as inputs interlocking parameters and a plain program with multiple logic modules and creates as an output an obfuscated program as a single logic program.
FIG. 12B is a functional description of a program encrypter that consists of interlocking logic and receives as inputs interlocking parameters and a plain program with multiple logic modules and creates as an output an encrypted program as a single logic program.
FIG. 12C is a functional description of a hidden program generator that consists of interlocking logic and receives as inputs interlocking parameters and a plain program with multiple logic modules and creates as an output a hidden program as a single logic program.
FIG. 12D is a functional description of an object code program generator, e.g., software or embedded in tamper proof hardware or smart card device, and creates as an output an object program as a single logic program.

The TFG system, shown in FIG. 8 and FIG. 10, generates the security tag is encrypted within the processing data in accordance with defined logic to construct the first data packet, as shown in the specifications of FIG. 12, FIG. 13 and FIG. 14.

The system, as shown FIG. 1, couples the first computing element that is TFG 110TFG and the second computing element that is TTC 120TTC through a communications network 140 and 150. The communications network, 140 and 150, is at least one of: an access network, a metropolitan network, a local area network, a wireless network, an enterprise network, a cellular telephone network, a cable modem network, a passive optical network, Ethernet, token ring, a spatial reuse ring, SONET ring, resilient packet ring, a costumer premise network (CPN), an IP, Internet, a 3G wireless network, IEEE 802 standards, ATM network, frame relay (FR) network, a virtual private network (VPN), a shared media, and a storage area network (SAN).

As illustrated, the first computing element that is TFG 110TFG and the second computing element that is TTC 120TTC are directly coupled.

The first computing element that is TFG 110TFG is part of at least one of: a single printed circuit board, a single chip, a single computing module, a single chassis, an hand held device, a PDA, a cellular phone, a single box, a user terminal, an application software module, an operating system module, a Java applet, a communications software module, a firmware component, a software driver, and a distributed system software module.

The second computing element that is TTC 120TTC is part of at least one of: a firewall, a gateway, a router, a routing controller, a local area network bridge, a local area network switch, a wireless base station, a wireless 3G base station, an IEEE 802.11 base station, a cable modem head-end, a central office, an ADSL DSLAM, and a point-of-presence (PoP).

In one embodiment, the system additionally forwards the trusted data packet 111 for further communication over a defined communications path 150, wherein the defined communications path 150 is part of at least one of: a VPN (virtual private network), an ATM, a FR (frame relay), a CPN (costumer premise network), a content delivery network (CDN), an ISP, a shared media, a firewall, a local area network, the Internet, a metropolitan area network, a SAN, a link to application server, a link to web server, a link to data base server, a link to Internet server, a link to network server, a public network, an enterprise network, and a carrier network.

The system forwards the trusted data packet 111 to a further computing device, wherein the further computing device is at least one of: an application server, a web server, a data base server, an Internet server, a network server, a firewall, a multimedia server, a video server.

Within the TTC 120TTC, the first class of service is comprised of a local processing of the trusted data packet 111; wherein the local processing is done by at least one of: a router, a server, a web-server, a database, a firewall, a network appliance.

The TFG 120TFG, further receives at least some of the defined rules of transmission from a separate rules controllers: TFG renewable controller 1040 and TFG update 1050, specified in FIG. 10. The system, within the TFG 120TFG, wherein the defined rules of transmission determine at least one of: performance characteristics, access characteristics, transmission limitations, transmission rates, window sizes, port numbers, IP addresses, network addresses, quotas, renewable quotas, packet structure limitations, and transmission schedule.

Within the TFG 120TFG, at least one of the defined rules of transmission determines a renewable precondition for transmission. The renewable precondition for transmission is defined by least one of: renewable transmission quota of trusted data packets, number of trusted data packets that can be transmitted per unit of time, time signal, UTC time signal, digitally signed time signal, digitally signed time-stamp, digitally signed time-stamp from UTC (coordinated universal time), digital cash for transmission of trusted data packets, and cryptographic keys for marking trusted data packets.

For the renewable controller 1040, the renewable precondition for transmission is obtained from at least one of: a predefined logic, an external rule controller, a security management system (SMS) 160SMS, network interface, network appliance, server, network management system, firewall, local computation, smart card device, portable device.

For the TFG system, whenever the renewable precondition for transmission is not valid, transmission is suspended.

The TFG system as illustrated in FIG. 10, further updates parts of defined logic by using a TFG update controller 1050, wherein the means for updating comprise of at least one of: means for adding data, means for deleting data and means for replacing data and wherein data comprises at least one of lines of codes, machine codes, obfuscated codes, object codes, tables of codes, program parameters, subroutine parameters, tables of parameters, data structure of parameters, software modules, alpha numeric values, cryptographic fields, assembly language code, software applets, program control information, firmware code, instructions for reprogramming programmable hardware elements, e.g., PLAs.

The TFG system generates data packets 111 with STV that comprises at least one of: means for applying a pseudo-random generator, means for applying a pseudo-random function, means for applying a cryptographic function, means for applying an encryption function, means for applying a scrambling subroutine, means for applying an authentication function, means for applying a digital signing function, means for applying a cryptographic hash function, applying a subroutine, means for applying a computational logic module, means for applying a symmetric cryptography function, applying an asymmetric cryptography function, employing a cryptographic key, employing a cryptographic seed, employing an encrypted software, employing an obfuscated software, means for employing a hidden program, means for employing logic with a set of parameters, means for employing a hardware module, means for employing a smart card, means for employing a portable device, and means for employing a distributed protocol.

The TTC system illustrated in FIG. 9 and FIG. 11, validates compliance with communications processing for the transmittal of data packets 111 comprised of a received security tag vector—STV 711. The TTC system further comprises: means for receiving one of the data packets; means for generating a local security tag; means for comparing the local security tag to the received security tag; and means for mapping the received data packet to a defined class of service responsive to the means for comparing.

The TTC system illustrated in FIG. 9 and FIG. 11, further comprises: means for mapping the received data packet to a first class of service responsive to the local security tag equaling the received security tag; and means for mapping the received data packet to a second class of service responsive to the local security tag which is different from the received security tag.

The TTC system illustrated in FIG. 9 and FIG. 11, further comprises: means for forwarding the received data packet for further communication over a defined communications path. The TTC system in FIG. 9 and FIG. 11, wherein the defined communications path is part of at least one of: a VPN, an ATM, a FR, a CPN, a content delivery network (CDN), an ISP, a shared media, a firewall, a local area network, an Internet, a metropolitan area network, a SAN, a link to application server, a link to web server, a link to data base server, a link to Internet server, a link to network server, a public network, an enterprise network, and a carrier network.

The TTC system illustrated in FIG. 9 and FIG. 11, forwards the received data packet to a further computing device, wherein the further computing device is at least one of: an application server, a web server, a data base server, an Internet server, a network server, a firewall, a multimedia server, and a video server.

As illustrated in FIG. 9 and FIG. 11, the TTC system wherein the first class of service is comprised of a local processing of the received data packet 111, wherein the local processing is done by at least one of: a router, a server, a web-server, a database, a firewall, and a network appliance.

The TFG and TTC system control signaling in accordance with defined rules of at least one of transmission and operation, the method comprising: means for processing data in accordance with defined logic to construct operation; means for generating a security tag responsive to validating the processing in accordance with the defined logic; and means for constructing a signal responsive to computing with security tag. The system further transmits the signal onto a communications path in accordance with the system operation.

The system further receives at least some of the defined rules of at least one of transmission and operation, from a separate rules controller: TFG renewable controller 1040 and TFG update 1050, specified in FIG. 10; wherein at least one of the defined rules of at least one of: transmission and operation, and determines a renewable precondition for at least one of transmission and operation.

The system as illustrated in FIG. 10 further updates parts of the defined logic; wherein generating comprises at least one of means for applying a pseudo-random generator, means for applying a pseudo-random function, means for applying a cryptographic function, means for applying an encryption function, means for applying a scrambling subroutine, means for applying an authentication function, means for applying a digital signing function, means for applying a cryptographic hash function, means for applying a subroutine, means for applying a computational logic module, means for applying a symmetric cryptography function, means for applying an asymmetric cryptography function, means for employing a cryptographic key, means for employing a cryptographic seed, means for employing an encrypted software, means for employing an obfuscated software, means for employing a hidden program, means for employing logic with a set of parameters, means for employing a hardware module, means for employing a smart card, means for employing a portable device, and means for employing a distributed protocol.

The TFG system provides at least one of the defined rules of at least one of transmission and operation, that determines an action based on a context; wherein the context involves at least one of a system user present, a system user present at an end-station, a system user present at the computer used for transmission and operation, application program present, a data information available, a cryptographic keys available and parameters available.

The TFG system provides that when said context is missing for at least one of transmission and operation there will be no transmitting the signal onto a communications path in accordance with the operation.

The TTC system, as illustrated in FIG. 9 and FIG. 11, are embodiments which validate compliance with defined rules of at least one of transmission and operation comprised of a received signal. The system further provides: means for receiving signal; means for generating a local signal; means for comparing the local signal and received signal; means for deciding on compliance; means for mapping at least one of transmission and operations to a defined class of service responsive to the deciding; means for receiving data packet; means for mapping the received data packet to a first class of service responsive to deciding; means for mapping the received data packet to a second class of service responsive to deciding; means for forwarding the received data packet for further communication over a defined communications path; and means for forwarding the received data packet to a further computing device.

Embodiments of the TTC system as illustrated in FIG. 1, FIG. 9 and FIG. 11; provide that the first class of service is comprised of a local processing the received data packet; wherein the local processing is done by at least one of: a router, a server, a web-server, a database, a firewall, and a network appliance.

The trusted system as illustrated herein provides for communications system comprising:

(4) TFG system in FIG. 8 and FIG. 10 with a first communications subsystem comprising a first processing subsystem providing first logic for data packet processing, rules of transmission and security tag generation, for selectively transmitting trusted data packets 111; and (5) TTC system in FIG. 9 and FIG. 11 with a second communications subsystem comprising a second processing subsystem providing logic for checking, validating and mapping of the selectively transmitted trusted data packets responsive to a defined validation logic; and (6) a communications access network coupling the first communications subsystem and the second communications subsystem.

In said trusted system, the mapping of the selectively transmitted trusted data packets 111 is further comprised of mapping logic; wherein mapping logic is further comprised of at least one of: a mapping table, decision-tree, a processing logic, a data packet processing logic, a data packet header processing decision-tree, a security tag processing logic, a data packet identification processing logic, a data packet priority processing logic, a data packet class of service processing logic, and a secure time-stamp processing logic.

In one embodiment, said trusted system further comprises: a communications service network for coupling the second communications subsystem to a destination; and wherein the rules of transmission are provided to the first communications subsystem from the communications service network; wherein the second communications subsystem is further comprised of: a subsystem for forwarding data packets responsive to the mapping logic.

In the TFG system as illustrated in FIG. 1, FIG. 8 and FIG. 10, the rules of transmission, that are part of the TFG controller 1010, are further characterized as defining at least one of: transmission rate, maximum window size, port number, destination IP, source IP, data packet priority, transmission time, and transmission schedule.

In the TFG system as illustrated in FIG. 1, FIG. 8 and FIG. 10, the rules of transmission and security tag generation, that are part of the TFG controller 1010, are further characterized as responsive to a at least one of: predefined schedule, secure time-stamp, renewable codes and parameters, and update codes and parameters.

In the TFG system as illustrated in FIG. 1, FIG. 8 and FIG. 10, the rules of transmission are part of the TFG controller 1010; wherein the rules of transmission are provided from an external storage medium; wherein the first logic is comprised as a part of the TFG controller 1010; wherein the first logic is comprised of an interlocking of a plurality of logic modules responsive to the data packet processing, the rules of transmission and the security tag generation; wherein the interlocking is further characterized in that each respective one of the plurality of logic modules is associated with a respective one of a plurality of defined subtasks; wherein the combined plurality of defined subtasks defines the first logic; and wherein all of the logic modules are required to properly perform the respective defined subtask to provide the first logic.

The TFG system as illustrated in FIG. 1, FIG. 8 and FIG. 10, further comprises: an update controller, as part of the TFG, and a security management server (SMS) that is external to the TFG system; wherein the update controller 1050 provides update codes and parameters to the first processing subsystem that is part of the TFG controller 1010 and wherein the SMS provides an update information to the update controller. The system further comprises: a renewable controller 1040, wherein the renewable controller provides update codes and parameters to the first processing subsystem; wherein the SMS provide a renewable information to the renewable controller. The TFG system with its first processing subsystem further comprises: cryptographic modules; wherein cryptographic modules further providing for at least one of: program authentication, user authentication, cryptographic authentication, application authentication, encryption, secure time-stamp, and digital signature.

The TTC system with its second processing subsystem further comprises validation modules; wherein validation modules further providing for at least one of: program authentication checking, user authentication checking, cryptographic authentication checking, application authentication checking, decryption, secure time-stamp, and digital signature validation.

In another embodiment, the system controls communications data packet flow between at least two computing elements comprising: means for generating a security tag; means for associating the security tag with a first computing element responsive to compliance logic; means for generating a data packet which includes a security portion; means for transmitting the data packet over a communications path; means for receiving the data packet at least a second computing element; means for processing the data packet to validate the security portion responsive to the security portion and at least a portion of the data packet; and means for transmitting the data packet from the second computing element to for further processing at least a third computing element; wherein (1) the communications path includes at least the second computing element and the third computing element, (2) the transmitting is responsive to the processing of the second computing element and the third computing element and (3) wherein the processing in at least one of: the second computing element and the third computing element, computing of additional security.

In another embodiment, providing secure communications, the system comprises means for consistent initialization of a tag generator, which is part of the TFG controller 1010, operating from an initial generator state to generate a sequence of security tags 711 for association with data packets for transmission; means providing for transmission of the data packets with associated security tags from the TFG controller 1010 to tag verifier, which is part of TTC 120TTC, operating from an initial verification state to generate a sequence of comparison security tags for selective comparison to the security tags 711. The system further includes means for coordinating the initial generator state and the initial verifier state prior to transmission of any of the data packets in the sequence; and wherein the tag verifier provides valid comparison tags responsive to the means for coordinating.

Said system comprises means for consistent initialization, further comprising: a sequence number 712 that is associated with the tag generator, which is part of the TFG controller 1010, wherein the sequence number is included as part of the security tag. The tag verifier, which is part of TTC, generates a comparison sequence number for selective comparison to the sequence number that is part of the security tag; wherein the sequence number 712 is used for at least detecting data packet loss.

Said system further comprises: a secure time-stamp; wherein the tag generator, which is part of the TFG controller

1010, includes the secure time-stamp as part of the security tag 711 in the generic data packet header. The tag verifier, which is part of TTC 120TTC, generates a comparison secure time-stamp for selective comparison to the secure time-stamp that is part of the security tag.

Said system provides secure communications, comprising: a tag generator operating from an initial generator state to generate a sequence of security tags and related information for association with data packets for transmission; means providing for transmission of the data packets with associated security tags 711 in the generic data packet header; a tag verifier operating from an initial verification state to generate a sequence of comparison tags for selective comparison to the security tags responsive to the related information; and wherein (1) the tag verifier only provides validation of the data packets 111 responsive to comparing the comparison tags and the respective security tags for the respective data packets, and to the synchronization of the initial generator state and the initial verification state and (2) the related information is at least of: program authentication, user authentication, cryptographic authentication, application authentication, encryption, secure time-stamp, time-stamp, clock reading, and digital signature.

Program Hiding and Obfuscating with Secure Logic Interlocking:

In a preferred embodiment, the system provides secure integration of separate logic modules to provide a combined functionality, the system comprising: a plurality of software logic modules operable stand-alone to provide a respective plurality of subtask functions; a transformation controller for interlocking the plurality of software logic modules into a single logic program; wherein the combined functionality is only provided when the plurality of subtask functions are executed responsive to the single logic program.

The system providing secure integration gets an input random bit string 1211 as a parameter and another parameter of plain program consisting of logic modules 1212. It performs the integration of the logic modules using an "obfuscator" 1210; or "program encrypter" 1220; and/or "hidden program generator" 1230, generating modules for remote execution; or execution in memory modules which are not easily available or recognizable and/or "object code program generator" generating software which makes the code unchangeable and/or it embeds the code in a tamper proof device" 1240. In all cases, the outcome is a single logic program which can be an obfuscated program" 1211; and/or "an encrypted program" 1221; and/or "a hidden program" 1231 and/or "an object program" 1241. Examples of various options to be executed are presented in FIG. 12. The program can be integrated where part of it is hidden and another part is encrypted and other such combinations are possible. It is clear to one who is familiar with the art how to combine and super-impose the transformation above and variation thereof as part of the system for secure integration.

The exact sequence and nature of the obfuscation and/or encryption transformations maintain the logic of each of the module, but makes the executable logic a unique integrated logic which is to be executed as one logic without the user being able to separate the modules, are also subject to variation, and is known in the art as explained in the background for the present invention.

In a preferred embodiment, the system for secure integration can be safely run (execute), wherein the single logic program is written to be immune to reverse generation; namely, there is no effective way to separate by reverse engineering the module to be executed separately.

The system can be executed on various inputs and in particular, wherein one of the software logic modules provides a cryptographic function for producing pseudo-random sequence of security tags vectors 711. In the case where this module is not available for reverse engineering then there is no way to generate the output sequence of security tags due to the strength of unpredictability of cryptographic functions.

The system in this case can use various means known in the art and run, wherein producing pseudo-random sequence of security tags involves computation by at least one of the following methods: applying a pseudo-random generator, applying a pseudo-random function, applying a cryptographic function, applying, an encryption function, applying a scrambling subroutine, applying an authentication function, applying a digital signing function, applying a cryptographic hash function, applying a subroutine, applying a computational logic module, applying a symmetric cryptography function, applying an asymmetric cryptography function, employing a cryptographic key, employing a cryptographic seed, employing an encrypted software, employing an obfuscated software, employing a hidden program, employing logic with a set of parameters, employing a hardware module, employing a smart card, employing a portable device, and employing a distributed protocol. These methods are examples and not exclusive and are available in the art as software and/or hardware subroutines.

The system of the secure logic integration achieves a mechanism where the single logic program (in one of many forms 1211,1221,1231,1241) can now perform in one location (e.g., a TFG 110TFG) as a hidden program portion 414, and signal the security tag (with various fields as in 711,712, 713,714) and due to the uniqueness of the module and the fact that the input logic modules are now interlocked and are executed all together, we are assured that the functionality of the separate logic modules is faithfully executed when the signal is correctly generated. When the security tags are attached to a stream of packets as in 111, they can be checked at another location e.g., the TTC 120TFG. The checking 910 assures the origin of the security tags and thus the stream of packets. The TFG controller 1010 uses the unique logic module and thus functionally also the pseudo random tag generator 1020, whereas the TTC controller 1110 employs the pseudo random tag generator 1120 to check the tag by comparison.

In a preferred embodiment, the system for secure integration is run, where one of the software logic modules provides logic to construct data packets. In fact, such logic modules can be any type of networking software, and a combination of networking modules can be integrated as well. The notion of data packet is general and for example, we can execute the system for providing logic integration, wherein logic to construct data packets computes at least one of: IP data packet, TCP/IP data packet, UDP data packet, ATM data packet, MPLS data packet, TCP SYN signal, PING signal, ICMP signal, IPv4, IPv6, FC frame, cable modem frame, Ethernet frame, and data packet segmentation.

The system for secure logic integration provides a single logic module which hides certain rules of execution, thus the mechanism assures to interlock the signal generation of security tags and the rules of execution. In particular, the system is run wherein one of the software logic modules provides rules of transmission. These rules are part of a computation, and the system is run, wherein the rules of transmission compute at least one of: performance characteristics, access characteristics, transmission limitations, transmission rates, window sizes, port numbers, IP addresses, network addresses, quotas, renewable quotas, packet structure limitations, and schedule.

Indeed, a combination of rules is possible, as well, to assure a number of execution rules are followed for various transmissions and various operations.

The system of secure integration of separate logic modules can integrate rules, wherein at least one of the rules of transmission determines a renewable precondition for transmission. This will enforce the TFG controller 1010 to request and receive renewable codes and parameters 1041 from a TFG renewable controller 1040 when the single module will be executed in the TFG controller. The system of secure integration can be run wherein the renewable precondition for transmission is least one of: renewable transmission quota of trusted data packets, number of trusted data packets that can be transmitted per unit of time, time signal, UTC time signal, digitally signed time signal, digital cash for transmission of trusted data packets, and cryptographic keys for marking trusted data packets. These quota oriented methods and cryptographic refresh parameters methods are known in the art. However, in accordance with one aspect of the present invention, logic has to be integrated for recognizing renewable condition and activation of renewable codes and parameter receipt process when precondition for transmission is not valid. The system can be constructed wherein the renewable precondition for transmission is obtained from at least one of: a predefined logic, an external rule controller, a security management system, network interface, network appliance, server, network management system, firewall, local computation, smart card device, and portable device. These are examples of possible location and operation of the TFG renewable controller 1040.

The system for secure integration can get as input where combinations of individual software modules are provided as input. A first example is where it can be run, wherein one of the software logic modules provides a cryptographic function for producing a pseudo-random sequence of security tags; and wherein one of the software logic modules provides logic to construct data packets. A second example is the system wherein one of the software logic modules provides a cryptographic function for producing a pseudo-random sequence of security tags; and wherein one of the software logic modules provides rules of transmission. A third example is the system wherein one of the software logic modules provides a cryptographic function for producing a pseudo-random sequence of security tags; wherein one of the software logic modules provides logic to construct data packets; and wherein one of the software logic modules provides rules of transmission.

A demonstrative example is illustrated in FIG. 14, where the plain program components to be integrated are a well-behaved operational program (e.g., a TCP program in the context of the Internet protocol) that has defined rules of transmissions (e.g., a window size), a second component is a cryptographic program for security tag generation, a third is a parameter table (with e.g., the seed for a pseudo random generator) and a fourth component is a control program for adding rules to the integrated task (e.g., automatic refresh parameters for the renewable rules).

In accordance with another aspect of the present invention, to achieve a large set of possible hidden programs, we need the system of secure integration of software modules, further comprising: a source of interlocking parameters 1211; and wherein the transformation controller is further comprised of means for combining the software logic modules according to defined interlocking logic responsive to the interlocking parameters. The source of interlocking parameters is generated by a random source, cryptographic keys, or a defined table and location in memory. Other methods that allow the logic to choose from a large set of options are possible to the one familiar with the art and one can employ cryptographic means and decision tree logic for activating transformations in a random and unknown fashion.

This provides a system, wherein the transformation controller (1210, 1220, 1230, 1240) determines an intermixture of the subtask functions of the plurality of software logic modules into the single program to provide the combined functionality. Further, the system is such, wherein the intermixture can be provided in a defined plurality of different ways; and wherein each of the different ways provides a different one of the single program providing the combined functionality.

The resulting system is such wherein the intermixture is further comprised of at least one of: obfuscation, encryption, replication, adding dummy code, addition of redundant control, renaming of variables, splitting a procedure into multiple sub-procedure, dictionary transformation, compilation, interpretation, cryptographic transformation, digital signing, and scrambling. Other transformation that change the representation of the logic and its way of execution but do not change the meaning and results of the logic are in the art.

For example, it can comprise a system wherein replication comprised of repetitions of the software logic modules into an oversize program comprising the single program embedded therein; and we can have this system, wherein each repetition is made active separately to define an active single program within the oversize program, which acts as the single program.

In many situations, in accordance with another aspect of the present invention, for the system for secure integration, the transformation controller further generates external software modules for linked operation with the single program required for the combined functionality is needed. For example the resulting single program (in the TFG 110TFG) may be required to consult with another subsystem (the TTC 120TTC) where the external software modules reside and operate.

The system for secure integration of software modules, which also generates external logic modules, can be run where it is further comprised of means for transmitting the external software modules to separate computing subsystems; and wherein the external software modules are executed in the separate computing subsystems to provide at least one of: update information and renewable information coupled to the single logic program.

The system can be executed wherein means for transmitting further involve at least one of: encryption, authentication, and digital signing. The system can be run wherein the update information is at least one of: change data, change executable code, change pattern, change order and pseudo-change of dummy code.

The system can be run, wherein the renewable information is at least one of: renewable transmission quota of trusted data packets, number of trusted data packets that can be transmitted per unit of time, time signal, UTC time signal, digitally signed time signal, digital cash for transmission of trusted data packets, and cryptographic keys for marking trusted data packets.

Note that the system of secure integration can be further comprised of means for transmitting of the single logic program to a primary computing system. The system can be run wherein means for transmitting further involve at least one of: encryption, authentication, and digital signing.

In particular, the system can be combined wherein there is security verification information generated by the transformation controller, for utilization by a separate security tag verification logic in a separate communications subsystem which validates the security tag.

Such an operation by the resulting single program and resulting external software modules is illustrated in FIG. 13, where the single program is exemplified by a distributed execution of first hidden program 1310 is required to call 1311, 1313 and get returns 1312, 1314 when executed. The external software modules of codes 1340 and parameters 1350 are responsible for the returns. This distributed execution is activated on a data packet with empty generic parameters 1301. To demonstrate that a single program operation can be repeated in many places and by various software components in the computing subsystem we can view the continuation of the execution in 1310 that continues with 1330 but on the output of 1310 which is a data packet with first generic parameters 1302. The operation is a second single program represented by a distributed execution of second hidden program 1330 with calls 1331, 1333, and returns 1332, 1334 from a second code 1360 and second parameters 1370 in a second external software modules.

The system of secure integration of separate logic modules can be such wherein one of the software logic modules provides security services. There are many examples of such services. The services can combine users and programs in a secure way and integrate them into the operational modules, generating a security tag based on them and generating it on the operational level without the need for extra operations from the user or the program. In fact, the system can be such, wherein the security services include means for at least one of: user authentication, user sign-on, data packet authentication, user login, applying user's cryptographic keys, applying organization's cryptographic keys, and digital signing. It can be such wherein security services further provides means for applying cryptographic transformations based on keys belonging to a primary computing system. The primary computing system can be the one that includes means for execution of single logic program.

One embodiment of the present invention embeds security services automatically into the operational level. The services can authenticate elements and embed the authentication information in the security tags. This will result in a virtual private network implemented in the operational level of packet handling and rules of transmission.

The system can be such that one of the software logic modules provides for a cryptographic function for producing pseudo random sequence of security tags, and further comprising of means for providing one of the software logic modules to a secondary computing subsystem.

The generation of the hidden program single module and the external modules and the distribution are all part of the transformation controller and constitute together with the logic component for transformations, cryptography and transmission the system enabling a single logic module which has a combined functionality.

Figure 16:
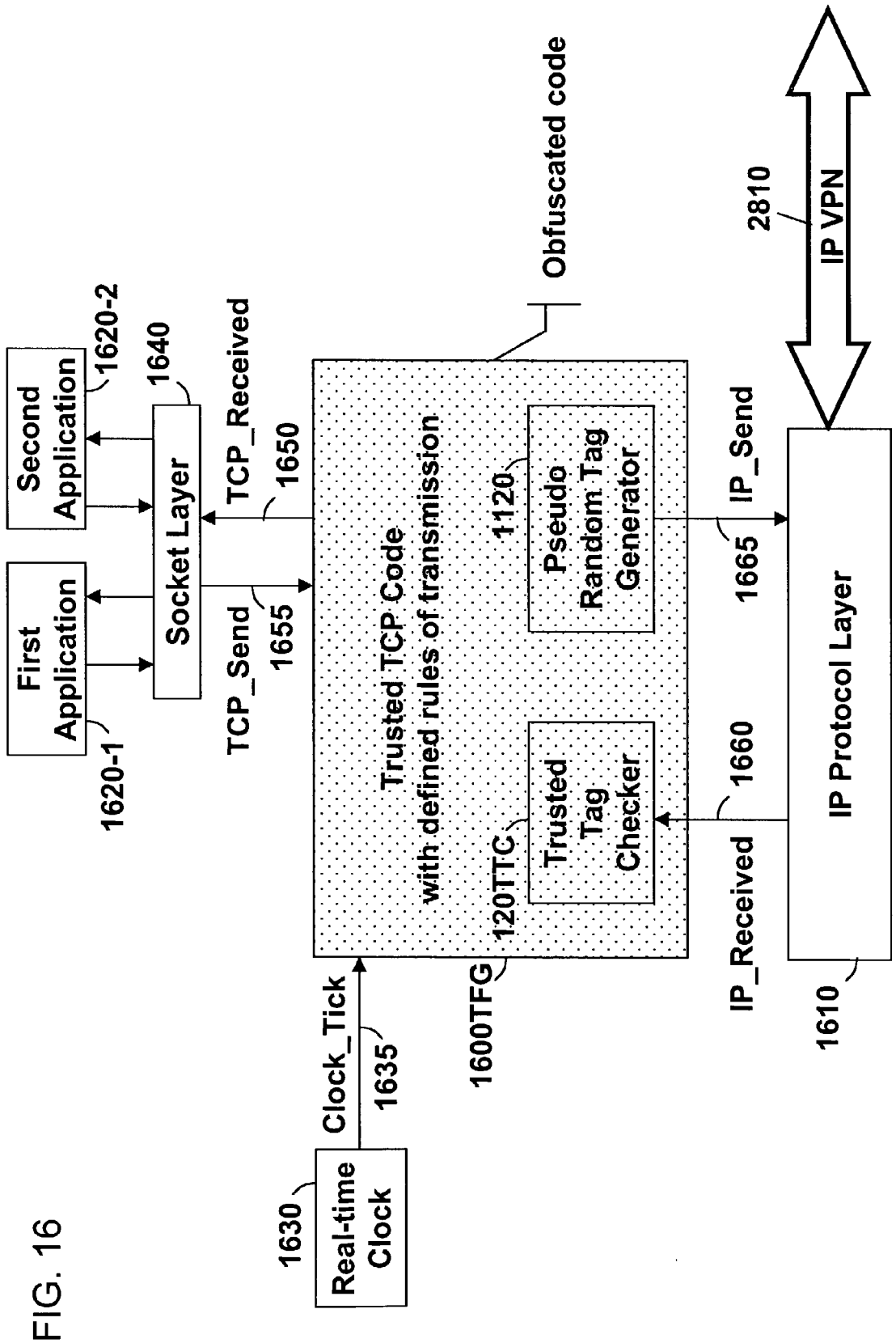
FIG. 16 is a functional block diagram of the high protocol layers of a protocol stack that includes a trusted Transmission Control Protocol (TCP) layer, wherein the trusted TCP layer is augmented with obfuscated code for generation and checking of secure tags.

Hiding and Obfuscating TCP (Transport Control Protocol):

FIG. 16, FIG. 17, FIG. 18, FIG. 19, and FIG. 20 show a possible embodiment of the present invention for allowing the network to verify and authenticate the proper operation of the TCP layer implementation on the users' terminals. FIG. 16 illustrates the high protocol layers of a protocol stack, wherein a plurality of applications 1620-1 and 1620-2 transmit and receive data units to and from other plurality of applications through an interface layer named socket layer 1640. The socket layer 1640 translates requests to send data units by each of the plurality of applications 1620-1 and 1620-2 into requests TCP_Send 1655 to a Trusted TCP Code 1600TFG for sending sequences of bytes to a remote end system. The socket layer 1640 hands to the respective one of the plurality of applications 1620-1 and 1620-2 sequences of bytes provided by the TCP code 1600TFG though data line TCP_Received 1650, wherein each sequence of bytes had been previously received from a remote end system by the TCP code 1600TFG.

The Trusted TCP Code 1600TFG implements defined rules of transmission for the reliable exchange of bytes with a remote TCP layer instance through a bi-directional TCP connection. Bytes provided by the Socket Layer 1640 through data line TCP_Send 1655 are organized in data units called TCP segments and transferred to an Internet Protocol Layer 1610 through data line IP_Send 1665. The IP Protocol Layer 1610 is responsible for delivery of TCP segments to a remote IP Protocol Layer 1610 entity that transfers them to the respective Trusted TCP Code 1600TFG through data line IP_Received 1660.

The Trusted TCP Code 1600TFG includes a Pseudo Random Tag Generator 1120 for generation of a security information to be included in a TCP segment that is transmitted, wherein the security tag information is aimed at certifying that the corresponding TCP segment was generated by a Trusted TCP Code 1600TFG, e.g., the TCP transmitter that originated the TCP segment operates in compliance with defined rules of transmission. Network nodes, e.g., routers, switches, gateways, proxies, and network appliances, and the destination can use the security information enclosed in a TCP segment to verify that it was generated by Trusted TCP Code 1600TFG.

In an alternate embodiment, the security information encompasses a Security Tag Vector and a Security Tag Serial Number, as previously described within the present disclosure. In another embodiment the security information is carried with the Acknowledgment number field within the TCP header, whereby such field is not used to carry piggybacked acknowledgement information. In an alternative embodiment the TCP header is modified to include an additional field carrying the security information. In an alternative embodiment the security information is enclosed within the TCP payload.

In one embodiment, the Trusted TCP Code 1600TFG includes a Trusted Tag Checker 120TTC for verifying the security information included within TCP segments received through data line IP_Received 1660.

The Trusted TCP Code 1600TFG receives external timing information from a real-time Clock 1630 through a Clock_Tick 1635 line for implementing timers essential for proper TCP operation as it is described in the following. (Further detail can be found in, "Internetworking with TCP/IP" by D. E. Corner, Prentice-Hall, Third Edition, 1995, ISBN 0-13-216987-8; "TCP/IP Illustrated, Vol. 1: The Protocols" by W. R. Stevens, Addison-Wesley, Reading, Mass. 1994.)

Figure 17:
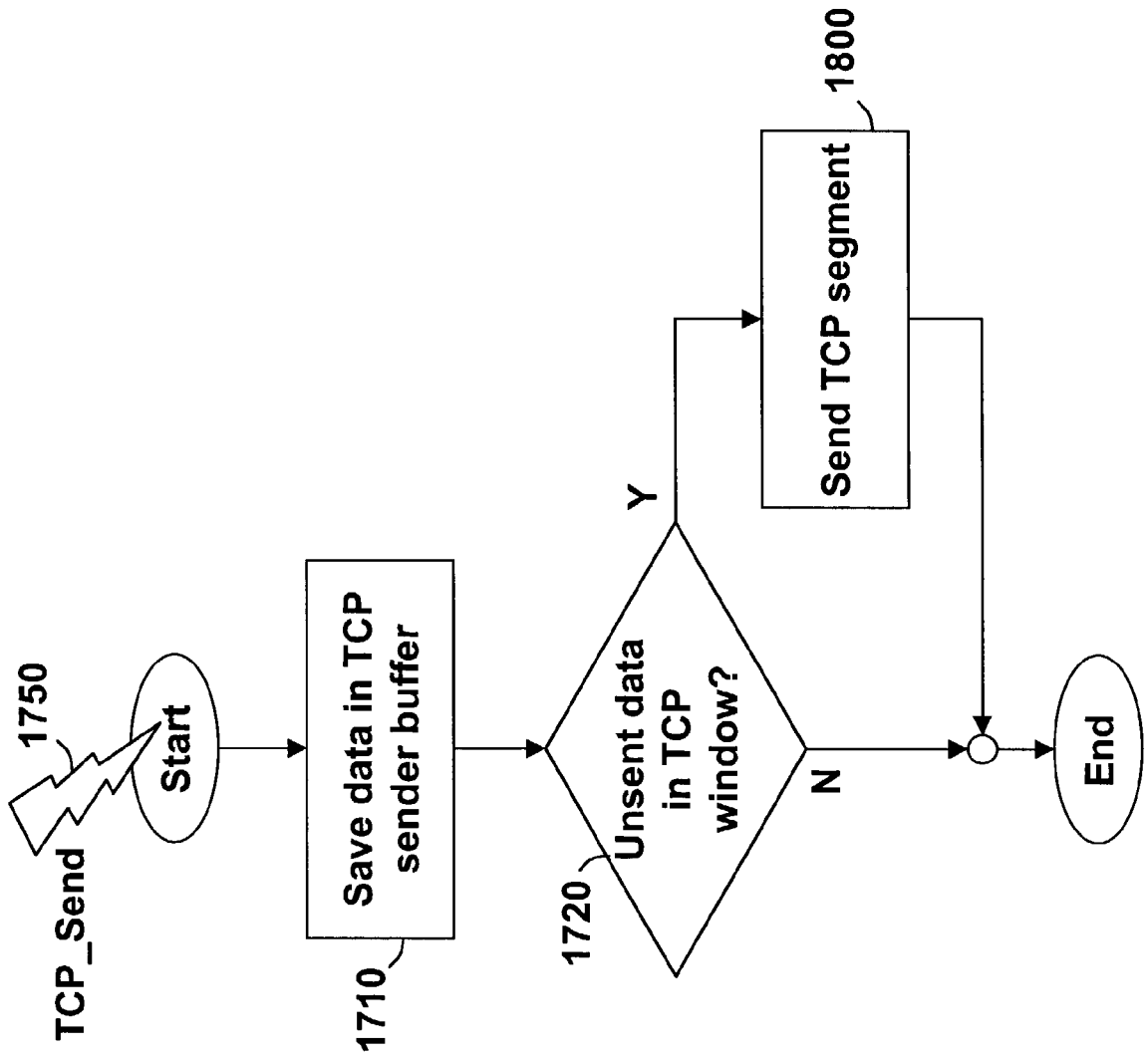
FIG. 17 is a flow diagram of the TCP operations performed by a TCP sender instance when the higher layer requires transmission of data.

FIG. 17 illustrates the operation of the Trusted TCP Code 1600TFG upon being provided, through data line TCP_Send 1655, with data bytes to be transmitted 1750 to a respective remote TCP layer entity. The provided data bytes are stored in a respective TCP sender buffer 1710 that contains all the data bytes for which delivery has been requested by at least one of a plurality of applications and delivery has not been confirmed yet by a corresponding remote TCP layer entity.

Next, the Trusted TCP Code checks 1720 whether the TCP transmission window includes data bytes stored in the sender buffer and not yet sent, in which case a procedure which task is to assemble and send a TCP segment 1800 is initiated.

Figure 18:
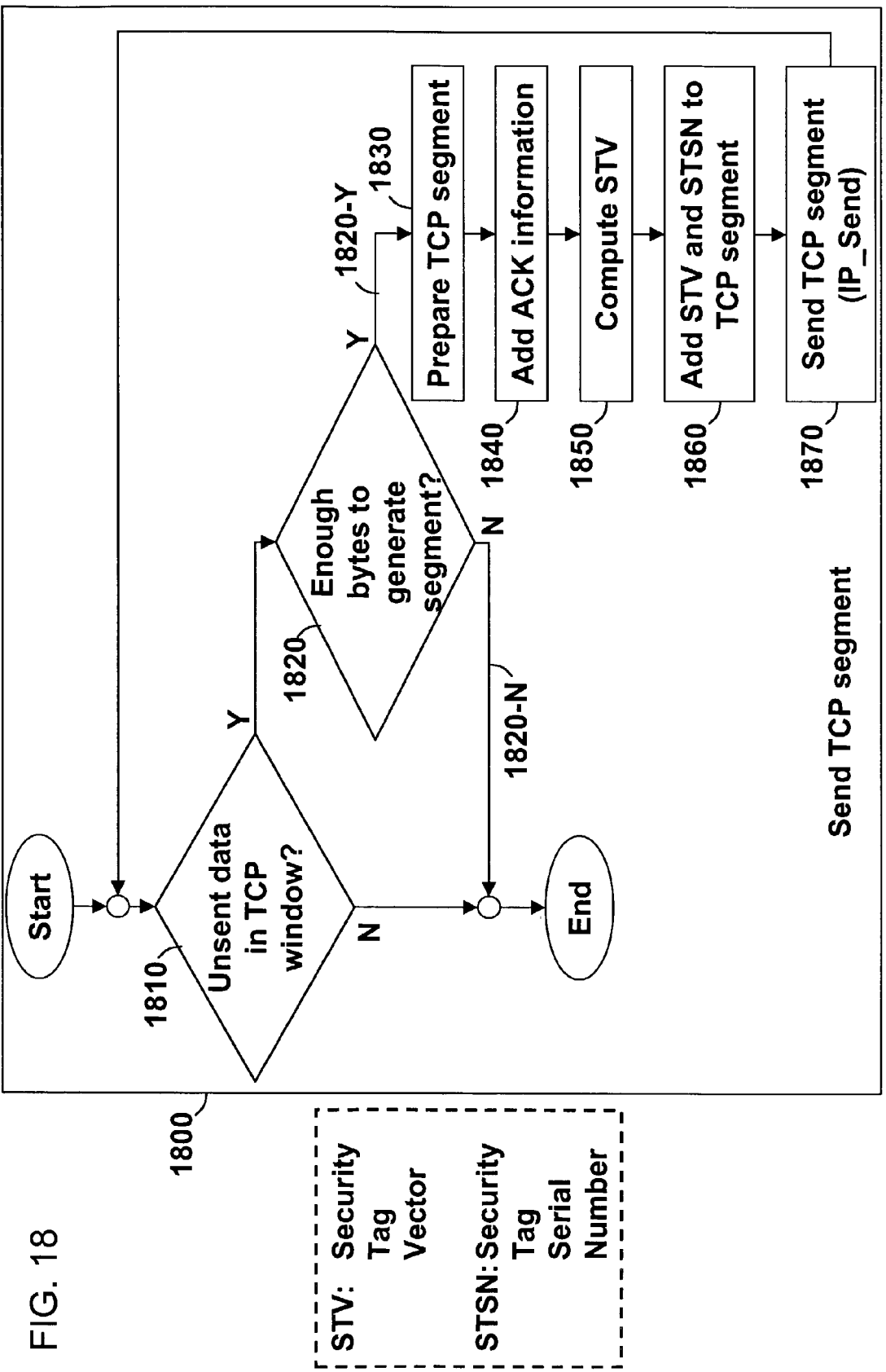
FIG. 18 is a flow diagram of the TCP operations performed by a TCP sender instance when unsent data is present within the TCP sender window, wherein the operations include computing a secure tag vector (STV) and a security tag serial number (STSN) both to be sent with a TCP segment.

FIG. 18 illustrates an embodiment of the present invention, for the procedure by which to send a TCP segment. The procedure consists of an execution loop that is repeated as long as 1810 the TCP transmission window includes data bytes stored in the sender buffer which are not sent yet. If the amount of such bytes does not exceed a minimum threshold for which sending a TCP segment is considered worthy 1820, the Send TCP Segment 1800 procedure is terminated 1820-N.

Otherwise 1820-Y, a TCP segment is prepared for transmission 1830, i.e., the corresponding header fields are computed, the header is assembled, and the corresponding data bytes appended as a payload. If the TCP layer entity has to acknowledge the reception of data bytes along the other direction of the TCP connection, the acknowledgement information is added and put inside the corresponding TCP header fields 1840. In the preferred embodiment the acknowledgment information consists of an Acknowledgement number that identifies the last in-sequence byte received, and an ACK bit flag that indicates that the acknowledgement number field contains a valid value.

The security tag vector (STV) 711 is then computed 1850 and, together with a Security Tag Serial Number (STSN) 712, coupled to the TCP segment 1860. Finally, the TCP segment including the security information is sent 1870 by transferring it to the IP layer entity through data line IP_Send 1665 in FIG. 16.

Figure 19:
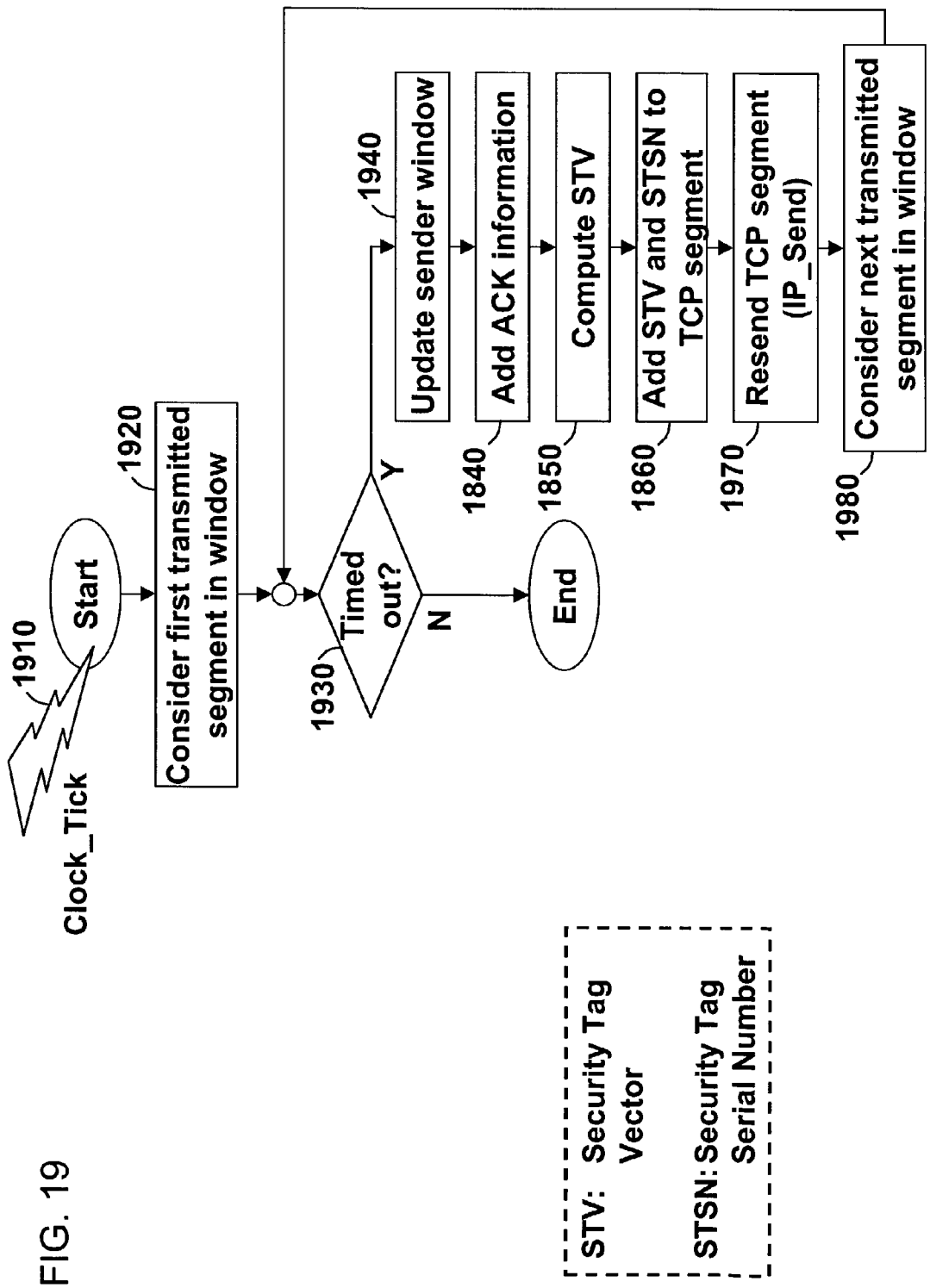
FIG. 19 is a flow diagram of the TCP operations performed by a TCP sender instance when a retransmission time-out expires and previously transmitted data are retransmitted together with attached STV and STSN.

FIG. 19 illustrates an alternate embodiment of the present invention, wherein operations are performed by the Trusted TCP Code 1600TFG each time a timing signal is provided 1910 by the Real-time clock 1630 in FIG. 16 through line Clock_Tick 1635. The first transmitted TCP segment contained in the transmission window is considered 1920 and an execution loop is repeated for each transmitted TCP segments contained in the TCP transmission window whose corresponding associated re-transmission times has timed-out 1930.

The TCP sender window is updated 1940 according to the defined rules implemented by the Trusted TCP code 1600TFG. In one alternate embodiment of the present invention, the window size is halved. In another alternate embodiment, the window size is reduced to one TCP segment. In yet another alternate embodiment, the window size is decreased in at least one of: a linear way, a multiplicative way, an additive way, and an exponential way. In another embodiment, the window size is left unchanged.

If the TCP layer entity has to acknowledge the reception of data bytes along the other direction of the TCP connection, the acknowledgement information is added and put inside the corresponding TCP header fields 1840. In the preferred embodiment the acknowledgment information consists of an Acknowledgement number that identifies the last in-sequence byte received, and an ACK bit flag that indicates that the acknowledgement number field contains a valid value.

The security tag vector (STV) is then computed 1850 and, together with a Security Tag Serial Number (STSN), coupled to the TCP segment 1860. Finally, the TCP segment including the security information is re-sent 1970 by transferring it to the IP layer entity through data line IP_Send 1665 in FIG. 16. The next transmitted TCP segment contained in the TCP sender window is considered 1980 for the next iteration of the execution loop.

Figure 20:
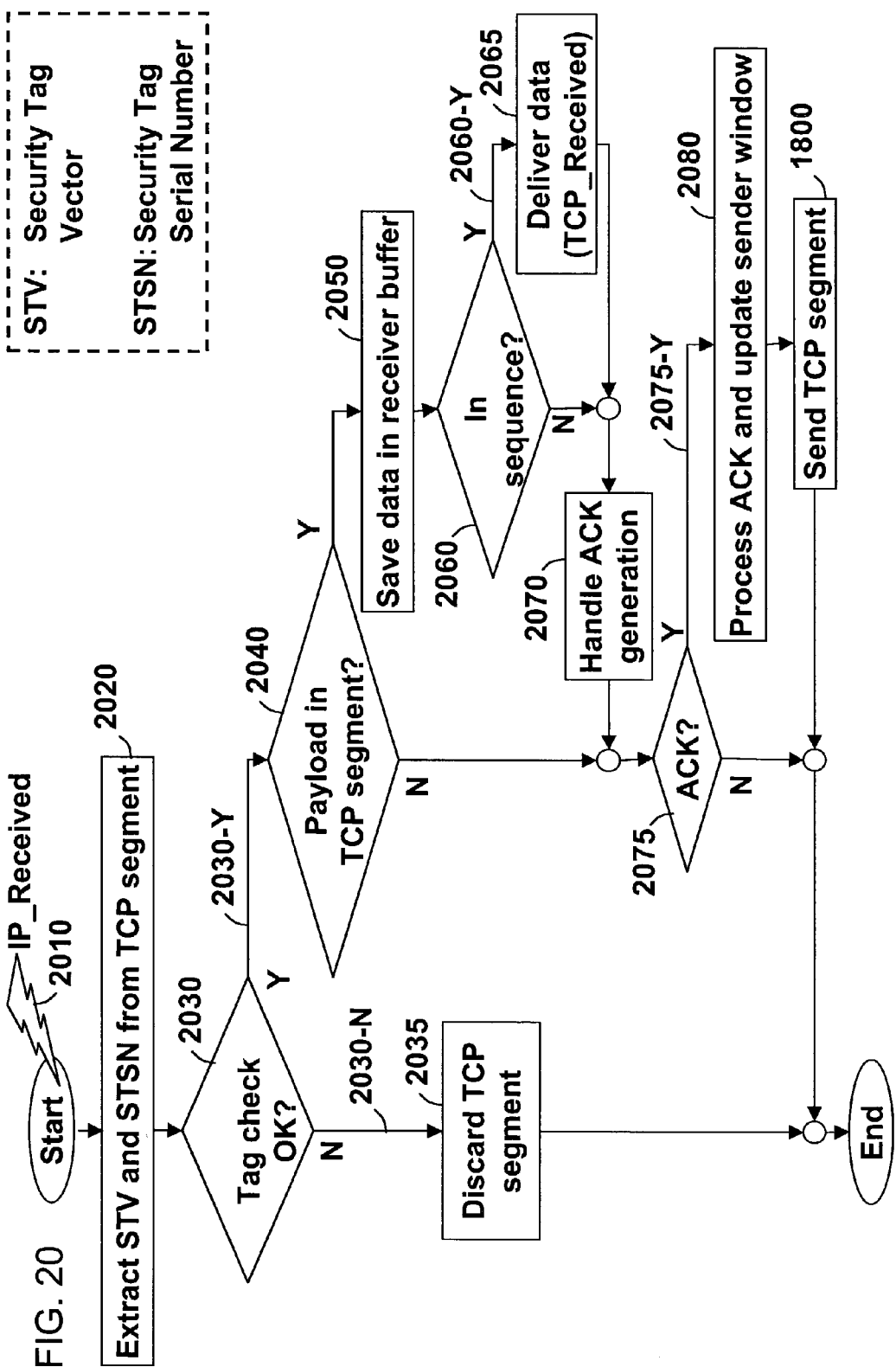
FIG. 20 is a flow diagram of the TCP operations performed by a TCP receiver instance when a new TCP segment is received, including checking a security tag and processing acknowledgment information.

In one preferred embodiment, the STV and STSN are extracted from the received TCP segment 2020 and the Trusted Tag Checker 120TTC in FIG. 16 included in the Trusted TCP Code 1600TFG checks that the STV has been properly generated 2030 in FIG. 20. This enables the receiver Trusted TCP Code 1600TFG to verify that the corresponding received TCP segment has been sent by a sender Trusted TCP Code 1600TFG operating according to defined rules for transmission.

According to such preferred embodiment if the check on the tag 2030 reveals that the TSV has not been properly generated 2030-N, the corresponding received TCP segment is discarded and not processed any further.

If the check on the tag 2030 reveals that the TSV has been properly generated 2030-Y, the Trusted TCP Code 1600TFG checks whether the received TCP segment contains a payload 2040, in which case the payload is processed as described in the following. The data bytes contained in the payload are saved in a receiver buffer 2050. Then the content of the sequence number field in the TCP header of the respective received TCP segment is considered for checking 2060 whether the data bytes carried in the payload field of the respective TCP segment are in sequence with the data bytes carried within previously received TCP segments.

If the first data byte in the payload of the respective received TCP segment immediately follows the last consecutive byte received 2060-Y, the data bytes contained in the payload field of the respective received TCP segment can be delivered 2065 to the respective destination application 1620-1 and 1620-2 in FIG. 16, through data line TCP_Received 1650. In yet another embodiment, all of the data bytes contained in the payload field of the respective received TCP segment are provided to the respective destination application 1620. In another embodiment, at least one of only part of the data bytes and none of the data bytes are delivered to the respective application 1620. In yet another embodiment, the data bytes contained in the payload field of the respective received TCP segment are provided to the respective destination application 1620 together with data bytes contained in the payload filed of previously received TCP segments that had been stored in the receiver buffer but not yet delivered to the respective destination application 1620.

Acknowledgement of the received data bytes is then taken care of 2070. In one embodiment, a TCP segment is sent to the sender of the received TCP segment; the sequence number of the last in-sequence byte received and the ACK bit flag, which indicates that the Acknowledgement Number field contains a valid value.

In an alternate embodiment, acknowledgment information is not sent to the sender of the received TCP segment within a TCP segment generated explicitly for this purpose; instead, the acknowledgement information is piggybacked within the header of a TCP segment carrying data bytes to the sender of the received TCP segment. In an alternative embodiment, transmission of acknowledgement information is delayed until more data bytes are received within the payload field of successively received TCP segments.

Next, the Trusted TCP Code checks whether the received TCP segment contains valid acknowledgement information 2075. In the preferred embodiment this is accomplished by checking the ACK flag bit contained in the header of the TCP segment. If the header of the received TCP segment contains valid acknowledgement information 2075-Y, such information is processed 2080 and the sender window of the Trusted TCP Code 1600TFG is properly updated according to the defined transmission rules. Then the procedure for sending TCP segments 1800 is entered.

Figure 21:
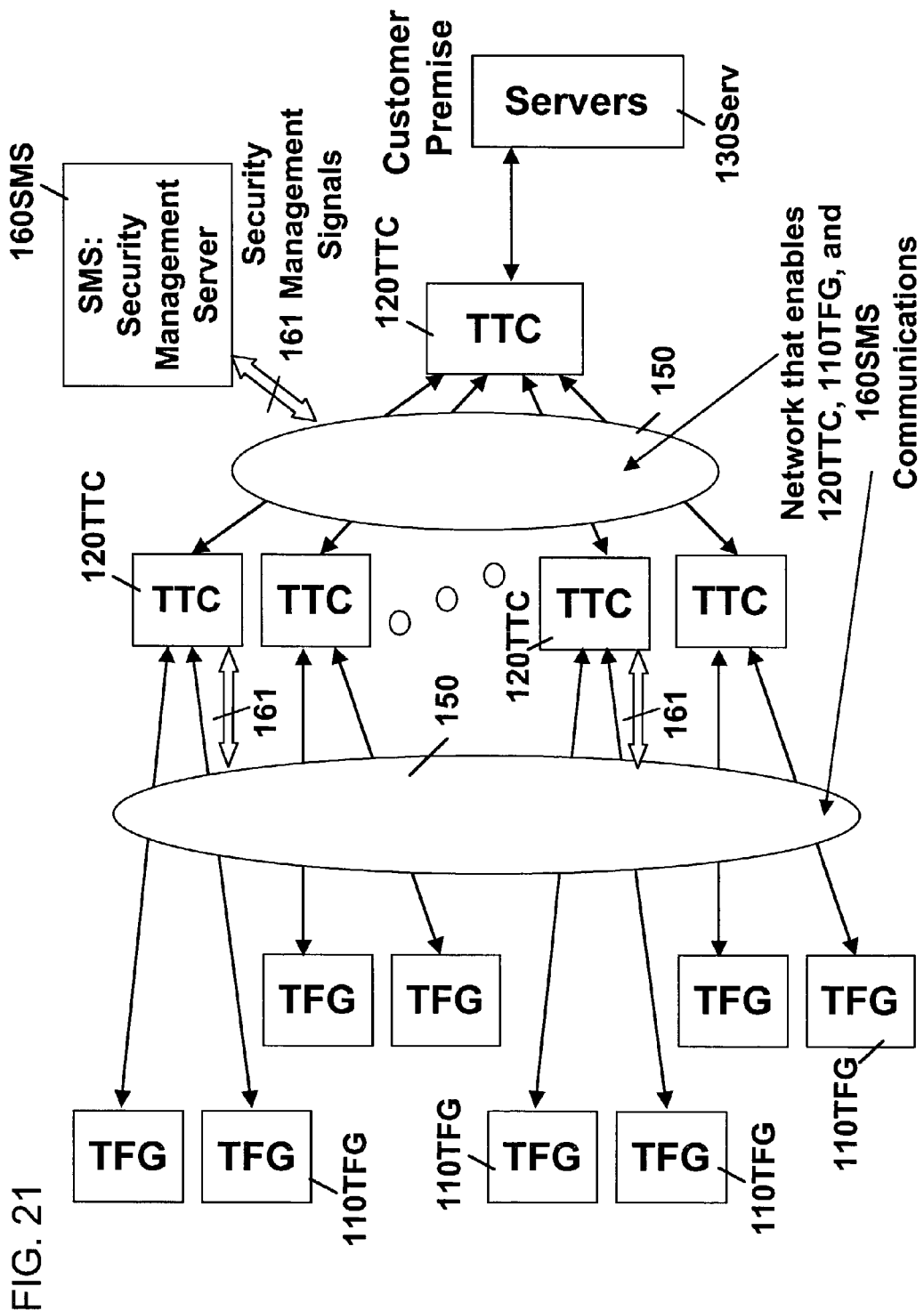
FIG. 21 is a description of a system consists of a plurality of TFGs, a plurality of TTCs, and plurality of secure management servers (SMSs), such that, the TTCs together with the SMSs are capable of detecting unexpected communications patterns.

Management of Trusted Flow System:

FIG. 21 illustrates a system consisting of a plurality of TFGs 110TFG, a plurality of TTCs 120TTC, and plurality of secure management servers (SMSs) 150SMS, such that, the TTCs together with the SMSs are capable of detecting and reacting to various unexpected communications patterns. The TFGs, TTCs and SMSs are capable of communicating with one another via a network 150. The SMSs and TTCs are further capable of exchanging security management signals 161 in a manner described in FIG. 23, FIG. 24, FIG. 25 and FIG. 26.

As illustrated in FIG. 21, the TTC controls the flow of data packets to servers 130Sery that are located in costumer premises. Such costumer premises include, but are not limited to: enterprise networks, local area networks, virtual private networks, enterprise networks and storage area networks.

Figure 22:
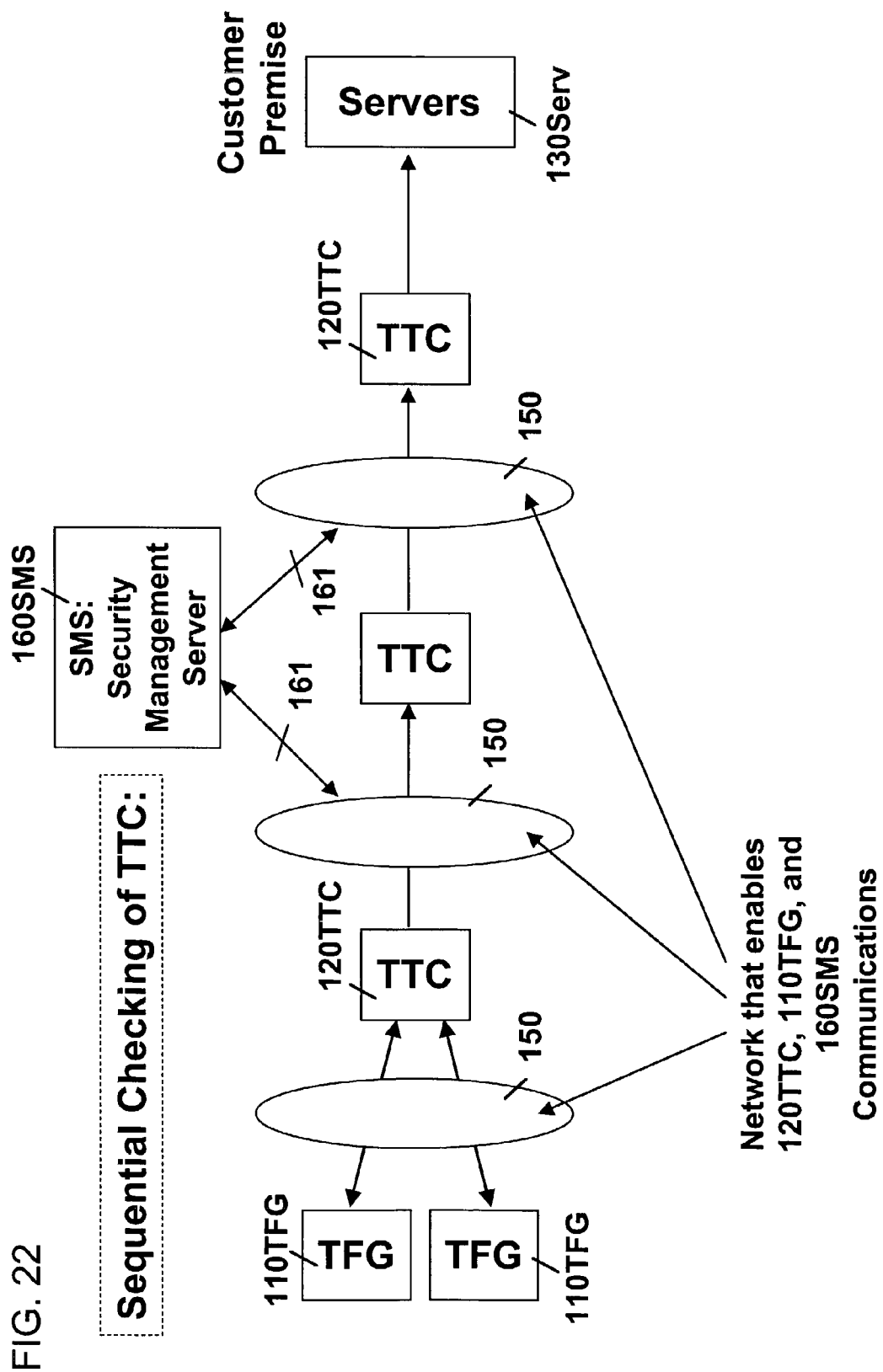
FIG. 22 is a description of a system consists of a plurality of TFGs and a sequence of TTCs, such that, the TTCs are capable of authenticating the path traversed by data packets that were sent from the TFGs.

FIG. 22 illustrates a system consisting of a plurality of TFGs and a sequence of TTCs, such that, the TTCs are capable of authenticating the path traversed by data packets 111 that were sent from the TFGs.

In another embodiment of the present invention, the system in FIG. 22 controls the data packet flow over at least two computing elements, which are TFG 110TFG and TTC 120TTC each comprising means for generating security tag vectors 711 (shown in FIG. 7). Each TFG 110TFG has further means for associating the security tag vector 711 with a first computing element responsive to compliance logic. The TFG further includes means for generating a data packet, which includes a security portion. The security portion is a security tag vector 711, as it was described in detail in FIG. 8 and FIG. 10. The system in FIG. 22 further includes means for transmitting the data packet over a communications path. The TTC 120TTC constitutes a second computing element and has further means for receiving the data packet and capability for processing the data packet to validate the security tag vector 711, as was described in detail in FIG. 9 and FIG. 11.

The system shown in FIG. 22, further comprises means for transmitting the data packet from the second computing element, which operates as TTC, as described in FIG. 9 and FIG. 11, for further processing in at least a third computing element, which operates as the ITC, as described in FIG. 9 and FIG. 11. The result of the sequential checks by the sequence of TTCs is validation that the sequence data packets with the sequence of security tag vectors 711 have been transmitted over a predefined communications path or route in the network 150. In general, the communications path includes second computing element, third computing element and so on, each of which has the TTC 120TTC functionality (as was described in detail in FIG. 9 and FIG. 11) capable of validating that the sequence data packets with the sequence of security tag vectors 711 have been transmitted over a predefined communications path or route in the network 150.

FIG. 23 illustrates the various operation management messages (OMMs) exchanged among the TTCs and SMSs for detecting unexpected communications patterns and the various possible responses messages when detecting such pattern. In some embodiments of the present invention, the content of OMMs are: (1) authenticated and signed (A and S) and/or (2) sent with TS (time stamp), wherein TS are in some cases from UTC 002.

The OMMs that are illustrated in FIG. 23 have the following fields. For initialization operations: (I1) HP: Hidden Program, (I2) CP: Checker Program and (I3) Registration. During run-time the following run-time reports are exchanged among the TTCs and SMSs: (R1) PU(N): Number of Premium Users and (R2) A(L): Attack Location. As a result of detecting unexpected communications pattern the following run-time action messages are exchanged among the TTCs and SMSs: (A1) D/E: Disable/enable non-premium users and (A2) LPU(N): Limit the Number of Premium users. The manner in which the various messages are exchanged is shown in detail in FIG. 23.

Figure 24:
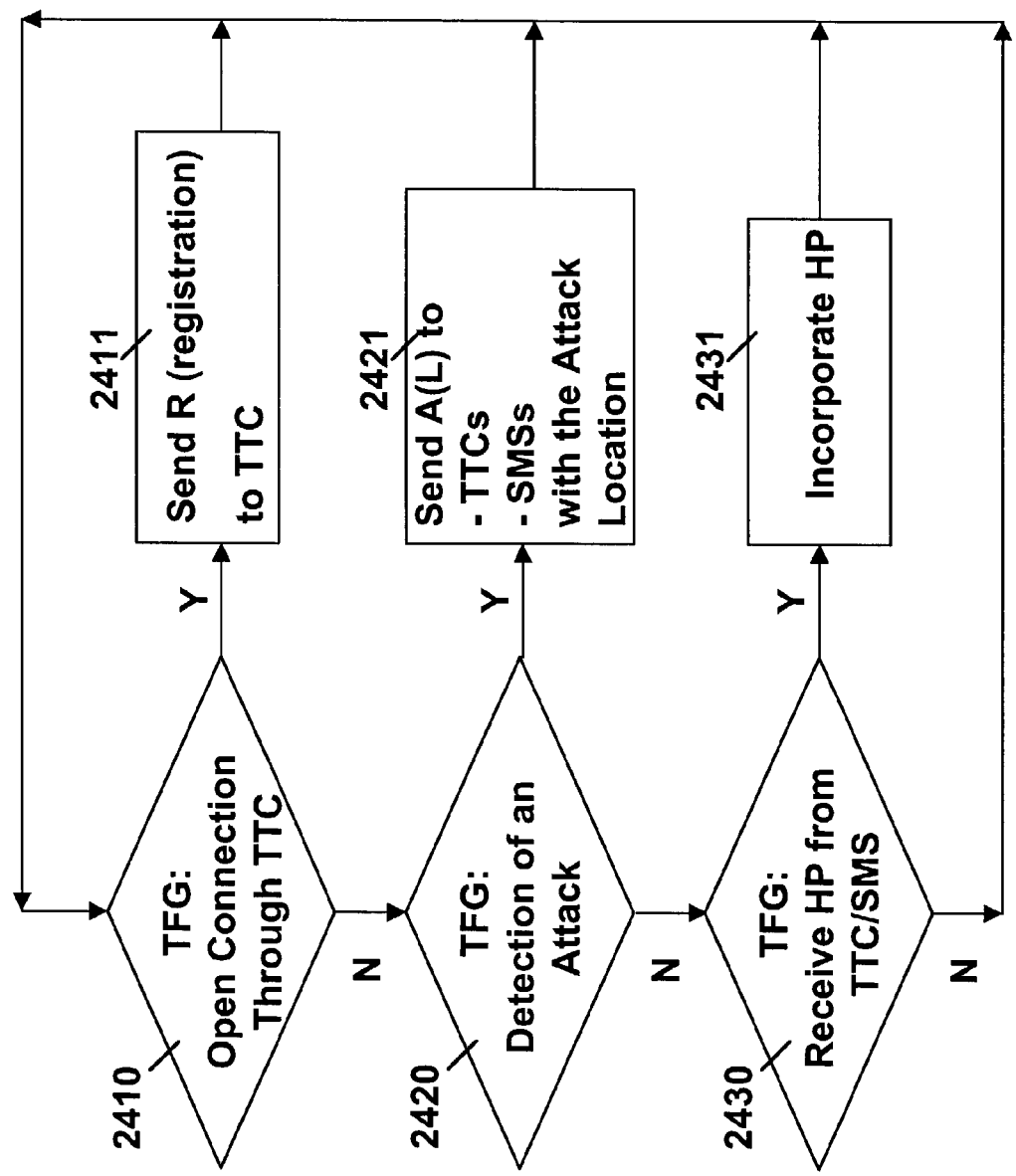
FIG. 24 is a flow chart describing the TFG operation before and after detecting unexpected communications patterns.
Figure 25:
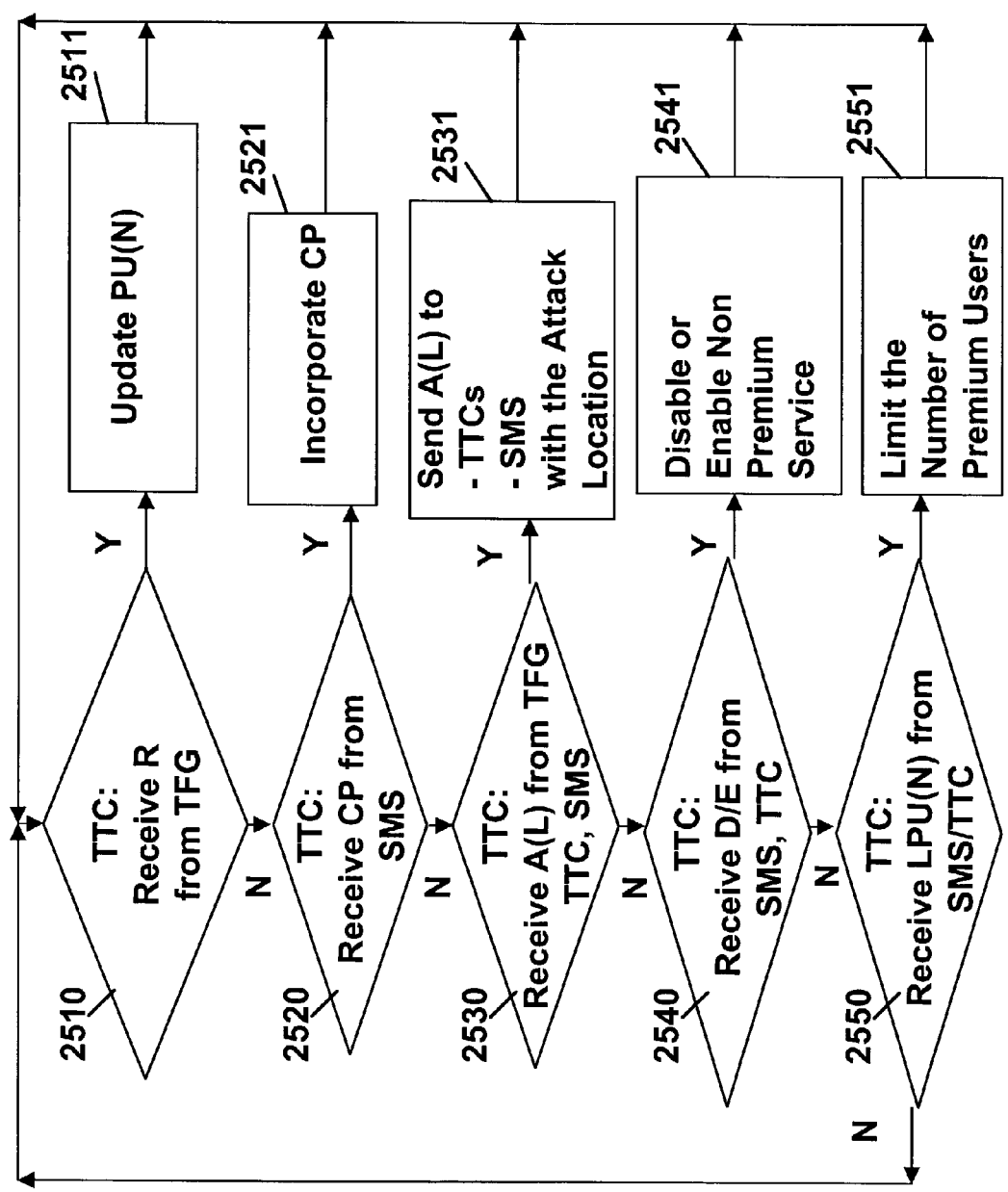
FIG. 25 is a flow chart describing the TTC operation in order to detect and after detecting unexpected communications patterns.
Figure 26:
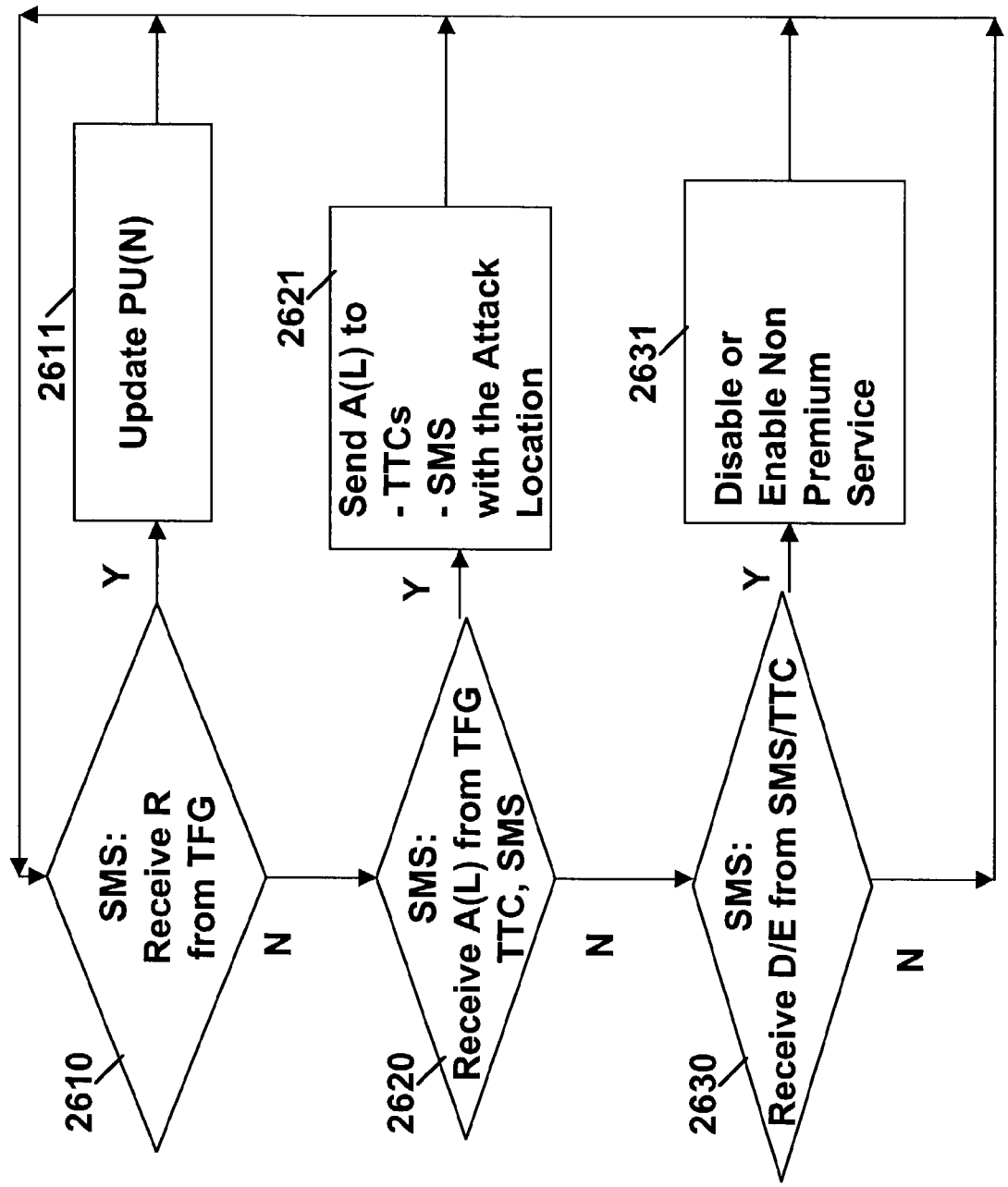
FIG. 26 is a flow chart describing the SMS operation in order to detect and after detecting unexpected communications patterns.

The manner in which the TFGs, TTCs and SMSs are acting and responding is described in detail, and is illustrated in FIG. 24, FIG. 25 and FIG. 26, respectively.

FIG. 24 illustrates the TFG 110TFG operation before and after detecting unexpected communications patterns. When a TFG opens a connection through a TTC 2410 the TFG sends a registration message R to this TTC 2411. In some embodiments of the present invention, the connection can be a virtual private network (VPN) connection 2810—as shown in FIG. 28. When TFG detects an attack 2420, the TFG sends A(L) or attack location message to TTCs and SMSs 2421. When TFG receives HP (hidden program) message from TTC or SMS 2430, the TFG incorporates the HP into its operational code 2431. This last operation is equivalent to the renewable and update operations that were described in detail in FIG. 10, specifically, the operations of the TFG renewable controller 1040 and TFG update controller 1050.

FIG. 25 illustrates the TTC 120TTC operation in detection and after detecting unexpected communications patterns. When TTC receives registration (R) message from TFG 2510, the TTC updates the number of premium users (PU(N)) 2511. When TTC receives checker program (CP) form SMS 2520, the TTC incorporates the CP into its operational code 2521. This last operation is equivalent to the renewable and update operations that are described in FIG. 11, specifically, the operations of the TTG renewable controller 1140 and TTC update controller 1150. When TTC receives attack location (A(L)) message from TFG, another TTC, SMS 2530, the TTC sends attack location (A(L)) message to other TTCs and SMSs with the location of the attack 2531. When TTC receives D/E (disable/enable) non-premium users' messages from another TTC or SMS 2540, the TTC enable/disable, accordingly, non-premium service users 2541. When TTC receives LPU(N) (limit the number of premium users to N) message from another TTC or SMS 2550, the TTC limits the number of premium users to N 2551.

FIG. 26 illustrates the SMS operation for detection and after detecting unexpected communications patterns. When SMS receives registration (R) message from TFG 2610, the SMS updates the number of premium users (PU(N)) 2611. When SMS receives attack location (A(L)) message from TFG, another TTC, SMS 2620, the SMS sends attack location (A(L)) message to other TTCs and SMSs with the location of the attack 2621. When SMS receives D/E (disable/enable) non-premium users message from another TTC or SMS 2630, the SMS enable/disable, accordingly, non-premium service users 2631.

The network management system, is illustrated in FIG. 21, FIG. 23, FIG. 24, FIG. 25, and FIG. 26, and comprises: a plurality of trusted flow generator (TFG) subsystems 110TFG, a plurality of trusted tag checker (ITC) subsystems 120TTC, and a plurality of secure management server (SMS) subsystems 160SMS. Each of the TFG subsystems sends and receives management messages and selectively generates security tag vectors (STVs) 711. Each of the STVs is generated responsive to compliance logic, which are part of each of the TFG, a and each STV 711 is associated with each respective one of the data packet headers.

Each of the TTC subsystems 120TTC, that is part of the system illustrated in FIG. 21, FIG. 23, FIG. 24, FIG. 25, and FIG. 26, sends and receives management messages and selectively generates a comparison tag for comparison to the security tag vector 711 for each respective one of the received data packets 111. The network management system sends and receives management messages over a communications network that is used for coupling the data packets, the plurality of TFG subsystems, the plurality of TIC subsystems and SMS subsystems. Each of the TFG subsystems is comprised of logic comprised of packet processing, rules of transmission and security tag generation.

In the network management system is illustrated in FIG. 21, FIG. 23, FIG. 24, FIG. 25, and FIG. 26, each of the TTC subsystems sends a count message that provides a report of a count of how many TFG subsystems are coupled for transmission of data packets 111 through the TTC subsystems. Each TFG subsystem is considered as a premium user. The TTC subsystems upon receiving the count messages with the number of premium users (or TFG subsystems) from other TTC subsystems sum them up into a TTC number of premium users—PU(N)—see the table in. FIG. 23. When PU(N) exceeds a predefined threshold the TTC subsystem sends a notification message to the SMS subsystem. The notification message can be one of two types: (A1) D/E: disable/enable non-premium users and (A2) LPU(N): limit the number of premium users—as shown in FIG. 23.

The SMS and TTC subsystems send update information for the rules of transmission and security tag vector generation of selected ones of the TFG subsystems. The update information to the rules of transmission and security tag vector generation is sent as part of the HP (hidden program) message—as shown in FIG. 23. The SMS subsystem sends renewable information to the rules of transmission and security tag vector 711 generation of selected one of the TFG subsystems. The update information and the renewable information are sent as illustrated in FIG. 10.

The data packets are divided into two groups: a first group of the data packets, from premium users, which are communicated with respective ones of the security tags vector 711; and a second group of the data packets, from non-premium users, which are communicated without respective ones of the security tags vector.

The SMS subsystem is responsive to the received management messages, as illustrated in FIG. 23, for controlling the flow of the data packets on the communications network 150. The plurality of TTC subsystems 120TTC provide report count message with the number of premium users PU(N), wherein each premium user generates and sends data packets with security tag vectors from TFG subsystem 110TFG. The SMS subsystem is responsive to the PU(N) messages from the plurality of TTC subsystems for controlling flow of the data packets in the communications network 150. The SMS subsystem is disabling and enabling the flow of the data packets responsive to the report count messages—PU(N)s. The SMS subsystem limits, to a predefined number, the flow of the data packets responsive to the report count messages—PU(N). The SMS subsystem is disabling and enabling at least one of: first group of the data packets and second group of the data packets, wherein the first group of the data packets originated from a set of premium users. The SMS subsystem limits, to a predefined number, at least one of: first group of the data packets and second group of the data packets.

The SMS monitors the received messages from the TTC subsystems to detect an attack pattern responsive to attack analysis logic. The attack analysis logic consists of the data packets traffic load over all links of the communications network 150. The attack analysis logic gets as input at least one of: type of data packets sent by TFG subsystems 110TFG, type of data packets received by TTC subsystems 120TTC, number of data packets sent by TFG subsystems, rate of data packets sent by TFG subsystems, number of data packets received by TTC subsystems, rate of data packets received by TIC subsystems, sources of data packets sent by TFG subsystems, sources of data packets received by TTC subsystems, destinations of data packets sent by TFG subsystems, destinations of data packets received by TTC subsystems, routes of data packets sent by TFG subsystems, and routes of data packets received by TTC subsystems.

The attack analysis logic is responsive to its input and determines selected control messages, as illustrated in FIG. 23, to be sent to respected ones of plurality of TTC subsystems and respected ones of plurality of TFG subsystems. The attack analysis logic responsive to its input, and the data packets traffic load over all links of the communications network 150, determines the attack location. The attack analysis logic responsive attack location sends selected control messages—as illustrated in FIG. 23.

The selected control messages determine, for each TTC subsystem, at least one of: disabling the first group of the data packets, disabling the second group of the data packets, enabling the first group of the data packets, enabling the second group of the data packets, limiting the first group of the data packets, and limiting the second group of the data packets; wherein the first group of the data packets corresponds to premium users generating data packets from TFG subsystems 110TFG, and wherein the second group of the data packets were generated by non-premium users.

The selected control messages, as illustrated in FIG. 23, further determine (for each TFG subsystem and/or for each TTC subsystem) at least one of: disabling the first group of the data packets, disabling the second group of the data packets, enabling the first group of the data packets, enabling the second group of the data packets, limiting the first group of the data packets, and limiting the second group of the data packets.

The send and receive management messages, as illustrated in FIG. 23, contain at least one of: an authentication field, a digital signature field, a time-stamp field, an encrypted field, an encrypted portion of the message, and a keying information field.

Figure 27:
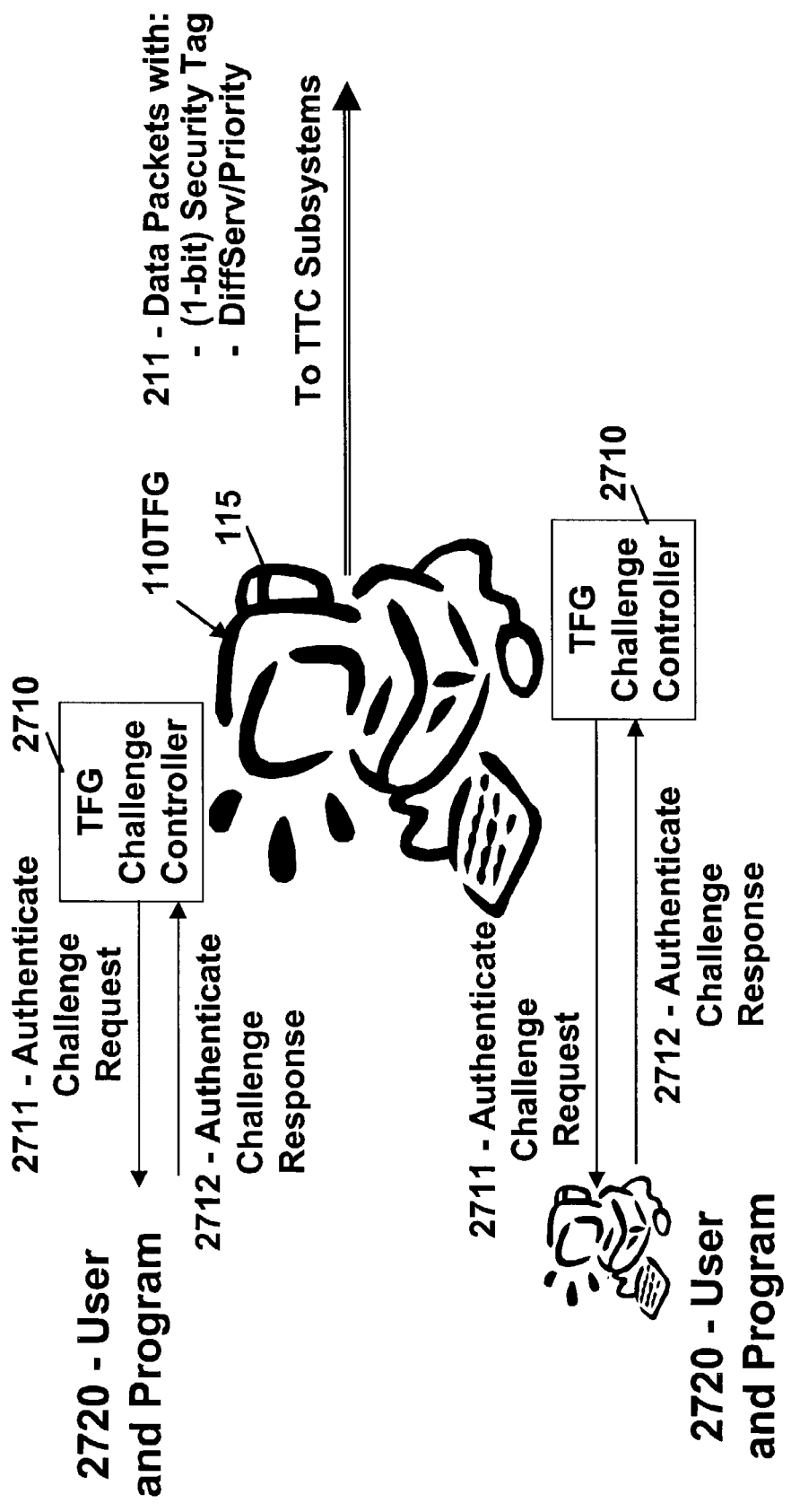
FIG. 27 is a functional description of system that consists of a TFG challenge controller that sends an authenticate challenge request message to users and programs and receives back an authenticate challenge response message, wherein only when the response matches the challenge the system will generate and send data packets with security tag vectors.

The Authenticate Challenge Request and Response Operation:

FIG. 27 is an illustration of an embodiment of the present invention, wherein a system that consists of a TFG challenge controller sends authenticate challenge request messages to users and programs and receives back authenticate challenge response messages, and only when the responses respectively match the challenge requests, will the system generate and send data packets with security tag vectors.

The secured network management system illustrated in FIG. 27, is manages the communications of data packets. The system comprises: a plurality of trusted flow generator (TFG) subsystems; a plurality of trusted tag checker (ITC) subsystems; and a plurality of secure management server (SMS) subsystems.

In said system, each of the TFG subsystems sends and receives messages and selectively generates security tag vectors 711, responsive to compliance logic for association with each respective one of the data packets.

The system illustrated in FIG. 27 includes a communications network for coupling the data packets, the plurality of TFG subsystems, and the plurality of TTC subsystems; and wherein each of the TFG subsystems 110TFG is comprised of logic comprised of packet processing, rules of transmission and security tag vector 711 generation; wherein the TFG subsystem further comprises a TFG challenge controller 2710.

The TFG challenge controller 2710 further comprises a communication subsystem for interaction with users and programs that produce inputs for packet processing; wherein the communication subsystem sends a challenge message 2711 to users and programs that produce inputs for packet processing; wherein challenge message 2711 comprises at least one of: a cryptographic field, an encryption field, a clear text field, a request for users to perform a task using a keyboard, a request for users to perform a task using a mouse, a request for users to perform a task using a biometrics reader, a request for users to perform a task using a terminal input function, requesting an answer to a verbal question, requesting an answer to an audiovisual question, requesting an answer to a previously stored data item, requesting an answer related to published information within the user and the program computing subsystems, requesting payment, requesting digital form of payment, requesting a credit card number, requesting information retrievable from a smart card, requesting information retrievable from a portable device, an activation of a sensor enabling the receipt of sensory information, and requesting information based on means of computing received from the SMS subsystem.

The TFG challenge controller 2710 receives a response message 2712 from users and programs that produce input for packet processing; wherein response message 2712 comprises at least one of: a cryptographic field, an encryption field, a clear text field, a response to a request for users to perform a task using a keyboard, a response to a request for users to perform a task using a mouse, a response to a request for users to perform a task using a biometrics reader, a response to a request for users to perform a task using a terminal input function, a response to a message requesting an answer to a verbal question, a response to a message requesting an answer to an audiovisual question, a response to a message requesting an answer to a previously stored data item, a response to a message requesting an answer related to published information within the user and the program computing subsystems, a response with payment, a response with a digital form of payment, a response with a credit card number, a response with information retrievable from a smart card, a response with information retrievable from a portable device, a response with a signal, a response with a radio signal, a response with a wireless signal, a response with an RF information, a response with an IR information, response with sensory information, response with audio information, response with olfactory information, and an answer to a message requesting information based on means of computing received from the SMS subsystem.

As illustrated in FIG. 27, the TFG challenge controller 2710 allows user and program input to be used in packet processing responsive to a response message 2712 received from user and program. The TFG challenge controller 2710 does not allow user and program input to be used in packet processing responsive to a failed response message 2712 received from user and program.

The TFG subsystem 110TFG selectively generates data packets with security tags responsive to the response messages 2712 that successfully answered the challenge request 2711. The TFG subsystem is then sending the data packets with security tags 711 to the TTC subsystem 120TTC. The TTC subsystem upon receiving the data packet from the TFG subsystem is validating the data packet by analyzing the security tag 711.

The TTC subsystem further comprises: means for mapping the data packet with security tags 711 to a first communications class of service responsive to the validating the data packet and verifying the respective security tag 711; and means for mapping the data packet to a second communications class of service responsive to the validating the data packet with security tags resulting in failed verifying of the security tag 711. Then the TTC subsystem couples the data packets of the first communications class of service for further communication therefrom. The TTC subsystem denies further communications therefrom of the data packets of the second communications class of service. The TTC subsystem stores the second communications class of service in local storage without further transmission. In another embodiment of the present invention, the TTC subsystem sends the data packet of the second communications class of service is at a lower priority level than the data packets of the first communications class of service.

The IP Virtual Private Network Functional Operation:

FIG. 28 illustrates a system that generates and sends data packets with security tag vectors 711 over IP (Internet protocol) VPN (virtual private network) connection 2810 through a network interface, e.g., firewall, classifier, and policer, while mapping data packets with verified security tag'vectors 111 to premium service. Consequently, the data packets that were generated and sent from an untrusted computing environment at the end station are to be trusted once the respective security tag vectors 711 have been verified.

The VPN connection 2810 is created by using a trusted flow generator (TFG) 110TFG and a trusted tag checker 120TTC as was specified in detail in the respective description of FIG. 8, FIG. 9, FIG. 10 and FIG. 11.

From the foregoing, it will be observed that numerous variations and modifications may be effected without departing from the spirit and scope of the present invention. It is to be understood that no limitation with respect to the specific apparatus illustrated herein is intended or should be inferred. It is, of course, intended to cover by the appended claims all such modifications as fall within the scope of the claims.

What is claimed is:

1. A system for assuring proper execution of a software computer program on a computer apparatus, the system comprising:
    an integrated combination of computer software program comprised of a software application logic module and an operation assurance logic module;
    wherein the software application logic module and the operational assurance logic module each provide a plurality of sub-procedures which operate as a combined plurality of sub-procedures that are executed to provide combined computing functions comprised of the functionality of the respective software application module, and an integrated concurrent generation of unique security tags utilizing the functionality of the respective operational assurance logic module;
    storage for the integrated computer software program;
    a controller of the integrated computer software program for execution on the computer apparatus of a concurrent executed integrated combination of the respective software application logic module, and the respective operational assurance logic module, as expressly provided in the associated computer software program;
    wherein during the combined computing functions, the unique security tags which provide for validating that the software computer program as executed was not tampered with, are selectively generated by the sub-procedures of the operational assurance logic module and are only generated when the integrated software computer program is executed and has not been tampered with; and
    an associated operational checking logic, for validating that the integrated software computer program as executed was not tampered with responsive to the unique security tags.

2. The system as in claim 1, wherein the combined computing functions resist at least one of reverse engineering, modification, replacement of any of the software application logic module and the operational assurance logic module, and replacement of any portion of the software application logic module and the operational assurance logic module.

3. The system as in claim 1, wherein the operational assurance logic module provides at least one of: a cryptographic function for producing a pseudo-random sequence of security tags, and a digital signing function of selected parts of the software application logic module for producing a sequence of at least one security tag.

4. The system as in claim 3, wherein the cryptographic function utilizes computation by at least one of: applying a pseudo-random generator, applying a pseudo-random function, applying a cryptographic function, applying an encryption function, applying a scrambling subroutine, applying an authentication function, applying a digital signing function, applying a cryptographic hash function, applying a subroutine, applying a computational logic module, applying a symmetric cryptography function, applying an asymmetric cryptography function, employing a cryptographic key, employing a cryptographic seed, employing an encrypted software, employing an obfuscated software, employing a hidden program, employing logic with a set of parameters, employing a hardware module, employing a smart card, employing, a portable device, and employing a distributed protocol across a network, and employing a distributed protocol across a network for providing codes and parameters.

5. The system as in claim 1, wherein the software application logic module provides logic to construct data packets.

6. The system as in claim 5, wherein logic to construct data packets computes at least one of: an IP data packet, a TCP/IP data packet, a UDP data packet, an ATM data packet, a MPLS data packet, a TCP SYN signal, a PING signal, an ICMP signal, an IPv4, IPv6, a FC frame, a cable modem frame, an Ethernet frame, and a data packet segmentation.

7. The system as in claim 1, wherein the software application logic module provides rules of transmission.

8. The system as in claim 7, wherein the rules of transmission compute at least one of: performance characteristics, access characteristics, transmission limitations, transmission rates, window sizes, port numbers, IP addresses, network addresses, quotas, renewable quotas, packet structure limitations, a renewable precondition for transmission, and a schedule for transmission.

9. The system as in claim 7, wherein at least one of the rules of transmission determines a renewable precondition for transmission; and
wherein the renewable precondition for transmission is least one of: a renewable transmission quota of trusted data packets, a number of trusted data packets that can be transmitted per unit of time, a time signal, a UTC time signal, a digitally signed time signal, a digital cache for transmission of trusted data packets, cryptographic keys for marking trusted data packets, predefined logic, an external rule controller, a security management system, via a network interface, a network appliance, a server, a network management system, a firewall, local computation, a smart card device, and a portable device.

10. The system as in claim 1, wherein the operational assurance logic module provides a cryptographic function for producing a pseudo-random sequence of security tags;
wherein the software application logic module provides rules; and
wherein the rules provide for computing at least one of: performance characteristics, execution time measurements, execution time measurements that are responsive to UTC, access characteristics, transmission limitations, transmission rates, window sizes, port numbers, IP addresses, network addresses, quotas, renewable quotas, packet structure limitations, and a schedule for transmission.

11. The system as in claim 1, wherein the operational assurance logic module provides a cryptographic function for producing a pseudo-random sequence of security tags;
wherein the software application logic module provides logic to construct data packets and provides rules of transmission; and
wherein the rules of transmission provide for computing at least one of: performance characteristics, access characteristics, execution time characteristics, execution time measurements that are responsive to UTC, transmission limitations, transmission rates, window sizes, port numbers, IP addresses, network addresses, quotas, renewable quotas, packet structure limitations, and a schedule for transmission.

12. The system as in claim 1, further comprising:
a source of interlocking parameters and a remote trusted server; and
wherein the source of interlocking parameters resides on at least one of a remote trusted server, a smart card;
the system further comprising of means for combining the software application logic module and the operational assurance logic module according to defined interlocking logic responsive to the interlocking parameters received from the remote trusted server.

13. The system as in claim 12, wherein the source of interlocking parameters is generated by at least one of a random source, cryptographic keys, a defined location in memory, receiving parameters from the trusted server, and receiving codes from the trusted server.

14. The system as in claim 12, wherein the controller provides for determining a combination of subtask computing functions of the software application logic module and subtask computing functions of the operational assurance logic module to provide for combined function;
wherein the controller provides for a plurality of combinations of the subtask computing functions; and
wherein each of the plurality of the combinations of the subtask computing functions provides for at least one of a plurality of combined functions.

15. The system as in claim 14, wherein the combination is further comprised of at least one of obfuscation, encryption, replication, adding dummy code, addition of redundant control, renaming of variables, splitting a procedure into multiple sub-procedure, dictionary transformation, compilation, interpretation, cryptographic transformation, digital signing, and scrambling.

16. The system as in claim 15, wherein the replication is comprised of repetitions of the software logic modules into an oversize program comprising the single logic program embedded therein.

17. The system as in claim 16, wherein each repetition respectively defines a single program within the oversize.

18. The system as in claim 1, wherein the controller further generates external software modules and parameters for linked operation to provide the combined computing functions;
means for transmitting the external software modules and parameters to separate computing subsystems; and
wherein the external software modules and parameters are executed in the separate computing subsystems to provide at least one of: update information and renewable information coupled to the integrated computer software program.

19. The system as in claim 18, wherein the means for transmitting utilizes at least one of: encryption, authentication, time measurement, digital signing, digital signing of selected groups of instructions, and digital signing of selected groups of instructions responsive to parameters received from a remote trusted server across a network.

20. The system as in claim 18, wherein the update information is at least one of: a change data, a change executable code, a change pattern, a change order, a pseudo-change of dummy code, selected sub-procedures of the software application logic module and selected sub-procedures of the operational assurance logic module.

21. The system as in claim 18, wherein the renewable information is at least one of: a renewable transmission quota of trusted data packets, a number of trusted data packets that can be transmitted per unit of time, a time signal, a UTC time signal, a digitally signed time signal, a digital cache for transmission of trusted data packets, and cryptographic keys for marking trusted data packets.

22. The system as in claim 18, wherein the software application logic module execution receives the external software modules and parameters from a remote trusted server across a network.

23. The system as in claim 1, wherein security verification information is generated responsive to the operational assurance logic module as part of the combined computing functions, for utilization by the operational checking logic in a separate communications subsystem.

24. The system as in claim 1, wherein the operational assurance logic module provides security services for at least one of: user authentication, user sign-on, data packet authentication, user login, applying a user's cryptographic keys, applying an organization's cryptographic keys, and digital signing.

25. The system as in claim 24, wherein the security services further provide for applying cryptographic transformations based on keys provided by a primary computing system.

26. The system as in claim 25, wherein the primary computing system provides for execution of the computer software program.

27. The system as in claim 1,
wherein a secondary computing subsystem, which is independent and separate from the controller, provides for generating the integrated computer software program, responsive to the software application logic module and the operational assurance logic module.

28. The system as in claim 1, wherein the computing functions are provided responsive to the validating that the software computer program, as executed, was not tampered with.

29. A method for assuring proper execution of a software computer program executing on a computing system, the method comprising:
providing an integrated computer software program comprised of a software application logic module and an operational assurance logic module;
wherein the software application logic module is operable to provide a plurality of sub-procedures to provide computing functions associated with the software application logic module execution of the integrated software computer program and as a part of the integrated software computer program;
wherein the operational assurance logic provides for generation of unique security tags securely associated with the execution of the integrated software computer program;
executing the integrated software computer program to provide generation of the unique software keys by the operation assurance logic when the integrated software computer program as executed is unaltered, to provide thr validating that the integrated software computer program that is being executed was not altered and that there was no tampering of the integrated software computer program;
wherein the executing of the integrated software computer program provides a set of combined computing functions:
wherein during the combined computing functions, an operational set of unique data tags are generated by the sub-procedures of the operational assurance logic module to provide for validating that the integrated software computer program as executed was not tampered with;
wherein the integrated software computer program generates the operational unique data tags which only when operating as a part of the integrated software computer program; and
validating that the integrated software computer program as executed was not tampered with, responsive to the unique data tags.

30. The method as in claim 29, further comprising: producing a pseudo-random sequence of security tags responsive to the operational assurance logic module.

31. The method as in claim 30, further comprising:
producing the pseudo-random sequence of security tags utilizing computation by at least one of: applying a pseudo-random generator, applying a pseudo-random function, applying a cryptographic function, applying an encryption function, applying a scrambling subroutine, applying an authentication function, applying a digital signing function, applying a cryptographic hash function, applying a subroutine, applying a computational logic module, applying a symmetric cryptography function, applying an asymmetric cryptography function, employing a cryptographic key, employing a cryptographic seed, employing an encrypted software, employing an obfuscated software, employing a hidden program, employing logic with a set of parameters, employing a hardware module, employing a smart card, employing a portable device, and employing a distributed protocol.

32. The method as in claim 30, further comprising: generating security verification information for utilization by security tag verification logic in a separate communications subsystem which validates the security tags.

33. The method as in claim 29, further comprising: constructing data packets responsive to the combined computing functions.

34. The method as in claim 29, further comprising: constructing data packets by computing utilizing at least one of: an IP data packet, a TCP/IP data packet, a UDP data packet, an ATM data packet, a MPLS data packet, a TCP SYN signal, a PING signal, an ICMP signal, an IPv4, an IPv6, a FC frame, a cable modem frame, a Ethernet frame, and a data packet segmentation.

35. The method as in claim 29, further comprised of at least one of a trusted computing machine and a trusted hardware module;
wherein at least one of the software application logic module and the operational assurance logic module provides rules of transmission to at least one of the trusted computing machine and the trusted hardware module.

36. The method as in claim 35, further comprising: utilizing the rules of transmission to compute at least one of: performance characteristics, access time characteristics, execution time characteristics, transmission time limitations, transmission rates, window sizes, port numbers, IP addresses, network addresses, quotas, renewable quotas, packet structure limitations, and a schedule for transmission.

37. The method as in claim 35, further comprising: determining a renewable precondition for transmission responsive to at least one of the rules of transmission.

38. The method as in claim 37, wherein the renewable precondition for transmission is least one of: a renewable transmission quota of trusted data packets, a number of trusted data packets that can be transmitted per unit of time, a time signal, an execution time characteristic, an access time characteristic, a UTC time signal, digitally signed time signal, digital cash for transmission of trusted data packets, and cryptographic keys for marking trusted data packets.

39. The method as in claim 37, further comprising: obtaining the renewable precondition for transmission from at least one of a predefined logic, an external rule controller, a security management system, a network interface, a network appliance, a server, a network management system, a firewall, a local computation, a smart card device, and a portable device.

40. The method as in claim 29, further comprising:
providing a cryptographic function for producing a pseudo-random sequence of security tags;
providing rules of transmission; and
utilizing the rules of transmission to provide for computing at least one of performance characteristics, access characteristics, transmission limitations, transmission rates, window sizes, port numbers, IP addresses, network addresses, quotas, renewable quotas, packet structure limitations, and schedule for transmission.

41. The method as in claim 29, further comprising: providing logic to construct data packets responsive to the combined computing functions.

42. The method as in claim 29, further comprising:
combining the software application logic module and the operational assurance logic module according to a defined interlocking logic responsive to interlocking parameters.

43. The method as in claim 42, further comprising: generating a source of interlocking parameters by at least one of: a random source, cryptographic keys, and a defined location in memory.

44. The method as in claim 42, further comprising:
providing the combined computing functions responsive to the combination of subtask functions of the software application logic module and subtask functions of the operational assurance logic module which generates the unique data tags when combined into and executed unaltered in the integrated software computer program.

45. The method as in claim 44, further comprising: providing the combination by a defined plurality of different methods; and
wherein each of the different methods provides a respectively unique single logic program providing a respective combination of the computing functions.

46. The method as in claim 45, wherein each of the different methods is further comprised of at least one of: obfuscation, encryption, replication, adding dummy code, addition of redundant control, renaming of variables, splitting a procedure into multiple sub-procedure, dictionary transformation, compilation, interpretation, cryptographic transformation, digital signing, and scrambling.

47. The method as in claim 46, wherein the software application logic module is comprised of a plurality of software logic modules; and
wherein the replication provides for repetitions of the plurality of the software logic modules into an oversize program; and
embedding the single logic software computer program in the oversize program.

48. The method as in claim 47, further comprising: activating each repetition separately to define an active single program within the oversize program.

49. The method as in claim 29, further comprising:
generating external software modules for linked operation with the integrated software computer program; and
providing the proper operational unique data tags responsive to the execution of the external software modules integrated with execution of the integrated software computer program, to enable the providing the computing functions.

50. The method as in claim 49, further comprising:
transmitting the external software modules to a plurality of separate computing subsystems; and
executing at least one of the external software modules in a respective one of the separate computing subsystems to provide at least one of: update information and renewable information coupled to the software computer program.

51. The method as in claim 50, wherein the update information is at least one of: change data, a change executable code, a change pattern, a change order, and a pseudo-change of dummy code.

52. The method as in claim 50, wherein the renewable information is at least one of: a renewable transmission quota of trusted data packets, a number of trusted data packets that can be transmitted per unit of time, a time signal, a UTC time signal, a digitally signed time signal, digital cash for transmission of trusted data packets, and cryptographic keys for marking trusted data packets.

53. The method as in claim 29, further comprising: transmitting the software computer program to a primary computing system.

54. The method as in claim 53, utilizing at least one of: encryption, authentication, and digital signing for the transmitting of the single logic software computer program to the primary computing system.

55. The method as in claim 29, further comprising: providing security services responsive to the operational assurance logic module.

56. The method as in claim 55, wherein the security services are comprised of at least one of: user authentication, user sign-on, data packet authentication, user login, applying a user's cryptographic keys, applying an organization's cryptographic keys, and digital signing.

57. The method as in claim 55, wherein the security services further provide for applying cryptographic transformations based on keys provided by a primary computing system.

58. The method as in claim 57, wherein the primary computing system provides for execution of the combined computing functions.

59. The method as in claim 29, further comprising: providing the computing functions responsive to the validating that the computer software program, as executed, was not tampered with.

60. The system as in claim 29, further comprising:
receiving external software modules and parameters from a remote trusted server across a network; and
executing the software application logic module responsive to receiving the external software modules and parameters from the remote trusted server across the network.

61. A method for assuring non-tampered proper execution of a software computer program executing on a computing subsystem, the method comprising:

provide an integrated combination of computer software program comprised of a software application logic module and an operation assurance logic module;

wherein the software application logic module and the operational assurance logic module each provide a plurality of sub-procedures which operate as a combined plurality of sub-procedures that are executed to provide combined computing functions comprised of the functionality of the respective software application module, and an integrated concurrent generation of unique security tags utilizing the functionality of the respective operational assurance logic module;

executing on the computer apparatus a concurrently executed integrated combination of the respective software application logic module and the respective operational assurance logic module, as expressly provided in the associated computer software program;

wherein during the combined computing functions, the unique security tags which provide for validating that the software computer program as executed was not tampered with, are selectively generated by the sub-procedures of the operational assurance logic module and are only generated when the integrated software computer program is executed and has not been tampered with; and validating that the integrated software computer program as executed was not tampered with responsive to the unique security tags.

62. The method as in claim 61, wherein the operational assurance logic module utilizes a pseudo-random sequence of security tags.

63. The method as in claim 62, wherein the security tags are created by at least one of: a pseudo-random generator, a pseudo-random function, a cryptographic function, an encryption function, a scrambling subroutine, an authentication function, a digital signing function, a cryptographic hash function, a subroutine, a computational logic module, a symmetric cryptography function, an asymmetric cryptography function, a cryptographic key, employing a cryptographic seed, an encrypted software, an obfuscated software, a hidden program, logic with a set of parameters, a hardware module, a smart card, a portable device, and a distributed protocol.

64. The method as in claim 62, further comprising: providing security tag verification logic in a separate communications subsystem for generating security verification information responsive to validating the pseudo-random sequence of security tags.

65. The method as in claim 61, wherein the software application logic module provides an output of data packets provided responsive to concurrent execution of the software application logic module and the operational assurance logic module.

66. The method as in claim 61, wherein the software application logic module provides rules of transmission.

67. The method as in claim 61, further comprising: logic to provide data packets responsive to the software application logic module.

68. The method as in claim 61, further comprising:

combining the software application logic module and the operational assurance logic module in order to generate the integrated software computer program responsive to defined interlocking logic.

69. The method as in claim 61, further comprising: providing, at a primary computing system, for at least one of: transmitting the integrated software computer program and receiving the integrated software computer program.

70. The method as in claim 61, further comprising: providing security services responsive to the operational assurance logic module; and wherein the security services are executed on at least one of: a trusted server across a network, a smart card, a tamper resisting hardware that is accessed via message passing protocol, and a tamper resisting hardware that is accessed via memory mapped input and output (I/O).

71. The method as in claim 61, further comprising: security services responsive to the operational assurance logic module; and wherein the security services further provide for applying cryptography transformations based on keys provided by a primary computing system.

72. The method as in claim 69, wherein the provides for execution of the software computer program.

73. The method as in claim 61, wherein the concurrent execution of the software application logic module and the operational assurance logic module provide validation that the computer software program, as executed, was not tampered with.

74. The method as in claim 61, wherein the single logic software computer program only provides the computing functions of the software application logic module and the computing functions of the operational assurance logic module responsive to the validating.

\* \* \* \* \*